US012646824B2

(12) United States Patent
Nam et al.

(10) Patent No.: US 12,646,824 B2
(45) Date of Patent: Jun. 2, 2026

(54) ELECTRONIC DEVICE INCLUDING FOLDABLE HOUSING AND ANTENNA

(71) Applicant: Samsung Electronics Co., Ltd., Suwon-si (KR)

(72) Inventors: Hojung Nam, Suwon-si (KR); Sungkoo Park, Suwon-si (KR); Kyungmoon Seol, Suwon-si (KR); Cheolhong Son, Suwon-si (KR); Kookjoo Lee, Suwon-si (KR); Donguk Choi, Suwon-si (KR); Jaewon Choe, Suwon-si (KR); Soonho Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 18/821,411

(22) Filed: Aug. 30, 2024

(65) Prior Publication Data

US 2025/0070454 A1     Feb. 27, 2025

Related U.S. Application Data

(63) Continuation of application No. PCT/KR2024/012356, filed on Aug. 20, 2024.

(30) Foreign Application Priority Data

Aug. 23, 2023    (KR) ........................ 10-2023-0110870
Nov. 6, 2023    (KR) ........................ 10-2023-0152215

(51) Int. Cl.
　H01Q 1/24　　　(2006.01)
　H01Q 1/38　　　(2006.01)
　H04M 1/02　　　(2006.01)

(52) U.S. Cl.
　CPC .............. H01Q 1/243 (2013.01); H01Q 1/38 (2013.01); H04M 1/0216 (2013.01)

(58) Field of Classification Search
　CPC ....... H01Q 1/243; H01Q 1/38; H04M 1/0216; H04M 1/0214
　See application file for complete search history.

(56) References Cited

U.S. PATENT DOCUMENTS 10,629,982 B2　4/2020　Kim et al.
11,038,255 B2　6/2021　Kim et al.
(Continued)

FOREIGN PATENT DOCUMENTS

CN　　109193117 A　1/2019
CN　　115249889 A　10/2022
(Continued)

OTHER PUBLICATIONS

International Search Report and Written Opinion dated Dec. 2, 2024, issued in International Patent Application No. PCT/KR2024/012356.

*Primary Examiner* — Dieu Hien T Duong
(74) *Attorney, Agent, or Firm* — Jefferson IP Law, LLP

(57) ABSTRACT

An electronic device according to an embodiments includes a foldable housing including a first housing part, a second housing part and a third housing part, a wireless communication circuit, a first conductive portion formed along at least a portion of a first side exterior surface of the first housing part and including a feeding point and a ground point, and a filter circuit electrically connected to a portion of a second conductive portion in a second side exterior surface of the second housing part. The portion corresponds to a region between the feeding point of the first conductive portion and (Continued)

the ground point of the first conductive portion, in a folded state in which the first housing part and the second housing part are folded.

20 Claims, 36 Drawing Sheets

(56)               References Cited

U.S. PATENT DOCUMENTS

| | | |
|---|---|---|
| 11,362,699 B2 | 6/2022 | Jung et al. |
| 11,405,493 B2 | 8/2022 | Jung et al. |
| 2012/0127044 A1 | 5/2012 | Mashima et al. |
| 2017/0110786 A1* | 4/2017 | Liu ....................... G06F 1/1641 |
| 2020/0195336 A1 | 6/2020 | Raghavan et al. |
| 2023/0028213 A1 | 1/2023 | Yang |
| 2024/0055778 A1* | 2/2024 | Wang ....................... H01Q 9/26 |
| 2025/0096453 A1 | 3/2025 | Cai et al. |

FOREIGN PATENT DOCUMENTS

| | | |
|---|---|---|
| CN | 119231157 A | 12/2024 |
| CN | 119481711 A | 2/2025 |
| EP | 4 075 234 A4 | 5/2023 |
| JP | 2011-040884 A | 2/2011 |
| KR | 10-2019-0116883 A | 10/2019 |
| KR | 10-2020-0046399 A | 5/2020 |
| KR | 10-2021-0043003 A | 4/2021 |
| KR | 10-2021-0099971 A | 8/2021 |
| KR | 10-2022-0105873 A | 7/2022 |
| KR | 10-2465796 B1 | 11/2022 |

* cited by examiner

ELECTRONIC DEVICE INCLUDING FOLDABLE HOUSING AND ANTENNA

CROSS-REFERENCE TO RELATED APPLICATION(S)

This application is a continuation application, claiming priority under § 365(c), of an International application No. PCT/KR2024/012356, filed on Aug. 20, 2024, which is based on and claims the benefit of a Korean patent application number 10-2023-0110870, filed on Aug. 23, 2023, in the Korean Intellectual Property Office, and of a Korean patent application number 10-2023-0152215, filed on Nov. 6, 2023, in the Korean Intellectual Property Office, the disclosure of each of which is incorporated by reference herein in its entirety.

TECHNICAL FIELD

The disclosure relates to an electronic device including a foldable housing and an antenna.

BACKGROUND ART

An electronic device may transmit or receive signals through an antenna. For example, the electronic device may include a plurality of conductive portions forming a part of a side surface thereof. Some of the plurality of conductive portions may operate as an antenna radiator for transmitting and/or receiving signals.

For example, the electronic device may include a foldable housing and a flexible display adapted for providing an enhanced user experience to a user. For example, the foldable housing may include a plurality of housing parts. The foldable housing may have a structure in which the plurality of housing parts may be folded or unfolded at least once.

The above information is presented as background information only to assist with an understanding of the disclosure. No determination has been made, and no assertion is made, as to whether any of the above might be applicable as a prior art with regard to the disclosure.

DISCLOSURE

Technical Solution

Aspects of the disclosure are to provide at least the advantages described below. Accordingly, an aspect of the disclosure is to provide an electronic device including a foldable housing and an antenna.

Additional aspects will be set forth in part in the description which follows and, in part, will be apparent from the description, or may be learned by practice of the presented embodiments.

In accordance with an aspect of the disclosure, an electronic device is provided. The electronic device includes a foldable housing including a first housing part, a second housing part and a third housing part, the foldable housing configured to be folded with respect to a first folding axis and a second folding axis such that the first housing part, the second housing part and the third housing part are stacked with respect to each other in a folded state. The electronic device includes a wireless communication circuit for wireless communication. The electronic device includes a first conductive portion formed at least partially along a first side exterior surface of the first housing part, the first conductive portion includes a feeding point electrically connected to the wireless communication circuit and a ground point electrically connected to a ground of the electronic device. The electronic device includes a filter circuit electrically connected to a portion of a second conductive portion formed at least partially along a second side exterior surface of the second housing part, and electrically connecting the second conductive portion of the second side exterior surface and the ground. The second housing part is positioned between the first housing part and the third housing part in the folded state in which the first housing part, the second housing part, and the third housing part are folded. The portion of the second conductive portion in the second side exterior surface corresponds to a region between the feeding point of the first conductive portion and the ground point of the first conductive portion in the folded state in which the first housing part and the second housing part are folded.

In accordance with another aspect of the disclosure, an electronic device is provided. The electronic device includes a foldable housing including a first housing part, a second housing part whose one side is rotatably connected to one side of the first housing part with respect to a first folding axis, and a third housing part rotatably connected to either the other side of the first housing part or the other side of the second housing part with respect to a second folding axis parallel to the first folding axis. The electronic device includes a first conductive portion formed at least partially along a first side exterior surface of the first housing part and including a first feeding point and a first ground point. The electronic device includes a filter circuit electrically connected to a portion of a second conductive portion formed at least partially along a second side exterior surface of the second housing part and electrically connecting the second side exterior surface and a ground. The electronic device includes a third conductive portion formed at least partially along a third side exterior surface of the third housing part and including a second feeding point and a second ground point. The second housing part is positioned between the first housing part and the third housing part in a folded state in which the first housing part, the second housing part, and the third housing part are folded. The portion in the second side exterior surface corresponds to a first region between the first feeding point and the first ground point and a second region between the second feeding point and the second ground point.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
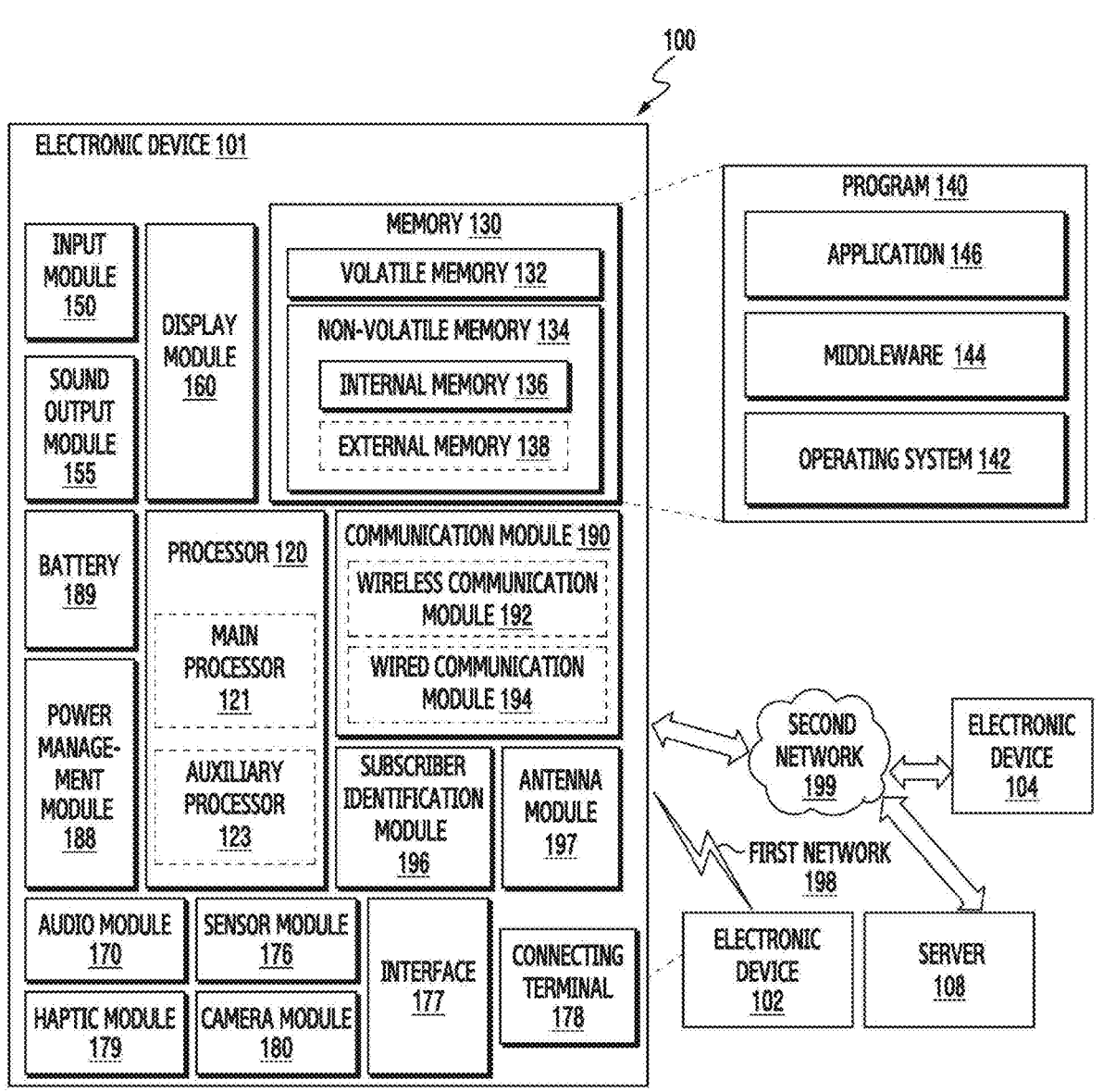
FIG. 1 is a block diagram of an electronic device in a network environment according to an embodiment.

FIG. 1 illustrates a block diagram of an electronic device in a network environment according to an embodiment.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may be configured to store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to address, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may, for example, support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form a millimeter wave (mmWave) antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another example of the disclosure, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
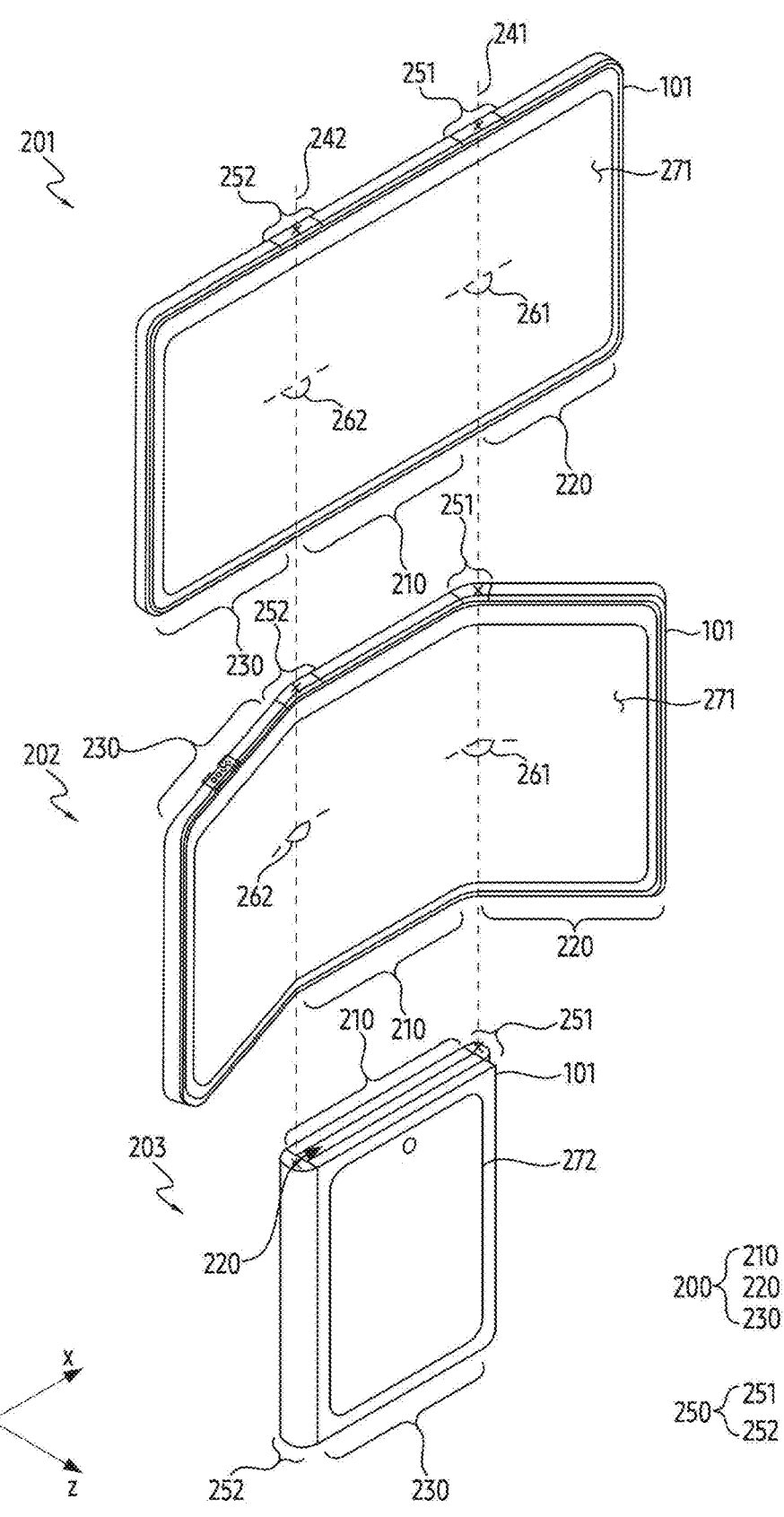
FIGS. 2A and 2B illustrate an electronic device including a foldable housing according to various embodiments.
Figure 2B:
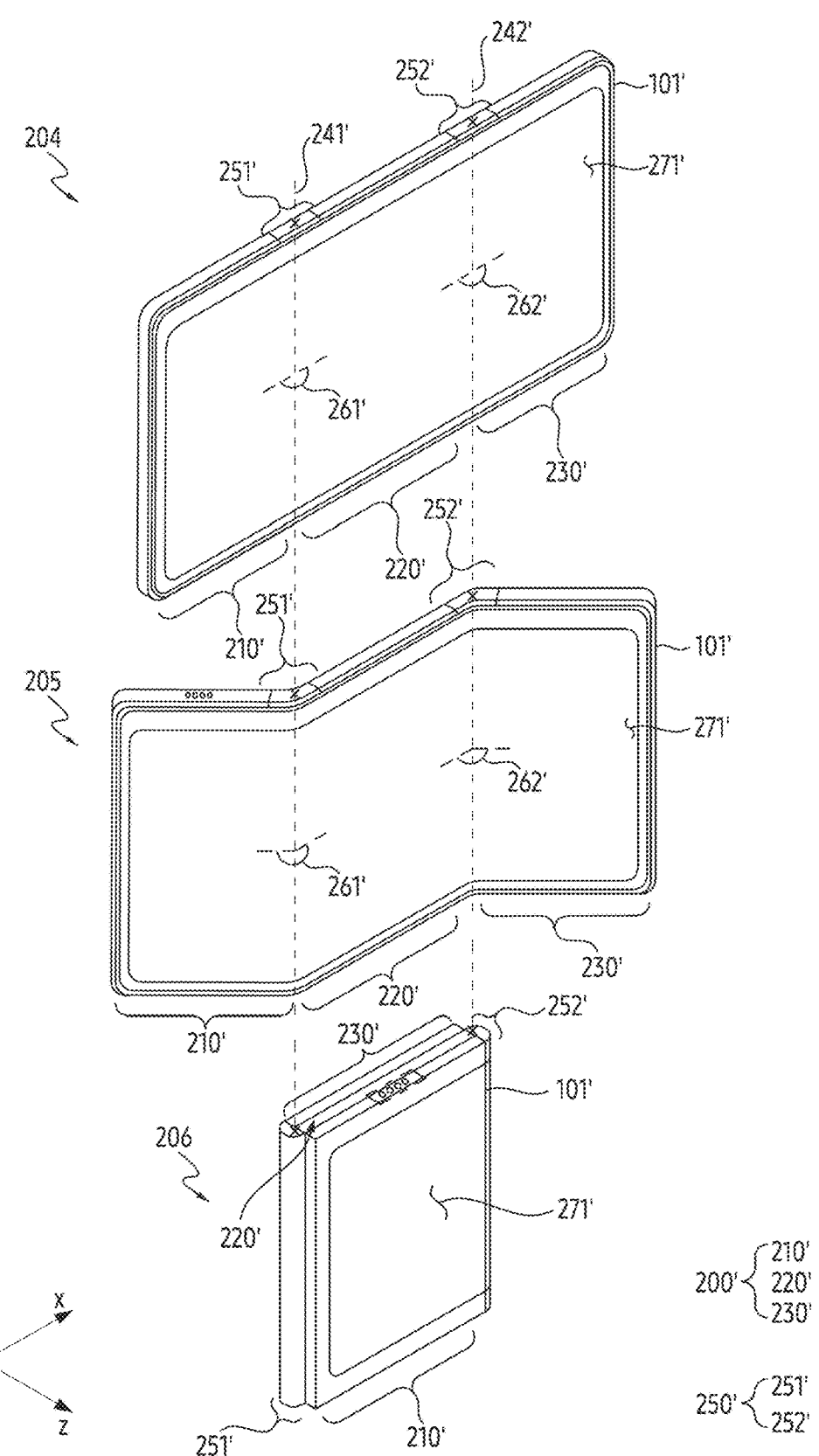

FIGS. 2A and 2B illustrate an electronic device including a foldable housing according to various embodiments.

Referring to FIG. 2A, an electronic device 101 according to an embodiment may include a deformable foldable housing 200. For example, the foldable housing 200 may be referred to as a multi-foldable housing in that it includes a plurality of housing parts that are foldably connected. In an example, the foldable housing 200 may include a first housing part 210, a second housing part 220, and a third housing part 230 that are rotatably coupled to each other. In the disclosure, the foldable housing 200 is described as a structure including the first housing part 210, the second housing part 220, and the third housing part 230, but it is not limited thereto. For example, the foldable housing 200 may include three or more housing parts.

The electronic device 101 may include a hinge part 250 (e.g., a first hinge part 251 and a second hinge part 252) for a deformable structure of the foldable housing 200. For example, the hinge part 250 may rotatably connect the first housing part 210, the second housing part 220, and the third housing part 230. For example, depending on the structure in which the foldable housing 200 is folded, the connection relationship between the hinge part 250 and the housing parts may vary.

Referring to FIG. 2A, the second housing part 220 may be rotatably connected to one side (e.g., +x directional side) of the first housing part 210 with respect to a first folding axis 241. For example, the third housing part 230 may be rotatably connected to the other side (e.g., −x directional side) of the first housing part 210 with respect to a second folding axis 242. For example, the hinge part 250 may include a first hinge part 251 rotatably connecting the second housing part 220 to one side of the first housing part 210 and a second hinge part 252 rotatably connecting the third housing part 230 to the other side of the first housing part 210. The electronic device 101 may have a structure capable of being folded at least once by means of the first hinge part 251 and the second hinge part 252.

For example, the second folding axis 242 may be parallel to the first folding axis 241. For example, the first folding axis 241 and the second folding axis 242 may be parallel to y-axis. For example, the first folding axis 241 may be a rotation axis of the first housing part 210 and the second housing part 220 connected by the first hinge part 251. For example, the second folding axis 242 may be a rotation axis of the first housing part 210 and the third housing part 230 connected by the second hinge part 252.

For example, as the first housing part 210 and/or the second housing part 220 is rotated about the first folding axis 241, a first angle 261 between the first housing part 210 and the second housing part 220 may be changed. For example, as the first housing part 210 and/or the third housing part 230 is rotated about the second folding axis 242, a second angle 262 between the first housing part 210 and the third housing part 230 may be changed. In terms of having multiple folding axes, such as the first folding axis 241 and the second folding axis 242, the electronic device 101 according to an embodiment may be referred to as a multi-foldable electronic device.

The electronic device 101 according to an embodiment may include a flexible display 271 disposed on one surface of the foldable housing 200. For example, the flexible display 271 may extend from at least a portion of a front surface of the second housing part 220 to at least a portion of a front surface of the third housing part 230 across at least a portion of a front surface of the first housing part 210. For example, when the foldable housing 200 is folded or unfolded, the flexible display 271 may also be folded or unfolded correspondingly.

Referring to FIGS. 2A and 2B, different states of the electronic device (101, 101') distinguished by the shapes of the foldable housing (200, 200') are illustrated. For example, the flexible display 271 of the electronic device 101 illustrated in FIG. 2A may be covered by the first housing part 210, the second housing part 220, and the third housing part 230, which are folded along the first folding axis 241 and the second folding axis 242.

A first state 201 of FIG. 2A may indicate a fully unfolded state of the first housing part 210, the second housing part 220, and the third housing part 230. For example, in the first state 201, the first angle 261 and the second angle 262 may be substantially a straight angle (e.g., about 180 degrees). The first state 201 may be referred to as an open state, a flat state, an outspread state, and/or an unfolded state, from the point of view that the first housing part 210, the second housing 220, and the third housing 230 are fully unfolded. In the first state 201, the flexible display 271 may be substantially flat. For example, in the first state 201, the first housing part 210 may be positioned between the second housing part 220 and the third housing part 230.

A second state 202 of FIG. 2A may indicate a state in which at least one of the first angle 261 or the second angle 262 is less than a flat angle. For example, as the second housing part 220 is rotated with respect to the first housing part 210 or the third housing part 230 is rotated with respect to the first housing part 210, the electronic device 101 may be changed from the first state 201 to the second state 202. For example, the state of the electronic device 101 in which the first angle 261 and/or the second angle 262 are less than a straight angle may be referred to as an in-fold state, a sub-outspread state (or a sub-fold state), an intermediate state, and/or a concave state. In the second state 202, a portion of the flexible display 271 may be folded. For example, a portion of the flexible display 271 corresponding to the first folding axis 241 and/or the second folding axis 242 may be folded at an angle corresponding to the first angle 261 and/or the second angle 262.

A third state 203 of FIG. 2A may indicate a fully folded state in which the first housing part 210, the second housing part 220, and the third housing part 230 are fully folded. For example, in the third state 203, the first angle 261 and the second angle 262 may be substantially about 0 degrees. For example, in the third state 203, the flexible display 271 may be covered by the first housing part 210, the second housing part 220, and/or the third housing part 230, and thus may not be exposed to the outside of the electronic device 101. For example, in the third state, the second housing part 220 may be positioned between the first housing part 210 and the third housing part 230. For example, in the third state 203, the cover display 272 disposed on the third housing part 230 may be exposed to the outside.

Referring to FIG. 2B, the electronic device 101' according to an embodiment may include a foldable housing 200' having a folding structure different from the folding structure of the foldable housing 200 illustrated in FIG. 2A. For example, the flexible display 271' of the electronic device 101' illustrated in FIG. 2B may be partially exposed without being completely covered by the first housing part 210', the second housing part 220', and the third housing part 230', which are folded along the first folding axis 241' and the second folding axis 242'.

For example, one side (e.g., −x directional side) of the second housing part 220' may be rotatably connected to one side (e.g., +x directional side) of the first housing part 210' with respect to the first folding axis 241'. For example, the third housing part 230' may be rotatably connected to the other side (e.g., +x directional side) of the second housing part 220' with respect to the second folding axis 242'. For example, the hinge part 250' may include a first hinge part 251' rotatably connecting one side of the second housing part 220' to one side of the first housing part 210' and a second hinge part 252' rotatably connecting the third housing part 230' to the other side of the second housing part 220'.

A fourth state 204 of FIG. 2B may indicate a fully unfolded state in which the first housing part 210', the second housing part 220', and the third housing part 230 are fully unfolded. For example, the fourth state 204 may correspond to the first state 201 of the electronic device 101 of FIG. 2A. For example, in the fourth state, the flexible display 271' may be substantially flat. For example, in the fourth state 204, the second housing part 220' may be positioned between the first housing part 210' and the third housing part 230'.

A fifth state 205 of FIG. 2B may indicate a state in which at least one of the first angle 261' or the second angle 262' is less than a flat angle. For example, as the first housing part 210' is rotated with respect to the second housing part 220' or the third housing part 230' is rotated with respect to the second housing part 220', the electronic device 101' may be changed from the fourth state 204 to the fifth state 205. For example, the fifth state 205 may be referred to as an in-fold state, a sub-outspread state (or a sub-fold state), an intermediate state, and/or a concave state. In the fifth state 205, a portion of the flexible display 271' may be folded.

A sixth state 206 of FIG. 2B may indicate a fully folded state in which the first housing part 210', the second housing part 220', and the third housing part 230' are fully folded. For example, in the sixth state 206, the first angle 261' may be substantially about 360 degrees, and the second angle 262' may be substantially about 0 degrees. For example, the sixth state 206 may be referred to as a fully folded state and/or a closed state. For example, in the sixth state 206, a portion of the flexible display 271' may be exposed to the outside of the foldable housing 200'. For example, in the sixth state 206, among the portions of the flexible display 271' disposed on the first housing part 210', the second housing part 220', and the third housing part 230', only the portion of the flexible display 271' disposed on the third housing part 230' may be exposed to the outside.

Comparing the second state 202 and the third state 203 of FIG. 2A with the fifth state 205 and the sixth state 206 of FIG. 2B, the foldable housings 200 and 200' may be folded in different manners. For example, as shown in FIG. 2A, the second housing part 220 and the third housing part 230 may be overlaid on the front surface (e.g., +z direction) with respect to the first housing part 210 located in the middle. For example, the second housing part 220 may be rotated counterclockwise with respect to the first housing part 210. For example, the third housing part 230 may be rotated clockwise with respect to the first housing part 210. In the case of the structure of the foldable housing 200 illustrated in FIG. 2A, in the fully folded state (e.g., the third state 203), a portion of the flexible display 271 may be covered by the foldable housing 200. The second housing part 220 and the third housing part 230 may be referred to as an in-fold structure, from the point of view that the second housing part 220 and the third housing part 230 are folded inward with respect to the first housing part 210 located in the middle thereof.

As illustrated in FIG. 2B, the first housing part 210' and the third housing part 230' may be overlapped in different directions with respect to the second housing part 220' positioned in the middle. For example, the first housing part 210' may be overlaid on the rear surface (e.g., in the −z direction) with respect to the second housing part 220'. For example, the third housing part 230' may be overlaid on the front surface (e.g., +z direction) with respect to the second housing part 220'. For example, the first housing part 210' and the third housing part 230' may be rotated counterclockwise with respect to the second housing part 220'. In the case of the structure of the foldable housing 200' illustrated in FIG. 2B, in the fully folded state (e.g., the sixth state 206), a portion of the flexible display 271' may be exposed to the outside of the foldable housing 200'. The first housing part 210' may be referred to as an out-fold structure from the point of view that the first housing part 210' is folded outward with respect to the second housing part 220' positioned in the middle. The third housing part 230 may be referred to as an in-fold structure from the point of view that the third housing part 230' is folded inward with respect to the second housing part 220' positioned in the middle.

Figure 3A:
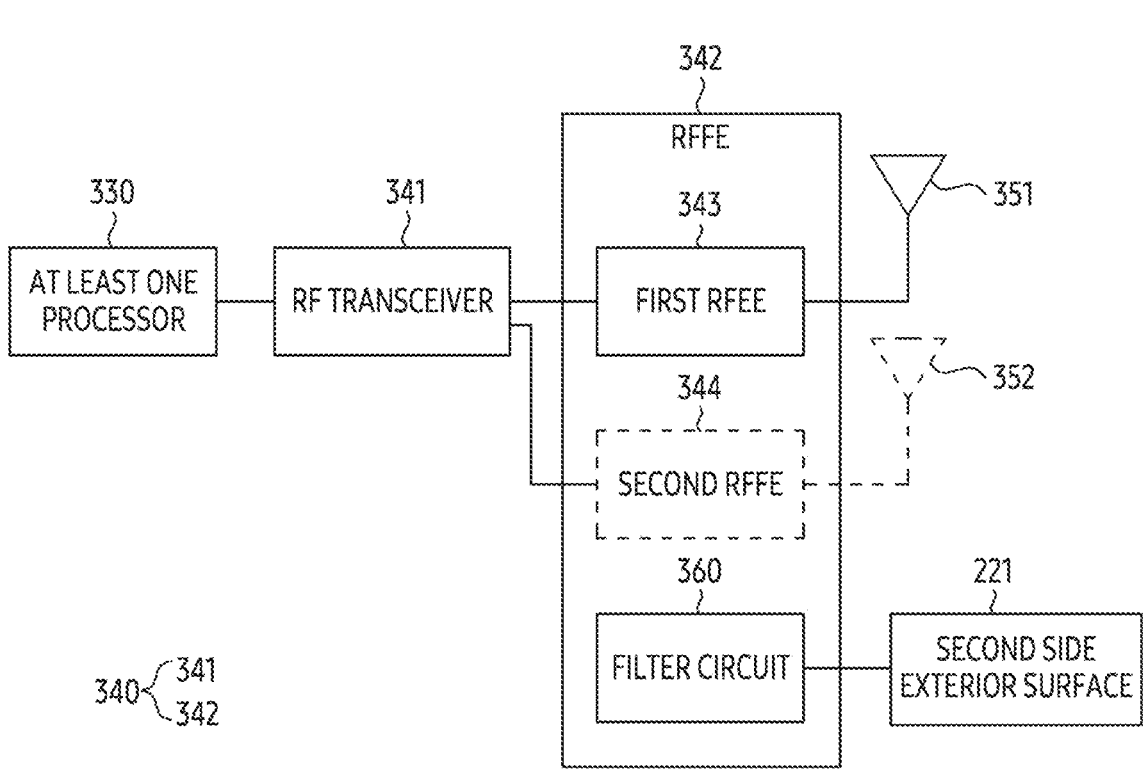
FIG. 3A is a block diagram of an electronic device according to an embodiment.
Figure 3B:
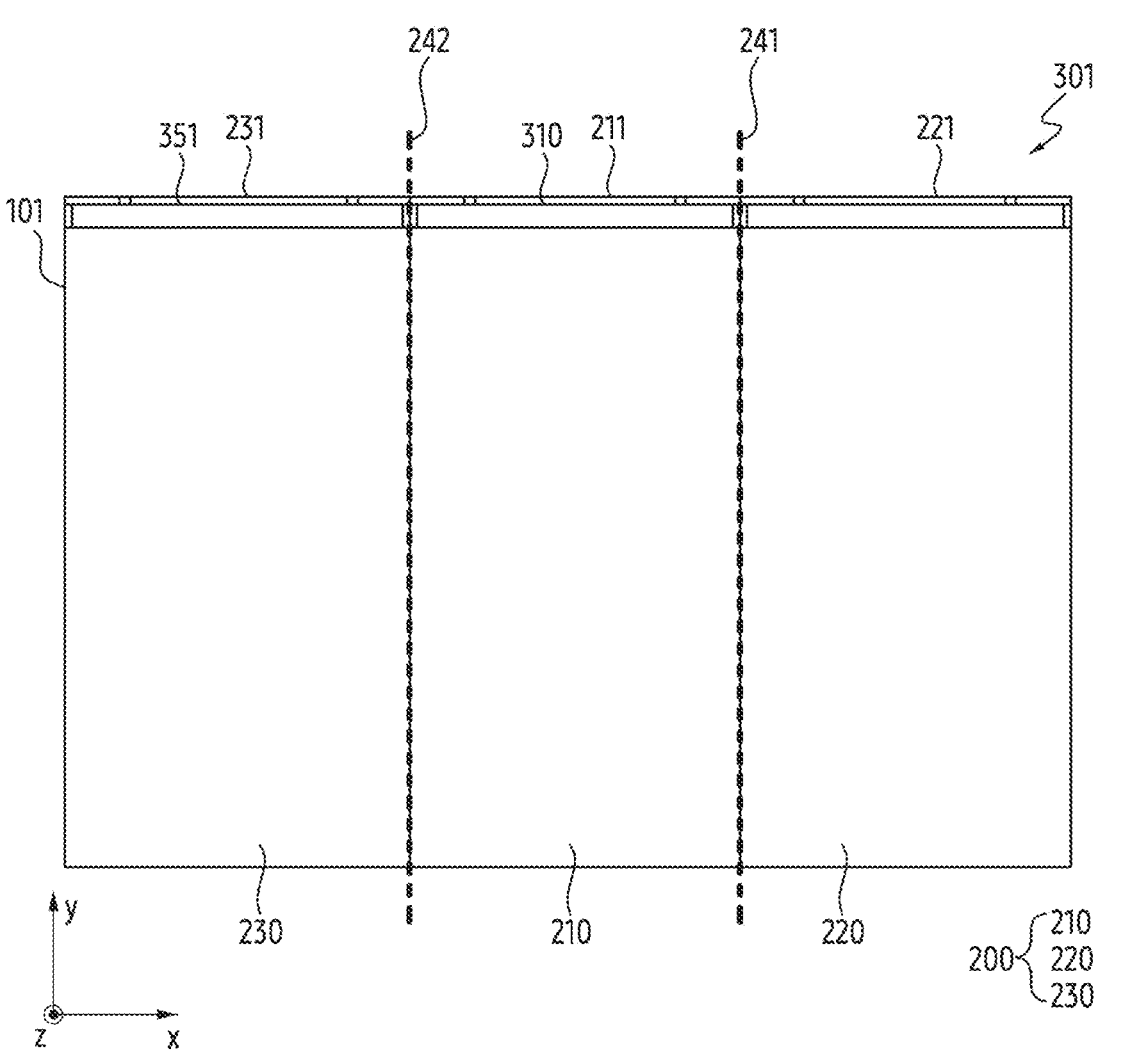
FIGS. 3B and 3C illustrates a foldable housing of an electronic device according to various embodiments.
Figure 3B:
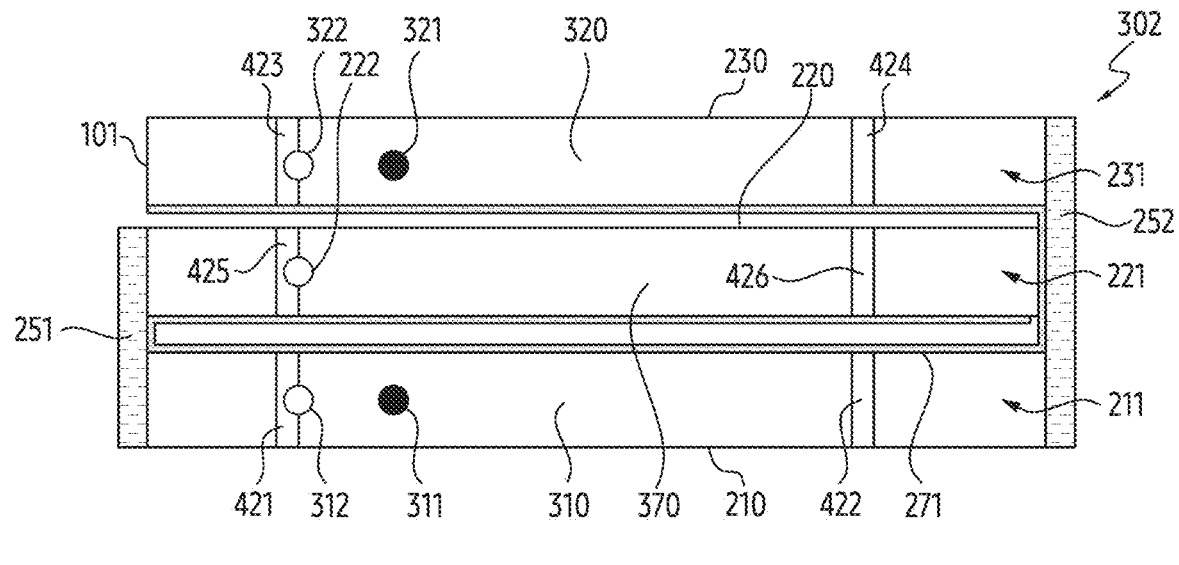
Figure 3C:
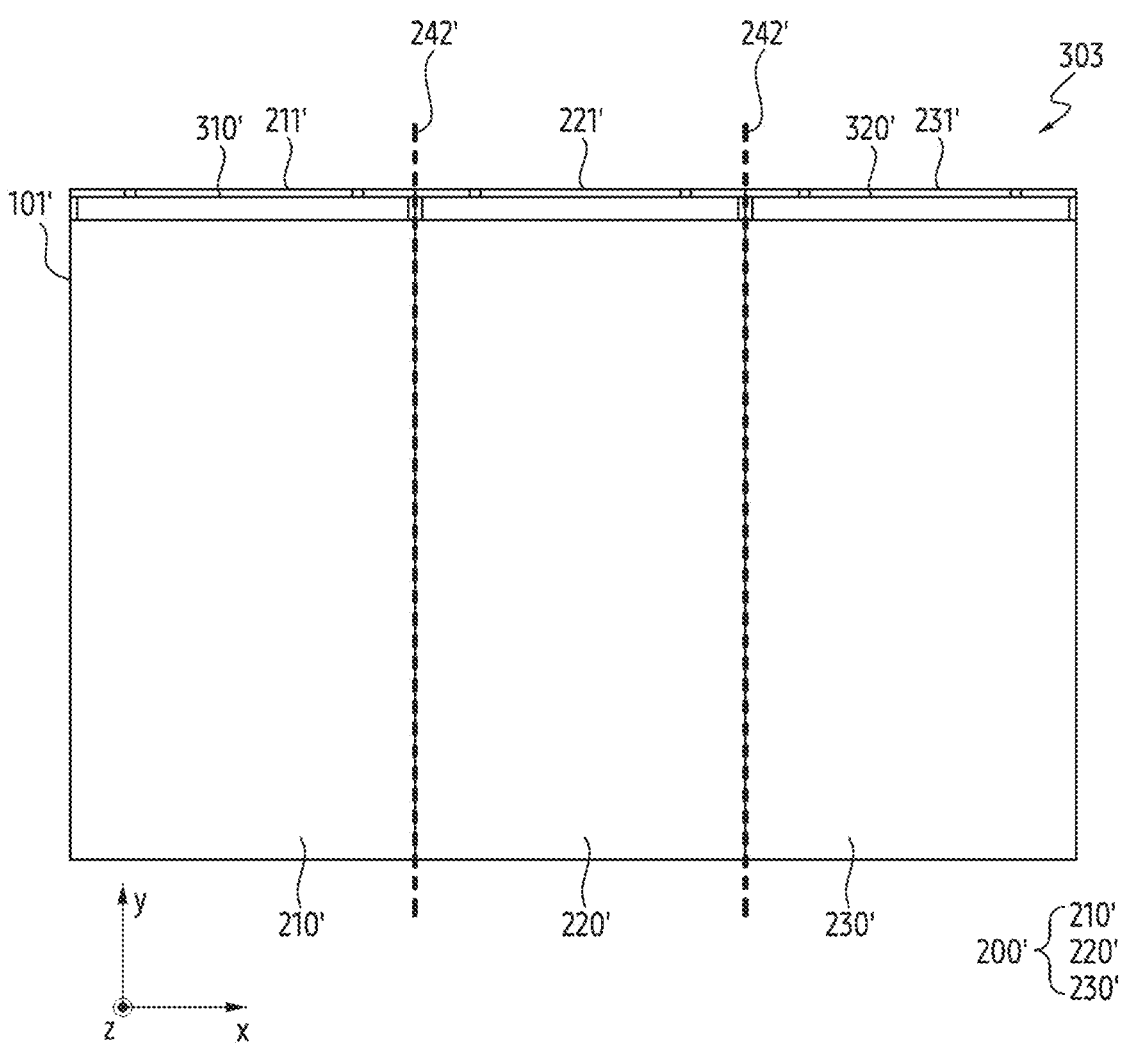
Figure 3C:
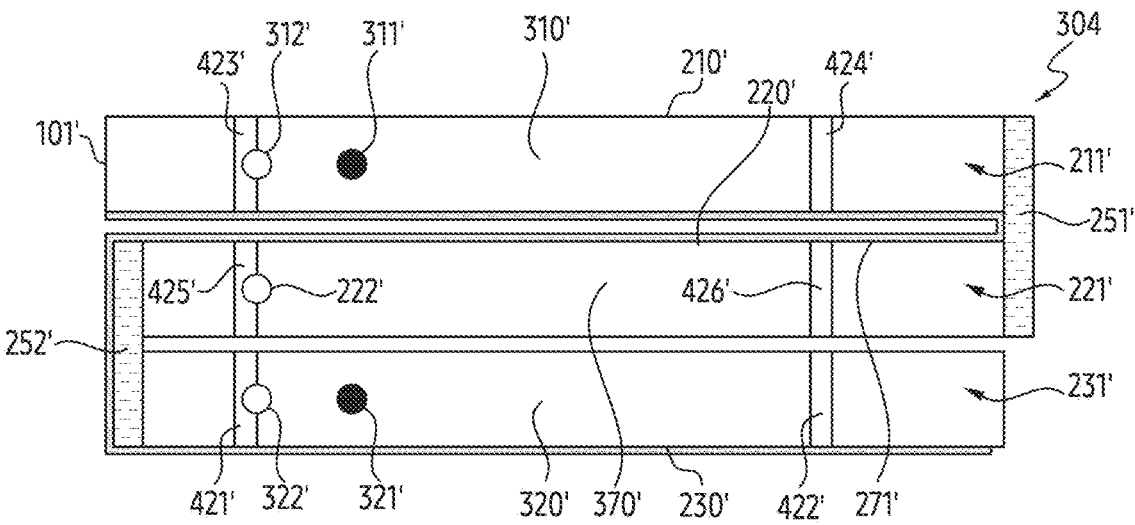

FIG. 3A is a block diagram of an electronic device according to an embodiment. FIGS. 3B and 3C illustrate a foldable housing of an electronic device according to various embodiments of the disclosure.

Referring to FIG. 3A, the electronic device 101 according to an embodiment may include at least one processor 330, a wireless communication circuit 340, a first antenna 351, a filter circuit 360, and/or a second antenna 352.

For example, the at least one processor 330 may include at least one of an application processor (AP) (e.g., the main processor 121 of FIG. 1) or a communication processor (CP) (e.g., the auxiliary processor 123 of FIG. 1). For example, the wireless communication circuit 340 may include a radio frequency (RF) transceiver 341 and a radio frequency front end (RFFE) 342.

The at least one processor 330 may generate a baseband signal. The at least one processor 330 may control the RF transceiver 341 to process the generated baseband signal. The at least one processor 330 may control the RF transceiver 341 to transmit a transmission signal via the first antenna 351 and the second antenna 352. The at least one processor 330 may control the RF transceiver 341 to transmit the transmission signal in a frequency band capable of communicating with an external electronic device.

For example, the RF transceiver 341 may be implemented as a part of a single chip (e.g., an RFIC chip) or a single package. The RF transceiver 341 may include a digital-to-analog converter (DAC) for converting a digital signal into an analog signal. The RF transceiver 341 may include a mixer for up-conversion and an oscillator (e.g., a local oscillator (LO)). The RF transceiver 341 may convert a baseband signal generated by the at least one processor 330 into an RF signal. In an embodiment, the RF transceiver 341 may include an analog-to-digital converter (ADC) for converting an analog signal into a digital signal. The RF transceiver 341 may include a mixer for down-conversion and an oscillator. The RF transceiver 341 may convert an RF signal received from the first antenna 351 and the second antenna 352 into a baseband signal so as to be processed by the at least one processor 330.

For example, the RFFE 342 may include a first RFFE 343 for the first antenna 351 and/or a second RFFE 344 for the second antenna 352. For example, the first RFFE 343 and the second RFFE 344 may include a plurality of components electrically connected between the RF transceiver 341 and the antenna (e.g., the first antenna 351 and the second antenna 352). For example, the first RFFE 343 and the second RFFE 344 may include components such as e.g., a coupler, a power amplifier (PA), a low noise amplifier (LNA), a switch circuit, and/or a duplexer, but are not limited thereto.

The first antenna 351 and the second antenna 352 may be used to transmit and/or receive signals in a designated frequency band. For example, the electronic device 101 may implement a diversity function and/or a multiple-input and multiple-output (MIMO) function using the first antenna 351 and the second antenna 352. For example, the first antenna 351 may operate as a primary antenna, and the second antenna 352 may operate as a diversity antenna. However, the disclosure is not limited thereto. For example, the electronic device 101 may include one or more additional antennas in addition to the first antenna 351 and the second antenna 352 illustrated in FIG. 3A.

The electronic device 101 illustrated in FIG. 3B may correspond to the electronic device 101 illustrated in FIG. 2A. The electronic device 101' illustrated in FIG. 3C may correspond to the electronic device 101' illustrated in FIG. 2B.

Referring to FIG. 3B, in a first state 301 (e.g., a first state 201 of FIG. 2A) in which a first housing part 210, a second housing part 220, and a third housing part 230 are unfolded, the first housing part 210 may be positioned between the second housing part 220 and the third housing part 230. In the third state 302 (e.g., the third state 203 of FIG. 2A) in which the first housing part 210, the second housing part 220, and the third housing part 230 are folded, the second housing part 220 may be positioned between the first housing part 210 and the third housing part 230.

Referring to FIG. 3C, in a fourth state 303 (e.g., a fourth state 240 of FIG. 2B) in which the first housing part 210', the second housing part 220', and the third housing part 230' are unfolded, the second housing part 220' may be positioned between the first housing part 210' and the third housing part 230'. In a sixth state 304 (e.g., a sixth state 206 of FIG. 2B) in which the first housing part 210', the second housing part 220', and the third housing part 230' are folded, the second housing part 220' may be positioned between the first housing part 210' and the third housing part 230'. Other components of the electronic device 101' illustrated in FIG. 3C may be substantially the same as those of the electronic device 101 illustrated in FIG. 3B, except for the folding structure of the foldable housing 200'.

The electronic device (101, 101') according to an embodiment may be configured to communicate with an external electronic device using an antenna. For example, a radiator for transmitting and/or receiving a signal may be formed along a portion of a side surface of the foldable housing (200, 200'). For example, the side surface of the foldable housing (200, 200') may include a plurality of conductive portions and a plurality of non-conductive portions. At least some of the plurality of conductive portions may be fed from a wireless communication circuit (e.g., the wireless communication circuit 340 of FIG. 3A) to operate as a radiator for transmitting and/or receiving a signal. The plurality of non-conductive portions may be configured to separate a conductive portion operating as a radiator among the plurality of conductive portions from other conductive portions.

Referring to FIG. 3B, the first housing part 210 may include a first side exterior surface 211 perpendicular to a folding axis (e.g., a first folding axis 241 and/or a second folding axis 242). For example, the second housing part 220 may include a second side exterior surface 221 perpendicular to the folding axis. For example, the third housing part 230 may include a third side surface 231 perpendicular to the folding axis. For example, the first side exterior surface 211, the second side exterior surface 221, and the third side surface 231 may at least partially form a side surface of an upper end (e.g., +y direction) of the foldable housing 200. However, the disclosure is not limited thereto. For example, the first side exterior surface 211, the second side exterior surface 221, and the third side surface 231 may at least partially form a side surface of a lower end (e.g., −y direction) of the foldable housing 200.

The first side exterior surface 211 may include a first conductive portion 310. For example, the first conductive portion 310 may be at least partially formed along the first side exterior surface 211. The first conductive portion 310 may be formed between a first non-conductive portion 421 and a second non-conductive portion 422 in the first side exterior surface 211. For example, the first conductive portion 310 may include a first feeding point 311 electrically connected to the wireless communication circuit 340 and a first ground point 312 electrically connected to a ground of the electronic device 101. When a feeding signal is provided from the wireless communication circuit 340 to the first feeding point 311, the first conductive portion 310 may operate as a radiator, forming an electromagnetic field for transmitting and/or receiving a wireless signal. For example, an antenna (e.g., the first antenna 351 of FIG. 3A) including at least a portion of the first conductive portion 310 may operate as an antenna for transmitting and/or receiving a signal in a designated frequency band (e.g., about 0.93 GHz). For example, the ground of the electronic device 101 electrically connected to the first ground point 312 may include a support member which is a conductive plate disposed inside the foldable housing 200, but the disclosure is not limited thereto.

The electronic device 101 may include a plurality of antennas for implementing communication diversity. For example, the third side surface 231 may include a third conductive portion 320. For example, the third conductive portion 320 may be at least partially formed along the third side surface 231. The third conductive portion 320 may be formed between a third non-conductive portion 423 and a fourth non-conductive portion 424 in the third side surface 231. For example, the third conductive portion 320 may include a second feeding point 321 electrically connected to the wireless communication circuit 340 and a second ground point 322 electrically connected to the ground of the electronic device 101. For example, an antenna (e.g., the second antenna 352 of FIG. 3A) including at least a portion of the third conductive portion 320 may operate as an antenna for transmitting and/or receiving a signal in the designated frequency band (e.g., about 0.93 GHz). The electronic device 101 according to an embodiment may implement the communication diversity by transmitting and/or receiving signals through the first antenna 351 and the second antenna 352. As illustrated in FIG. 3B, in the third state 302 in which the electronic device 101 is fully folded, the second side exterior surface 221 may be positioned between the first side exterior surface 211 and the third side surface 231. For example, in such a fully folded state of the electronic device 101, the second side exterior surface 221 approaches the first conductive portion 310 and/or the third conductive portion 320 operating as a radiator, and thus the second side exterior surface 221 may affect the communication performance of the electronic device 101. For example, the second side exterior surface 221 may affect the efficiency of the antenna (e.g., the first antenna 351) including at least a portion of the first conductive portion 310 and/or the efficiency of the antenna (e.g., the second antenna 352) including at least a portion of the third conductive portion 320.

For example, a current flow may be formed along the second side exterior surface 221. In case where the direction of the current flowing along the second side exterior surface 221 is opposite to the direction of radiation current flowing along the first conductive portion 310 and/or the third conductive portion 320, some degradation in efficiency of the first antenna 351 and/or the second antenna 352 may be caused.

The current flow formed on the second side exterior surface 221 may cause a parasitic effect. For example, the second side exterior surface 221 may include a second conductive portion 370 including a conductive material (e.g., metal). The second conductive portion 370 may be formed between a fifth non-conductive portion 425 and a sixth non-conductive portion 426 in the second side exterior surface 221. The flow of current flowing along the second conductive portion 370, which is a conductor, may cause a parasitic resonance by forming a virtual impedance such as resistance, inductance, and/or capacitance around the first conductive portion 310 and/or the third conductive portion 320 operating as a radiator. When the frequency characteristic of the parasitic resonance corresponds to or is similar to the frequency characteristic of the first antenna 351 and/or the second antenna 352, a signal in a frequency band to be transmitted and/or received through the first antenna 351 and/or the second antenna 352 may be interfered by the parasitic resonance, thereby causing degradation in efficiency of the first antenna 351 and/or the second antenna 352. For example, the operating frequency of the first antenna 351 and/or the second antenna 352 may include a signal in a frequency of about 0.93 GHz, and the parasitic resonance frequency caused by the structure of the foldable housing 200 may be about 1.1 GHz. However, it is not limited thereto. The parasitic resonance generated by the structure of the foldable housing 200 may cause degradation in efficiency of the first antenna 351 and/or the second antenna 352.

The electronic device 101 according to an embodiment may include a filter circuit (e.g., the filter circuit 360 of FIG. 3A) for reducing degradation in efficiency of the first antenna 351 and/or the second antenna 352. For example, the filter circuit 360 may be electrically connected to a portion 222 in the second side exterior surface 221. For example, the filter circuit 360 may be disposed on a printed circuit board disposed inside the second housing part 220. For example, the filter circuit 360 may be electrically connected to the portion 222 of the second side exterior surface 221 through a conductive connection member (e.g., a C-clip).

For example, the filter circuit 360 may electrically connect the second side exterior surface 221 to the ground. As the portion 222 in the second side exterior surface 221 electrically connected to the filter circuit 360 is electrically connected to the ground, the flow of current flowing along the second side exterior surface 221 may be adjusted. For example, the direction in which the current flows may be adjusted according to a position of the portion 222. For example, the portion 222 to which the filter circuit 360 is electrically connected may be determined such that the direction of the current flowing along the second side exterior surface 221 corresponds to the direction of the radiation current formed along the first conductive portion 310 and/or the third conductive portion 320. For example, the portion 222 may be positioned on the path through which the current forming the parasitic resonance is transmitted to the second side exterior surface 221, thereby adjusting the direction of the current formed along the second side exterior surface 221 and providing the current to the ground.

The portion 222 to which the first feeding point 311, the first ground point 312, the second feeding point 321, the second ground point 322, and the filter circuit 360 are electrically connected may be positioned in a segmented structure of the foldable housing 200 formed by a plurality of conductive portions and a plurality of non-conductive portions. For example, the first feeding point 311 and the first ground point 312 may be positioned in the first conductive portion 310 formed between the first non-conductive portion 421 and the second non-conductive portion 422. For example, the second feeding point 321 and the second ground point 322 may be positioned in the third conductive portion 320 formed between the third non-conductive portion 423 and the fourth non-conductive portion 424. For example, the portion 222 may be positioned in the second conductive portion 370 formed between the fifth non-conductive portion 425 and the sixth non-conductive portion 426.

For example, the filter circuit 360 may be configured to pass a signal in a parasitic resonance frequency band caused by the structure of the foldable housing 200. The filter circuit 360 may be configured to pass a signal corresponding to a predefined frequency range. The predefined frequency range may include the parasitic resonance frequency. For example, the filter circuit 360 may include a bandpass filter configured to pass a signal in the parasitic resonance frequency (e.g., about 1.1 GHz) band caused by the structure of the foldable housing 200, but it is not limited thereto. For example, the bandpass filter may be an LC filter including a capacitor and/or an inductor. For example, as the filter circuit 360 passes a signal in the parasitic resonance frequency band, interference of the parasitic resonance to the operating frequency of the first antenna 351 and/or the second antenna 352 may be reduced. Since the filter circuit 360 is configured to pass a signal in the parasitic resonance frequency, the signal in the frequency band (e.g., about 0.93 GHz) transmitted and/or received through the first antenna 351 including at least a portion of the first conductive portion 310 and/or the second antenna 352 including at least a portion of the third conductive portion 320 may not be provided to the second conductive portion 370. From the viewpoint of the filter circuit 360 blocking the signal in the operating frequency (e.g., about 0.93 GHz) of the first antenna 351 and/or the second antenna 352 different from the predefined frequency range (e.g., about 1.1 GHz), the filter circuit 360 may function as a notch filter for the operating frequency.

For example, the filter circuit 360 may be one or more. For example, the electronic device 101 may include another filter circuit electrically connected to another point of the second side exterior surface 221. When there are various parasitic resonances caused by the foldable structure, the electronic device 101 may include one or more other filter circuits for passing signals in each parasitic resonance frequency.

The description of the electronic device 101 of FIG. 3B described above may be applied substantially the same to the electronic device 101' illustrated in FIG. 3C.

Referring to FIG. 3C, the foldable housing 200' may include a first side exterior surface 211', a second side exterior surface 221', and a third side surface 231'. For example, the first side exterior surface 211' may include a first conductive portion 310' formed between a first non-conductive portion 421' and a second non-conductive portion 422'. For example, the first conductive portion 310' may include a first feeding point 311' electrically connected to the wireless communication circuit 340 and a first ground point 312' electrically connected to the ground of the electronic device 101'. For example, the third side surface 231' may include a third conductive portion 320' formed between a third non-conductive portion 423' and a fourth non-conductive portion 424'. For example, the third conductive portion 320' may include a second feeding point 321' electrically connected to the wireless communication circuit 340 and a second ground point 322' electrically connected to the ground of the electronic device 101'. For example, the second side exterior surface 221' may include a second conductive portion 370' formed between a fifth non-conductive portion 425' and a sixth non-conductive portion 426'. For example, a portion 222' electrically connected to the filter circuit 360 may be positioned in the second conductive portion 370'. The following descriptions of the electronic device 101 may be applied substantially in the same manner to the electronic device 101' illustrated in FIG. 3C.

Figure 4A:
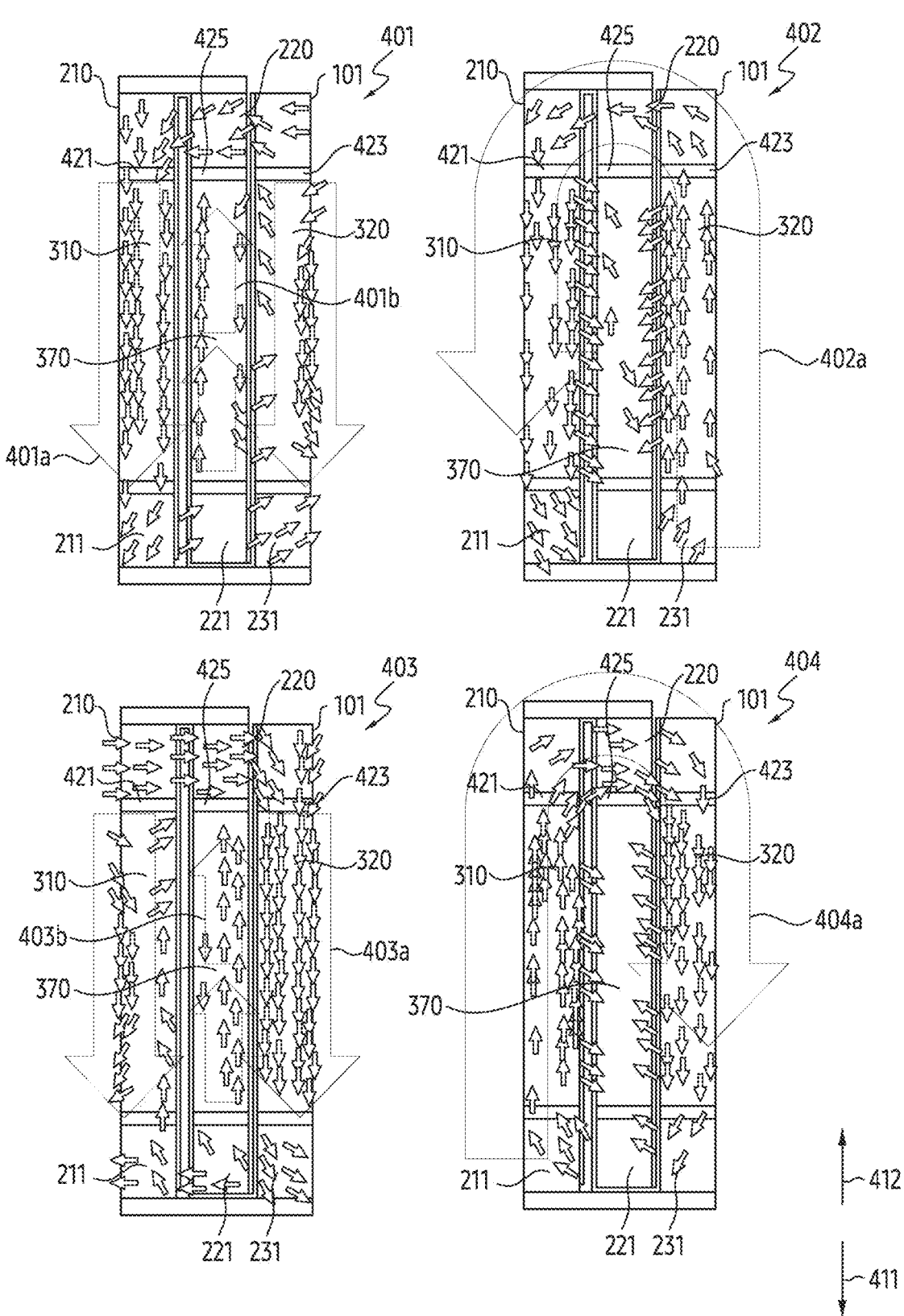
FIG. 4A illustrates current flows formed on a side surface of an electronic device including no filter circuit.
Figure 4B:
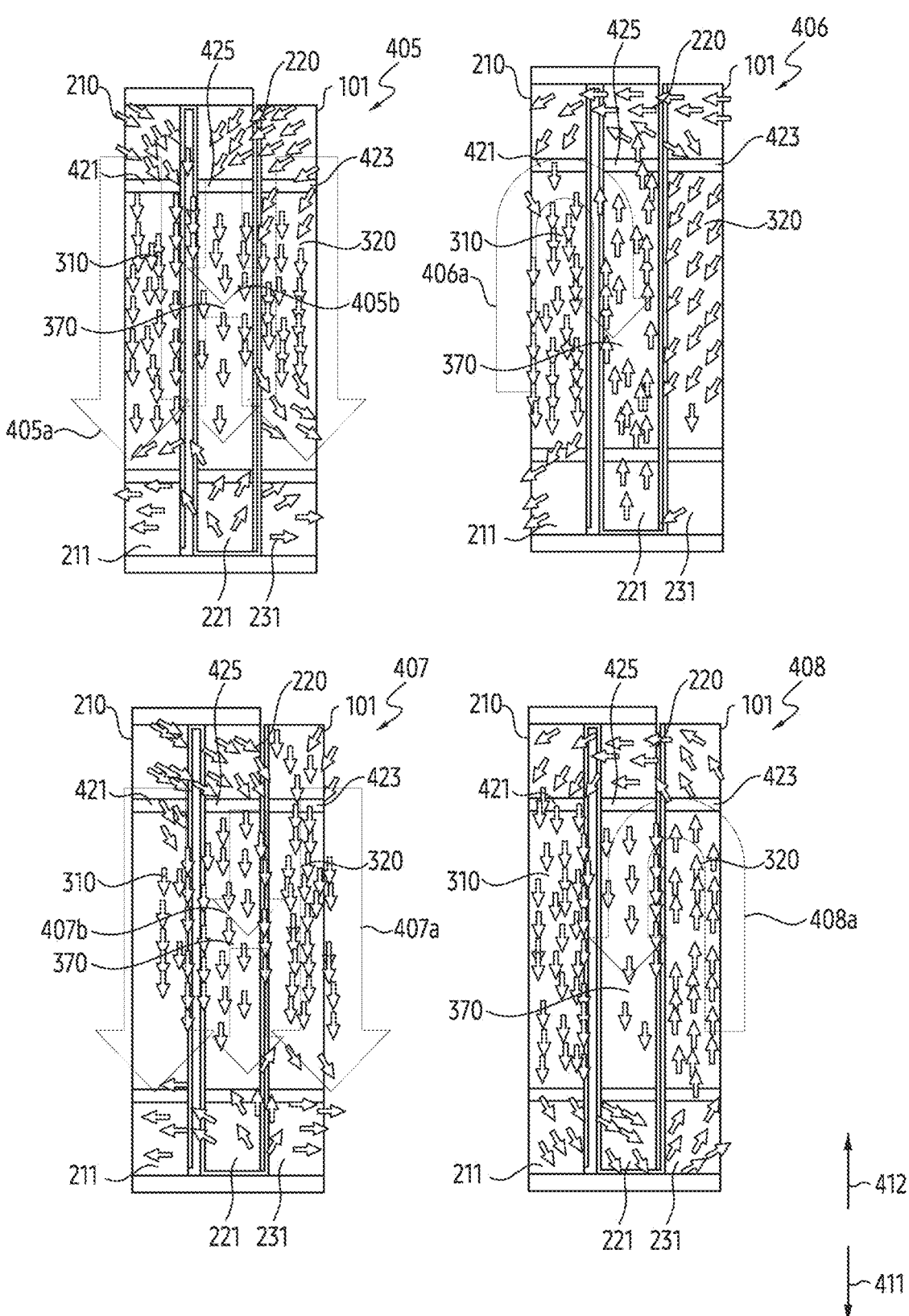
FIG. 4B illustrates current flows formed on a side surface of an electronic device including a filter circuit according to an embodiment.

FIG. 4A illustrates examples of current flows formed on a side surface of an electronic device including no filter circuit. FIG. 4B illustrates examples of current flows formed on a side surface of an electronic device including a filter circuit according to an embodiment.

Referring to FIGS. 4A and 4B, the electronic device 101 may include a first conductive portion 310 formed along at least a portion of a first side exterior surface 211, a second conductive portion 370 formed along at least a portion of the second side exterior surface 221, and a third conductive portion 320 formed along at least a portion of the third side surface 231. In a fully folded state of the electronic device 101, the second side exterior surface 221 may be positioned between the first side exterior surface 211 and the third side surface 231. For example, in the state in which the first housing part 210, the second housing part 220, and the third housing part 230 are folded, the second side exterior surface 221 may overlap the first side exterior surface 211 and/or the third side surface 231.

The electronic device 101 may include a first antenna and/or a second antenna. For example, the first antenna may include at least a portion of the first conductive portion 310. For example, the second antenna may include at least a portion of the third conductive portion 320. For example, in the folded state of the first housing part 210, the second housing part 220, and the third housing part 230, the first housing part 210 and the third housing part 230 may be positioned outside the electronic device 101. The first antenna may include at least a portion of the first conductive portion 310 formed in the first housing part 210 positioned outside the electronic device 101. For example, the second antenna may include at least a portion of the third conductive portion 320 formed in the third housing part 230 positioned outside the electronic device 101.

States 401 and 402 of FIG. 4A illustrate current flows formed on a side surface of the electronic device 101 that does not include a filter circuit (e.g., a filter circuit 360 of FIG. 3A) when a feeding is applied to the first conductive portion 310 in the fully folded state. For example, the state 401 of FIG. 4A illustrates a flow 401a of radiation current forming an electromagnetic field for transmitting and/or receiving a signal in a designated frequency when the signal in the designated frequency is fed to the first conductive portion 310. For example, the state 402 of FIG. 4A illustrates a flow 402a of a current generating a parasitic resonance different from the designated frequency. States 403 and 404 of FIG. 4A illustrate current flows formed on the side surface of the electronic device 101 that does not include the filter circuit 360 when a feeding is applied to the third conductive portion 320 in the fully folded state. For example, the state 403 of FIG. 4A illustrates a flow 403a of radiation current generating an electromagnetic field for transmitting and/or receiving a signal in a designated frequency when the signal in the designated frequency is fed to the third conductive portion 320. For example, the state 404 of FIG. 4A illustrates a flow 404a of a current forming a parasitic resonance different from the designated frequency.

For example, the wireless communication circuit 340 may be configured to transmit and/or receive a signal in a designated frequency (e.g., about 0.93 GHz) through the first antenna and/or the second antenna. For example, the wireless communication circuit 340 may feed power to a first feeding point (e.g., the first feeding point 311 of FIG. 3B) of the first conductive portion 310 and/or a second feeding point (e.g., the second feeding point 321 of FIG. 3B) of the third conductive portion 320, in order to transmit and/or receive a signal in the designated frequency.

Referring to the state 401 of FIG. 4A, as power is provided to the first feeding point 311, a flow 401a of radiation current forming an electromagnetic field for transmitting and/or receiving a signal in the designated frequency band may be formed along the first conductive portion 310. For example, the flow 401a of the radiation current may be formed in the first direction 411. When the flow 401a of the radiation current is formed along the first conductive portion 310, a flow 401b of the reverse current flowing in the second direction 412 opposite to the first direction 411 may be formed along the second side exterior surface 221, due to a relative potential difference caused by the radiation current. The flow 401b of the reverse current may cause energy loss in the radiation current, thereby deteriorating the efficiency of the first antenna.

Referring to the state 402 of FIG. 4A, the flow 402a of the current forming the parasitic resonance may be formed from an end of the third conductive portion 320 having a strong electromagnetic field to an end of the first conductive portion 310. For example, the flow 402*a* of the current forming the parasitic resonance may flow from the third conductive portion 320 to the first conductive portion 310 through the second side exterior surface 221. For example, the current flow 402*a* may be formed from a partial area of the third side surface 231 including the third non-conductive portion 423, passing through a partial area of the second side exterior surface 221 including the fifth non-conductive portion 425, to a partial area of the first side exterior surface 211 including the first non-conductive portion 421. The current flow 402*a* may cause an electromagnetic field forming a parasitic resonance to be generated.

Referring to 403 of FIG. 4A, as power is fed to the second feeding point 321, a flow 403*a* of radiation current forming an electromagnetic field for transmitting and/or receiving a signal in a designated frequency band may be formed along the third conductive portion 320. For example, the flow 403*a* of the radiation current may be formed in the first direction 411. When the flow of the radiation current 403*a* is formed along the third conductive portion 320, a flow 403*b* of reverse current flowing in the second direction 412 opposite to the first direction 411 may be formed along the second side exterior surface 221. The flow 403*b* of the reverse current may cause energy loss in the radiation current, thereby deteriorating the efficiency of the second antenna.

Referring to a state 404 of FIG. 4A, a flow 404*a* of the current generating the parasitic resonance may be formed from an end of the first conductive portion 310 having a strong electromagnetic field to an end of the third conductive portion 320. For example, the flow 404*a* of the current forming the parasitic resonance may flow from the first conductive portion 310 through the second side exterior surface 221 to the third conductive portion 320. For example, the current flow 404*a* may be provided from a partial area of the first side exterior surface 211 including the first non-conductive portion 421, through a partial area of the second side exterior surface 221 including the fifth non-conductive portion 425, to a partial area of the third side surface 231 including the third non-conductive portion 423. An electromagnetic field forming a parasitic resonance may be caused by the current flow 404*a*. For example, when the parasitic resonance frequency (e.g., 1.1 GHz) corresponds to or is similar to the designated frequency, a signal in the parasitic resonance frequency may interfere with the first antenna and/or the second antenna, thereby resulting in deteriorated efficiency of the first antenna and/or the second antenna.

Referring to FIG. 4B, when the electronic device 101 includes a filter circuit (e.g., a filter circuit 360 of FIG. 3A) electrically connecting the second side exterior surface 221 to the ground, degradation in communication performance due to the reverse current and parasitic resonance may be reduced.

States 405 and 406 of FIG. 4B illustrate a current formed on a side surface of the electronic device 101 including the filter circuit 360 when the first conductive portion 310 is fed with power in a fully folded state. For example, the state 405 of FIG. 4B illustrates a flow 405*a* of radiation current forming an electromagnetic field for transmitting and/or receiving a signal in a designated frequency, when the signal in the designated frequency is fed to the first conductive portion 310. For example, the state 406 of FIG. 4B illustrates a flow 406*a* of a current forming a parasitic resonance different from the designated frequency. States 407 and 408 of FIG. 4B illustrate current flows formed on the side surface of the electronic device 101 including the filter circuit (e.g., the filter circuit 360 of FIG. 3A), when the third conductive portion 320 is fed with power in the fully folded state. For example, the state 407 of FIG. 4B illustrates a flow 407*a* of radiation current forming an electromagnetic field for transmitting and/or receiving the signal in the designated frequency when the signal in the designated frequency is fed to the third conductive portion 320. For example, the state 408 of FIG. 4B illustrates a flow 408*a* of a current forming a parasitic resonance different from the designated frequency.

Referring to the state 405 of FIG. 4B, as power is fed to the first feeding point 311, the flow 405*a* of radiation current forming an electromagnetic field for transmitting and/or receiving a signal in the designated frequency band may be formed along the first conductive portion 310. For example, the flow 405*a* of the radiation current may be formed in the first direction 411. For example, when the flow 405*a* of the radiation current is formed along the first conductive portion 310, the flow 405*b* of the current formed on the second side exterior surface 221 may be directed in the first direction 411 by the filter circuit 360. Referring to the state 407 of FIG. 4B, as power is fed to the second feeding point 321, the flow 407*a* of radiation current forming an electromagnetic field for transmitting and/or receiving a signal in the designated frequency band may be formed along the third conductive portion 320. For example, the flow 407*a* of the radiation current may flow in the first direction 411. For example, when the flow 407*a* of the radiation current is formed along the third conductive portion 320, the flow 407*b* of the current formed on the second side exterior surface 221 may be directed in the first direction 411 by the filter circuit 360.

The filter circuit 360 may control such that a phase of the current formed on the second side exterior surface 221 is the same as a phase of the current formed on the first conductive portion 310 and/or the third conductive portion 320, by electrically connecting the second side exterior surface 221 to the ground. For example, as the current flows 405*a* and 407*a* formed in the second side exterior surface 221 flow in the same direction as the current flows 405*b* and 407*b* formed in the third conductive portion 320, energy loss due to the reverse current may be reduced.

Referring to the 406 of FIG. 4B, the flow 406*a* of the current forming the parasitic resonance may be formed from the first conductive portion 310 to the second side exterior surface 221. When the flow 406*a* of the current forming the parasitic resonance is formed from the first conductive portion 310 to the second side exterior surface 221, the flow 406*a* of the current may be formed along the second side exterior surface 221 by the filter circuit 360 electrically connecting the second side exterior surface 221 to the ground. For example, the portion 222 in the second side exterior surface 221 electrically connected to the filter circuit 360 may be positioned on a path through which the flow 406*a* of the current forming the parasitic resonance is provided from the first conductive portion 310 to the second side exterior surface 221. As the portion 222 is positioned on the path, the current flow 406*a* may be formed along the second side exterior surface 221 without flowing to the third conductive portion 320 through the second side exterior surface 221.

Referring to the state 408 of FIG. 4B, the flow 408*a* of the current forming the parasitic resonance may be formed from the third conductive portion 320 to the second side exterior surface 221. For example, when the flow 408*a* of the current forming the parasitic resonance is formed from the third conductive portion 320 to the second side exterior surface 221, the flow 408*a* of the current may be formed along the second side exterior surface 221 by the filter circuit 360 electrically connecting the second side exterior surface 221 to the ground. For example, the portion 222 in the second side exterior surface 221 electrically connected to the filter circuit 360 may be positioned on a path through which the flow 408a of the current forming the parasitic resonance is provided from the third conductive portion 320 to the second side exterior surface 221. As the portion 222 is positioned on the path, the current flow 408a may be formed along the second side exterior surface 221 without flowing to the first conductive portion 310 through the second side exterior surface 221.

The filter circuit 360 may be configured to pass a signal corresponding to a predefined frequency range. For example, the filter circuit 360 may include a bandpass filter configured to pass a signal in a parasitic resonance frequency. For example, the filter circuit 360 may include a capacitor having a capacitance value for passing a signal in a parasitic resonance frequency and/or an inductor having an inductance value therefor. For example, the filter circuit 360 may include the capacitor having a value of about 3 pF and the inductor having a value of about 6.8 nF, in order to pass a signal in a frequency of about 1.1 GHz but the disclosure is not limited thereto.

As illustrated in FIG. 4B, when the electronic device 101 includes the filter circuit 360 electrically connected to the portion 222 in the second side exterior surface 221 to electrically connect the second side exterior surface 221 to the ground, a reverse current formed by radiation current for a signal in the frequency (e.g., 0.93 GHz) to be transmitted and/or received through the first antenna and/or the second antenna may be improved. For example, the filter circuit 360 may be configured to pass a signal in the parasitic resonance frequency and block a signal in an operating frequency, thereby reducing degradation in efficiency of the first antenna and/or the second antenna due to the signal in the parasitic resonance frequency.

Figure 5A:
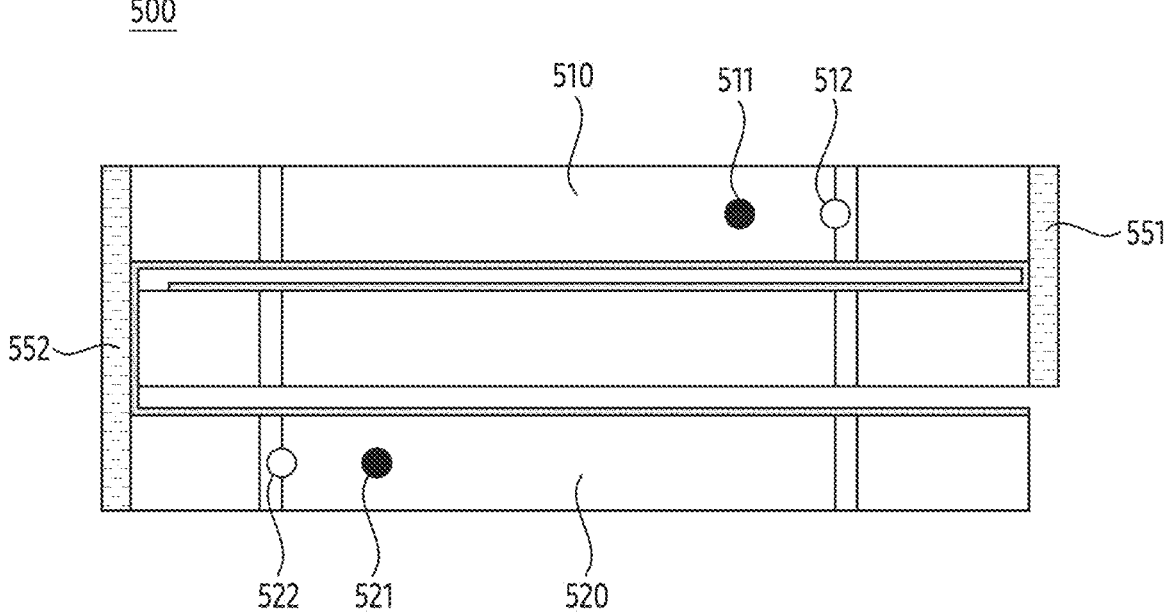
FIG. 5A illustrates a side surface of an electronic device according to a comparative example.
Figure 5B:
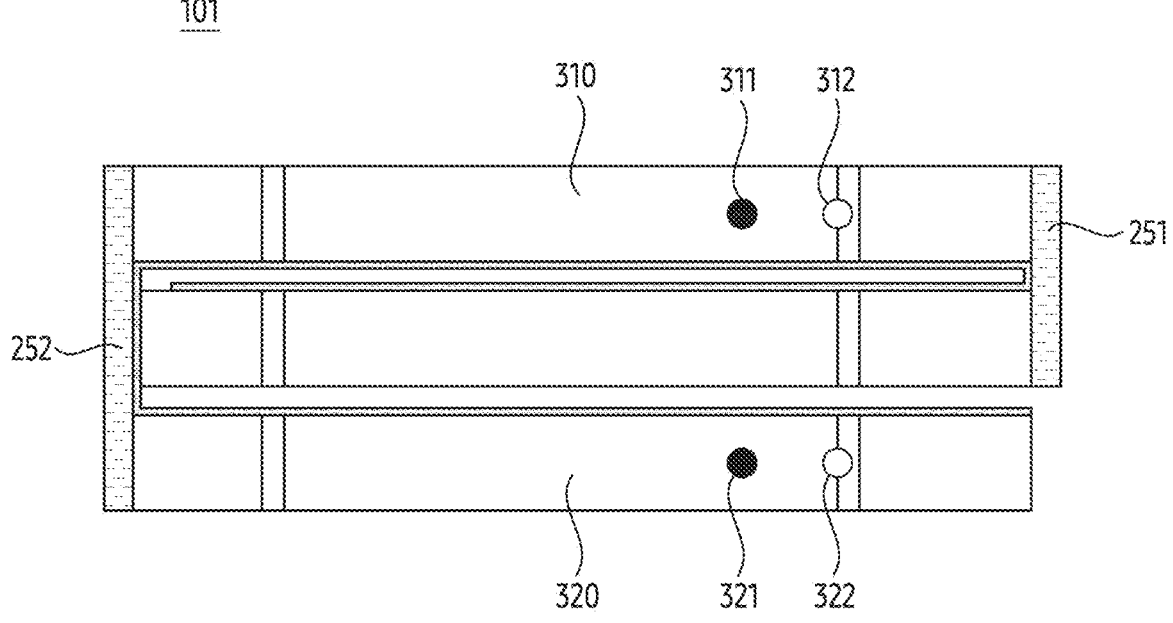
FIG. 5B illustrates a side surface of an electronic device according to an embodiment.
Figure 5C:
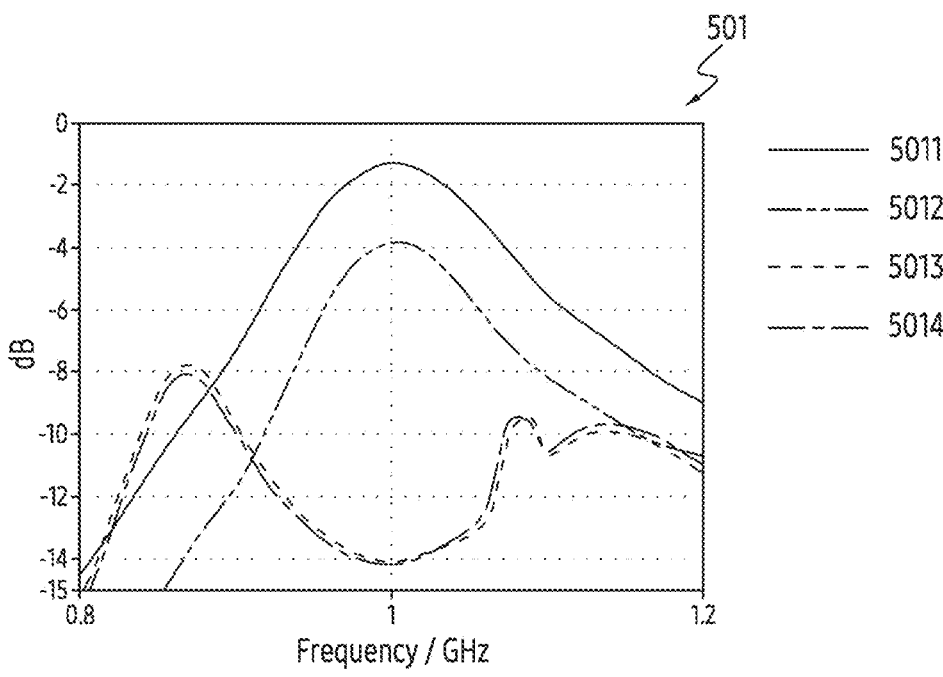
FIG. 5C is a graph illustrating efficiency of an antenna.
Figure 5C:
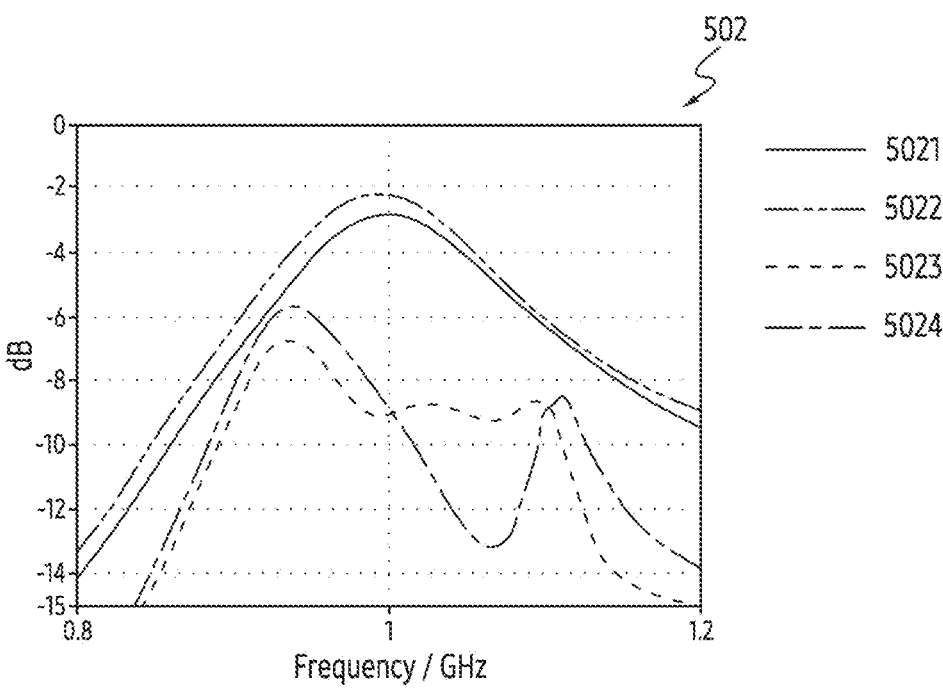

FIG. 5A illustrates a side surface of an electronic device according to a comparative example. FIG. 5B illustrates a side surface of an electronic device according to an embodiment. FIG. 5C is a graph representing efficiency of an antenna.

Referring to FIG. 5A, an electronic device 500 according to the comparative example may include a first antenna including a first conductive portion 510 and a second antenna including a third conductive portion 520. For example, the first conductive portion 510 may include a first feeding point 511 and a first ground point 512. For example, the third conductive portion 520 may include a second feeding point 521 and a second ground point 522. For example, the positions of the first feeding point 511 and the first ground point 512 may be misaligned with the positions of the second feeding point 521 and the second ground point 522. For example, the first feeding point 511 and the first ground point 512 may be closer to the first hinge part 551 of the first hinge part 551 and the second hinge part 552. For example, the second feeding point 521 and the second ground point 522 may be closer to the second hinge part 552 of the first hinge part 551 and the second hinge part 552.

Referring to FIG. 5B, the electronic device 101 according to an embodiment may include a first antenna including a first conductive portion 310 and a second antenna including a third conductive portion 320. For example, the first conductive portion 310 may include a first feeding point 311 and a first ground point 312. For example, the third conductive portion 320 may include a second feeding point 321 and a second ground point 322. For example, the positions of the first feeding point 311 and the first ground point 312 may be substantially aligned with the positions of the second feeding point 321 and the second ground point 322. For example, when the first side exterior surface 211, the second side exterior surface 221, and the third side surface 231 are viewed from the front, the first feeding point 311 may be substantially aligned with the second feeding point 321. When the first side exterior surface 211, the second side exterior surface 221, and the third side surface 231 are viewed from the front, the first ground point 312 may be substantially aligned with the second ground point 322. For example, the first feeding point 311 and the first ground point 312 may be symmetrical to the second feeding point 321 and the second ground point 322 with respect to the second side exterior surface 221, respectively.

Referring to FIG. 5C, the efficiency of the antenna of the electronic device 500 according to the comparative example may be compared with the efficiency of the antenna of the electronic device 101 according to an embodiment. A state 501 of FIG. 5C is a graph illustrating the efficiency of the first antenna and the efficiency of the second antenna according to frequencies with respect to the electronic device 500 according to the comparative example illustrated in FIG. 5A. The x-axis of the graph represents the frequency (unit: GHz (giga hertz)), and the y-axis of the graph represents the efficiency (unit: dB (decibel)).

The first graph 5011 of the state 501 shows the efficiency of the first antenna in the fully unfolded state. The second graph 5012 of the state 501 shows the efficiency of the second antenna in the fully unfolded state. The third graph 5013 of the state 501 shows the efficiency of the first antenna in the fully folded state. The fourth graph 5014 of the state 501 shows the efficiency of the second antenna in the fully folded state.

Referring to state 501 of FIG. 5C, as the electronic device 500 according to the comparative example is changed from the fully unfolded state to the fully folded state, the efficiency of the first antenna and the efficiency of the second antenna may decrease. For example, for a signal of about 1 GHz frequency, the efficiency of the first antenna may decrease from about −1 dB to about −14 dB according to the change in the state. For example, for the signal of about 1 GHz frequency, the efficiency of the second antenna may decrease from about −4 dB to about −14 dB according to the change in the state.

A state 502 of FIG. 5C is a graph illustrating the efficiency of the first antenna and the efficiency of the second antenna according to frequencies with respect to the electronic device 101 according to an embodiment illustrated in FIG. 5B. The x-axis of the graph represents the frequency (unit: GHz), and the y-axis of the graph represents the efficiency (unit: dB).

The first graph 5021 of the state 502 shows the efficiency of the first antenna in the fully unfolded state. The second graph 5022 of the state 502 shows the efficiency of the second antenna in the fully unfolded state. The third graph 5023 of the state 502 shows the efficiency of the first antenna in the fully folded state. The fourth graph 5024 of the state 502 shows the efficiency of the second antenna in the fully folded state.

Referring to the state 502 of FIG. 5C, as the electronic device 101 according to an embodiment is changed from the fully unfolded state to the fully folded state, the efficiency of the first antenna and the efficiency of the second antenna may decrease. For example, for the signal of about 1 GHz frequency, the efficiency of the first antenna may be lowered from about −2 dB to about −9 dB according to the change in the state. For example, for the signal of about 1 GHz frequency, the efficiency of the second antenna may be lowered from about −2 dB to about −9 dB according to the change in the state.

Comparing the states 501 and 502 of FIG. 5C, the degradation in efficiency of the first antenna and the second antenna according to the change in the state may be improved. For example, the amount of degradation in efficiency of the first antenna and the second antenna of the electronic device 101 according to an embodiment may be less than that of the degradation in efficiency of the first antenna and the second antenna according to the comparative example. For example, in the electronic device 500 according to the comparative example, the amount of the degradation in efficiency of the first antenna and the second antenna may be about −10 dB to about −13 dB. For example, in the electronic device 101 according to an embodiment, the amount of degradation in efficiency of the first antenna and the second antenna may be about −7 dB. In case where the first feeding point 311 is substantially aligned with the second feeding point 321 and/or the first ground point 312 is substantially aligned with the second ground point 322, the amount of degradation in efficiency of the first antenna and the second antenna may be reduced as the electronic device 101 according to an embodiment is changed from the fully unfolded state to the fully folded state, and thus the degradation in communication performance of the electronic device 101 may decrease.

Figure 6A:
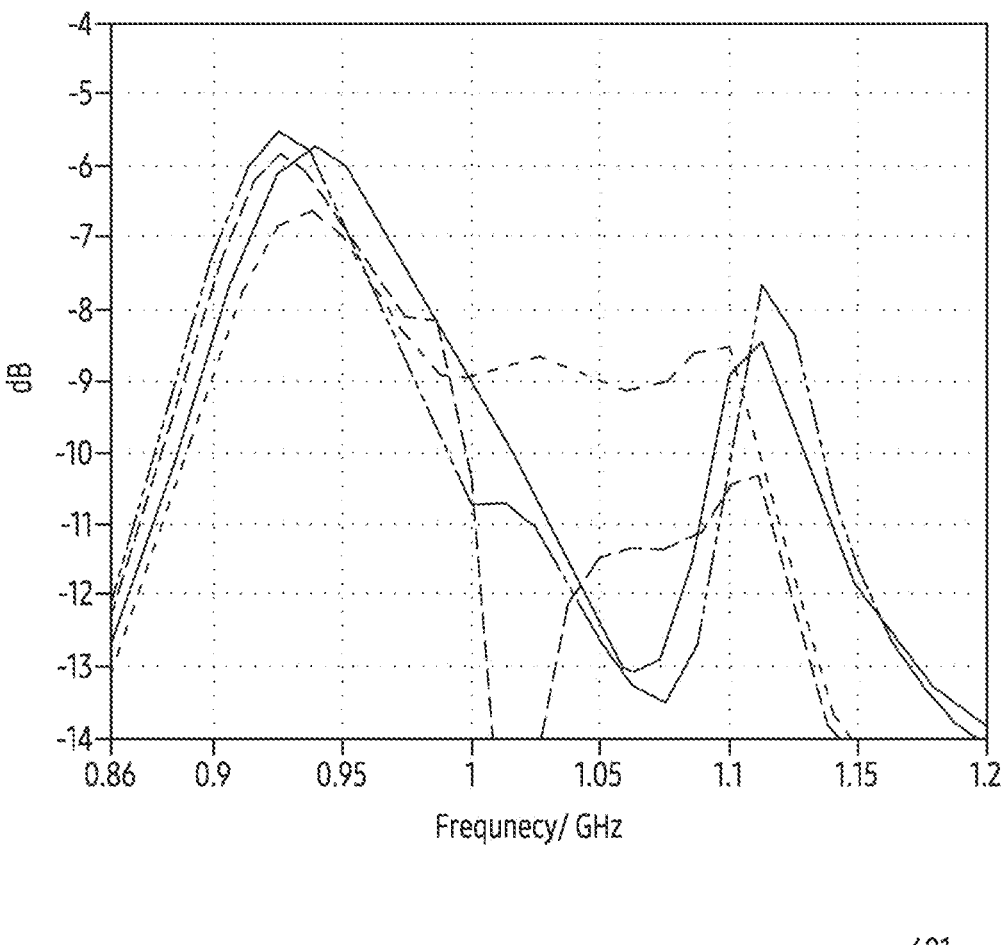
FIG. 6A is a graph for identifying a difference in radiation efficiency of an antenna by a filter circuit.
Figure 6B:
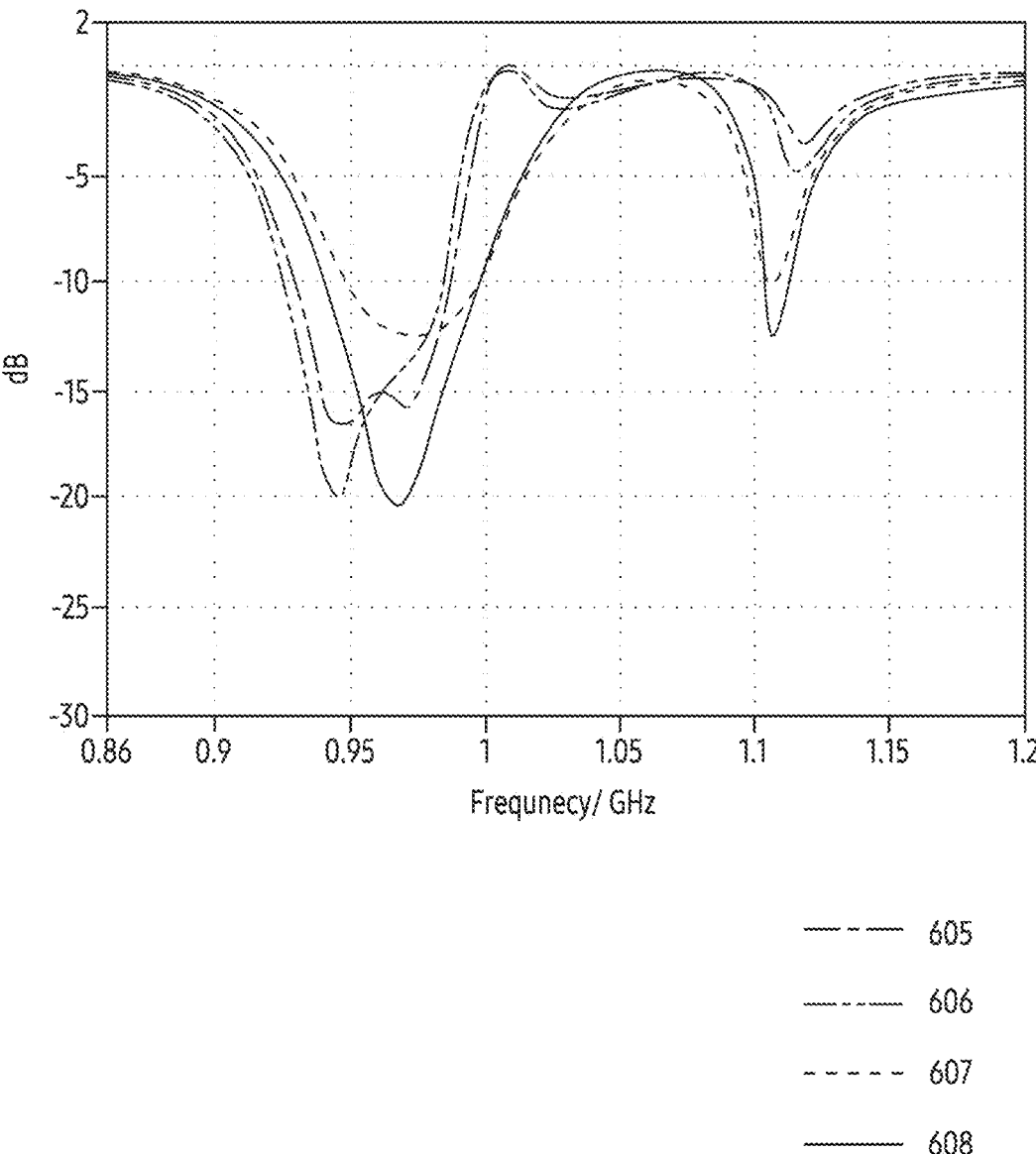
FIG. 6B is a graph for identifying a difference in reflection coefficients of an antenna by a filter circuit.

FIG. 6A is a graph for identifying a difference in radiation efficiency of an antenna by a filter circuit. FIG. 6B is a graph for identifying a difference in reflection coefficients of an antenna by a filter circuit.

An electronic device (e.g., the electronic device 101 of FIG. 3B) to be described with reference to FIGS. 6A and 6B may be the electronic device 101 having a structure in which a first feeding point (e.g., the first feeding point 311 of FIG. 3B) and a second feeding point (e.g., the second feeding point 321 of FIG. 3B) are substantially aligned with each other, and a first ground point (e.g., the first ground point 312 of FIG. 3B) and a second ground point (e.g., the second ground point 322 of FIG. 3B) are substantially aligned with each other, as illustrated in FIGS. 3B and 5B.

As described above, the filter circuit (e.g., the filter circuit 360 of FIG. 3A) according to an embodiment may improve the communication performance of the electronic device 101 by improving a reverse current and passing a signal in the parasitic resonance frequency. Such improvement of the communication performance of the electronic device 101 owing to the filter circuit 360 may be seen with reference to FIGS. 6A and 6B.

FIG. 6A illustrates efficiency of a first antenna and a second antenna depending on whether the filter circuit 360 is included or not in a state in which the electronic device 101 is fully closed. The x-axis of the graph represents the frequency (unit: GHz), and the y-axis of the graph represents the efficiency (unit: dB).

Referring to FIG. 6A, a first graph 601 shows the efficiency of the first antenna of the electronic device 101 including the filter circuit 360 according to an embodiment. The second graph 602 shows the efficiency of the second antenna of the electronic device 101 including the filter circuit 360 according to an embodiment. The third graph 603 shows the efficiency of the first antenna of the electronic device 101 that does not include the filter circuit 360. The fourth graph 604 shows the efficiency of the second antenna of the electronic device 101 that does not include the filter circuit 360. For example, the designated frequency of the signal to be transmitted and/or received through the first antenna and/or the second antenna may be about 0.93 GHz.

Comparing the first graph 601 with the third graph 603, the efficiency of the first graph 601 may be greater than the efficiency of the third graph 603 for a signal of about 0.93 GHz. The parasitic resonance frequency indicated by the first graph 601 may be greater than about 1.1 GHz, and the parasitic resonance frequency indicated by the third graph 603 may be about 1.1 GHz. For example, as the difference between the designated frequency and the parasitic resonance frequency increases, the interference of the antenna by the parasitic resonance may decrease, and therefore, the performance of the first antenna of the electronic device 101 including the filter circuit 360 may be greater than the performance of the first antenna of the electronic device 101 not including the filter circuit 360.

Comparing the second graph 602 with the fourth graph 604, the efficiency of the second graph 602 may be greater than the efficiency of the fourth graph 604 for the signal of about 0.93 GHz. The efficiency of the signal in the parasitic resonance frequency indicated by the second graph 602 may be less than the efficiency of the signal in the parasitic resonance frequency indicated by the fourth graph 604. For example, referring to the difference between the designated frequency and the parasitic resonance frequency and the efficiency of the signal in the parasitic resonance frequency, the performance of the second antenna of the electronic device 101 including the filter circuit 360 may be greater than the performance of the second antenna of the electronic device 101 not including the filter circuit 360.

FIG. 6B illustrates reflection coefficients of the first antenna and the second antenna depending on whether the filter circuit 360 is included or not in a state in which the electronic device 101 is fully closed. The x-axis of the graph represents a frequency (unit: GHz) and the y-axis of the graph represents an S-parameter (unit: dB)

Referring to FIG. 6B, a fifth graph 605 shows a reflection coefficient of the first antenna of the electronic device 101 including the filter circuit 360 according to an embodiment. The sixth graph 606 shows a reflection coefficient of the second antenna of the electronic device 101 including the filter circuit 360 according to an embodiment. The seventh graph 607 shows a reflection coefficient of the first antenna of the electronic device 101 that does not include the filter circuit 360. An eighth graph 608 shows a reflection coefficient of the second antenna of the electronic device 101 that does not include the filter circuit 360.

Referring to FIG. 6B, the fifth graph 605 and the sixth graph 606 of the electronic device 101 including the filter circuit 360 may have less reflection coefficients for a signal in a designated frequency than those of the seventh graph 607 and the eighth graph 608. The fifth graph 605 and the sixth graph 606 may have larger reflection coefficients for the signal in the parasitic resonance frequency than those of the seventh graph 607 and the eighth graph 608. For example, since the filter circuit 360 is configured to pass a signal in the parasitic resonance frequency, the electronic device 101 including the filter circuit 360 may reduce interference caused by the signal in the parasitic resonance frequency. The communication performance for the designated frequency of the electronic device 101 including the filter circuit 360 may be improved over the communication performance for the designated frequency of the electronic device 101 not including the filter circuit 360.

Figure 7A:
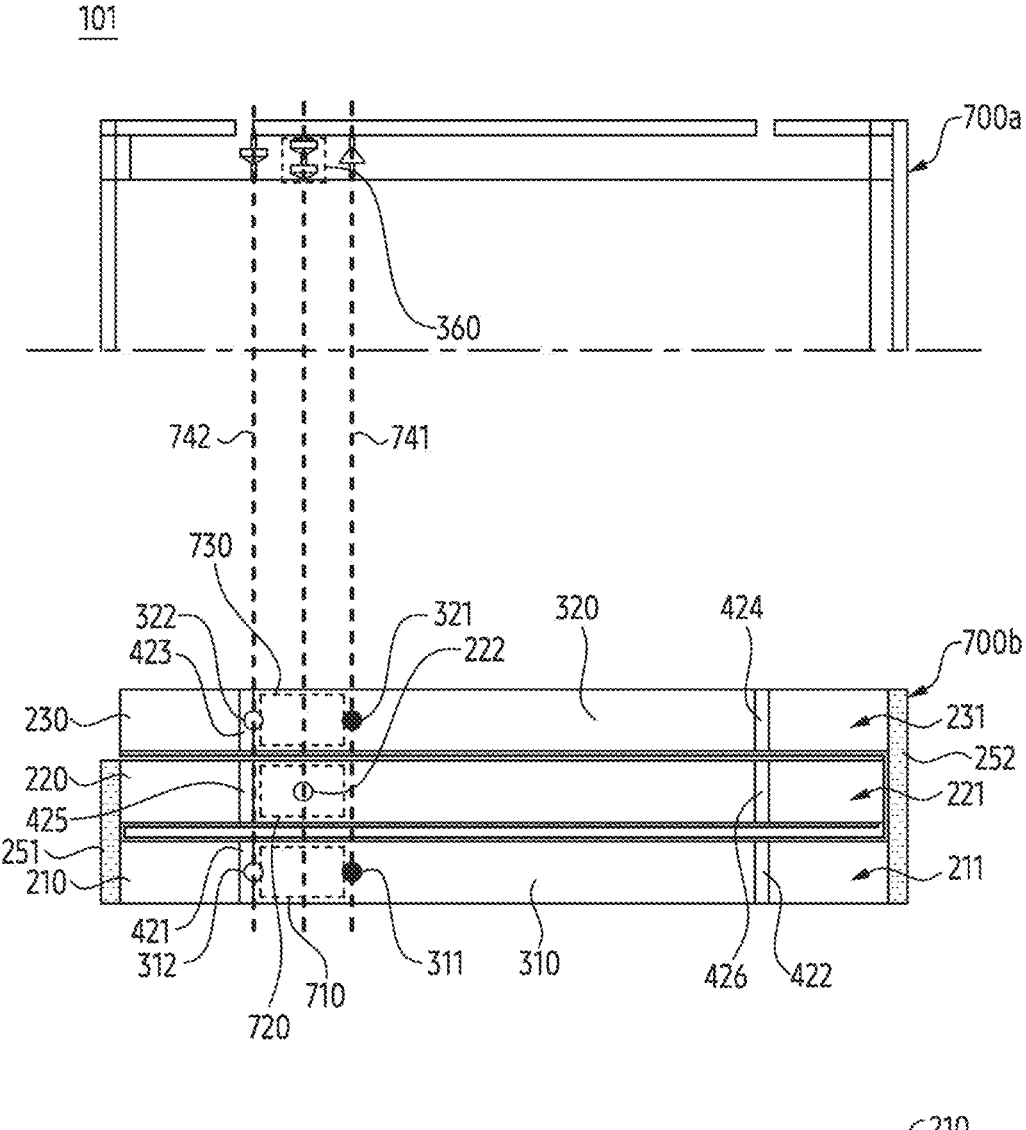
FIG. 7A illustrates a side surface of a second housing part and a foldable housing of an electronic device according to an embodiment.
Figure 7B:
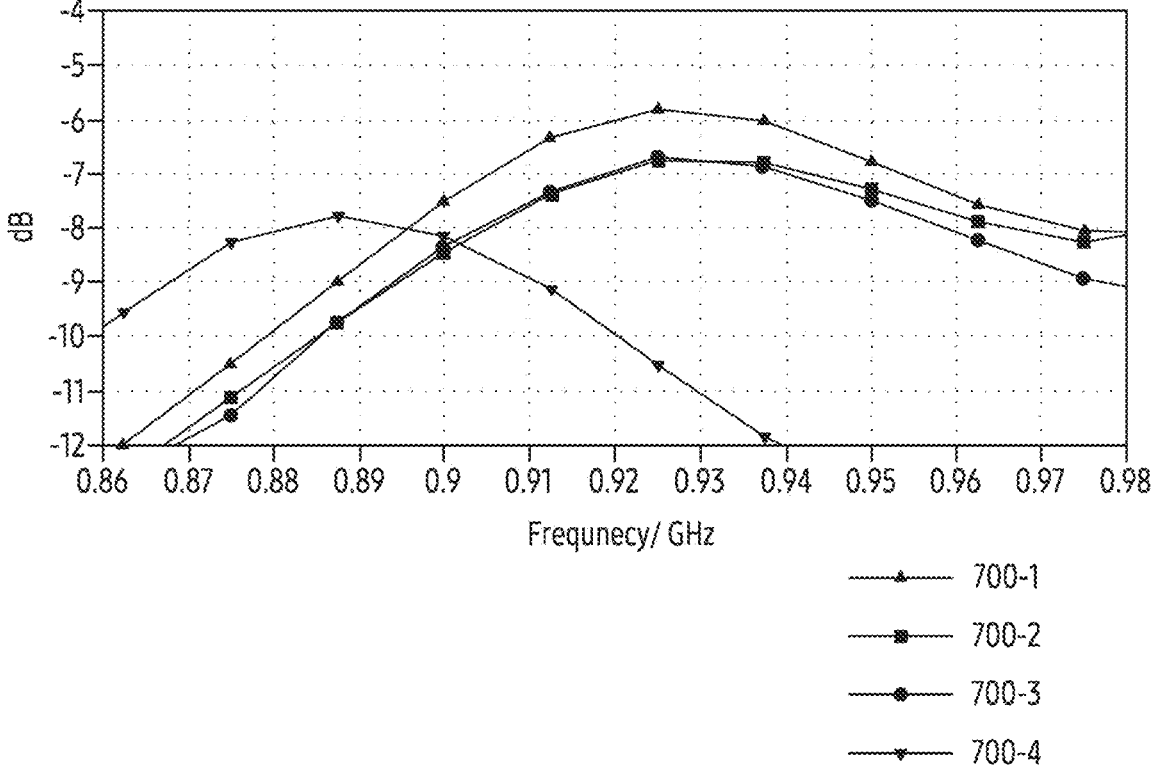
FIG. 7B illustrates efficiency of a first antenna according to a position of a portion.
Figure 7C:
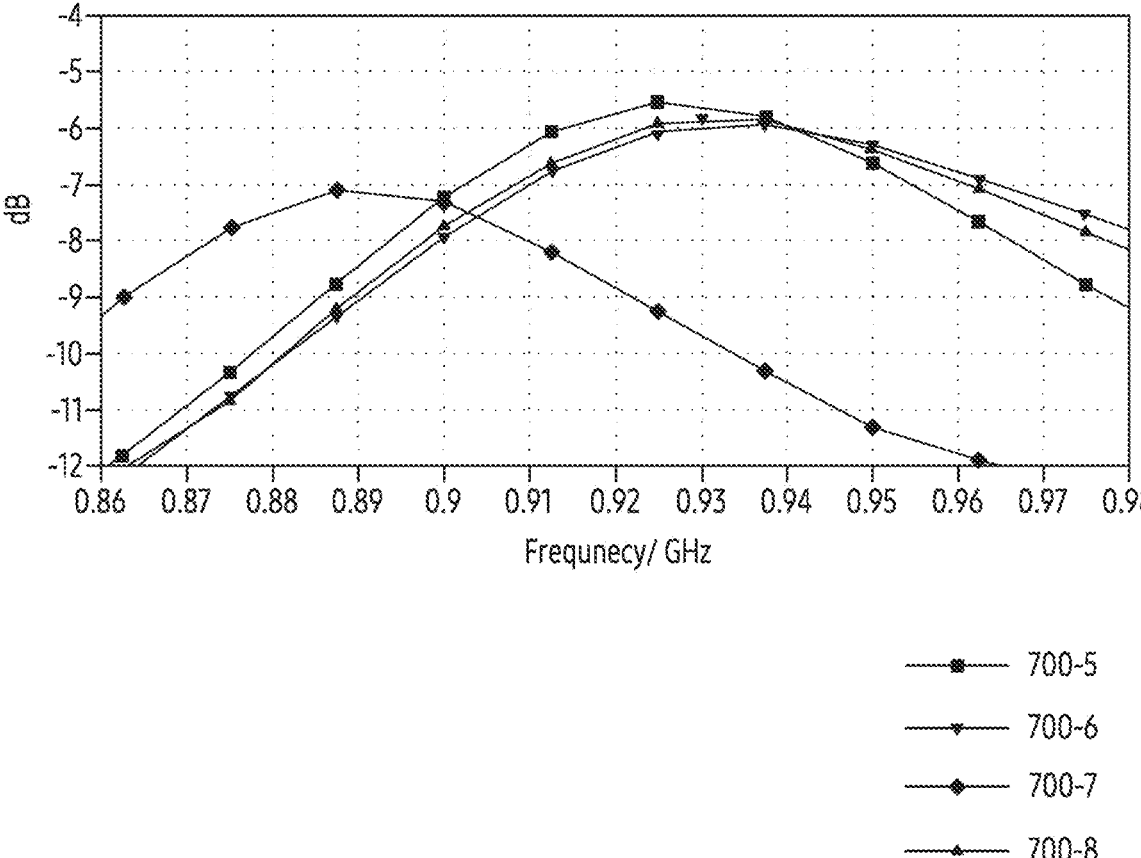
FIG. 7C illustrates efficiency of a second antenna according to a position of a portion.
Figure 7D:
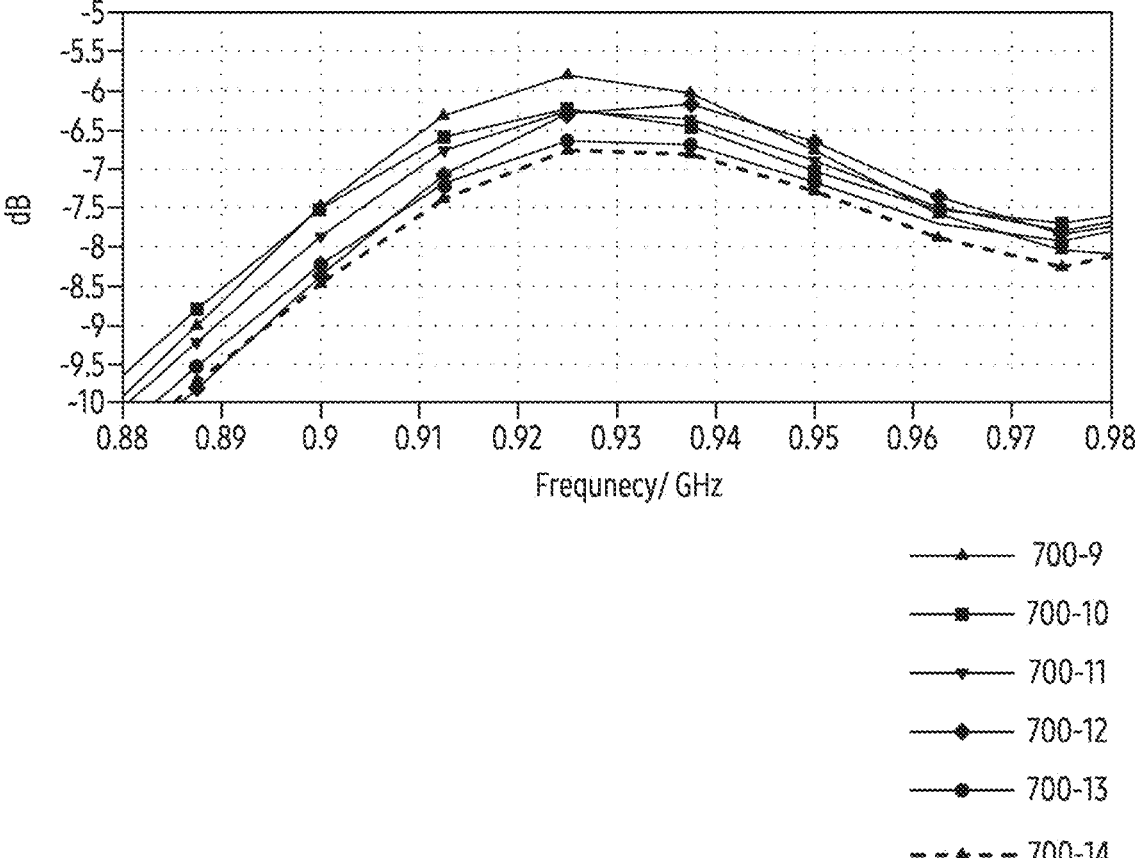
FIG. 7D illustrates efficiency of a first antenna according to positions of a portion in a second region.
Figure 7E:
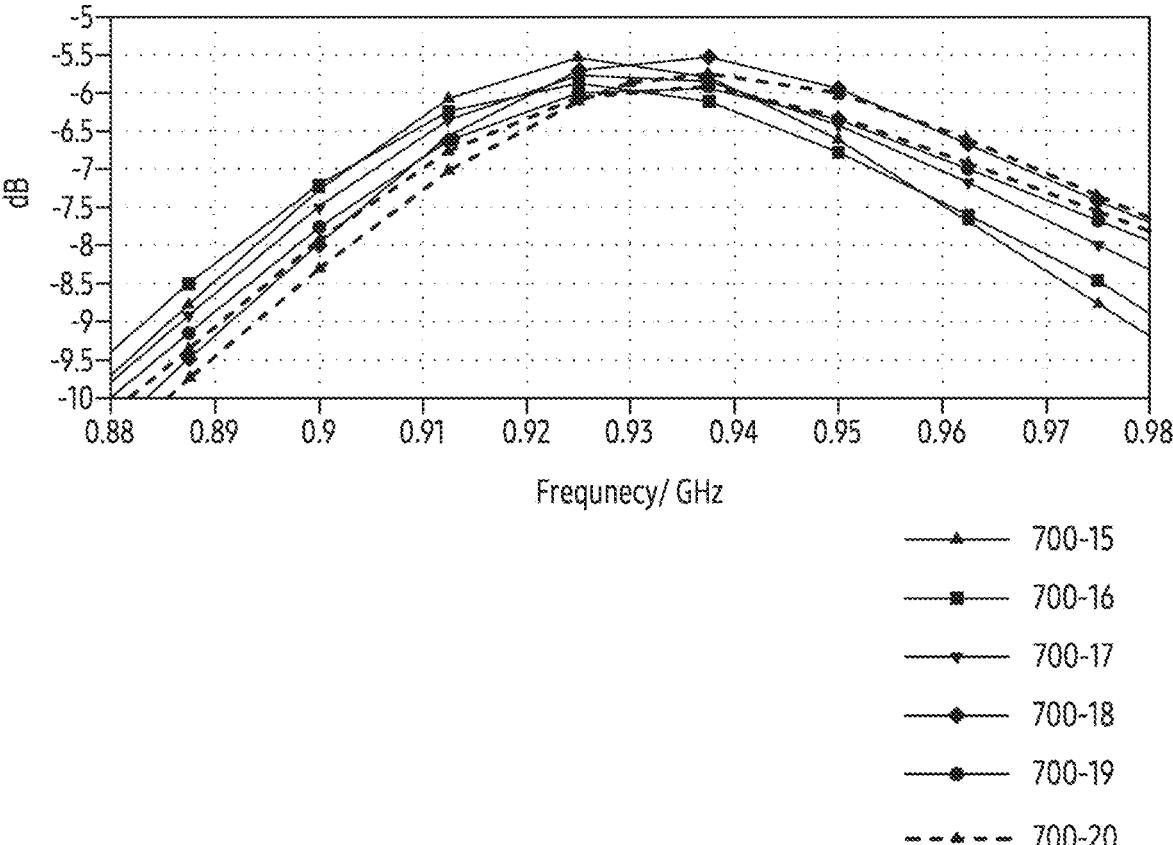
FIG. 7E illustrates efficiency of a second antenna according to positions of a portion in a second region.

FIG. 7A illustrates a side surface of a second housing part and a foldable housing of an electronic device according to an embodiment. FIG. 7B represents the efficiency of the first antenna according to a position of a portion thereof. FIG. 7C represents the efficiency of the second antenna according to a position of a portion thereof. FIG. 7D represents the efficiency of the first antenna according to a position of a portion in a second region. FIG. 7E represents efficiency of the second antenna according to a position of a portion in a second region.

A state 700a of FIG. 7A schematically shows the electronic device 101 viewed from above in its fully folded state. For example, when the electronic device 101 is viewed from above, the second housing part 220 and the first housing part 210 may be covered by the third housing part 230. A portion 222 electrically connected to the filter circuit 360 shown in the state 700a may be located in the second housing part 220 hidden by the third housing part 230. A state 700b of FIG. 7A schematically shows a state in which a side surface of the electronic device 101 is viewed in its fully folded state.

Referring to FIG. 7A, the filter circuit 360 may be electrically connected to the portion 222 in the second side exterior surface 221. The portion 222 in the second side exterior surface 221 to which the filter circuit 360 is electrically connected may be defined based on the positions of the first feeding point 311 and the first ground point 312.

For example, the portion 222 in the second side exterior surface 221 may correspond to a first region 710 between the first feeding point 311 and the first ground point 312. The structure in which the portion 222 corresponds to the first region 710 may be referred to as a structure in which the portion 222 is located in the second region 720 in the second side exterior surface 221 overlapping the first region 710, in the state of the first housing part 210 and the second housing part 220 being folded. For example, when the side surface of the foldable housing 200 is viewed in the fully folded state of the electronic device 101, the portion 222 may be positioned in the second region 720 between a first virtual straight line 741 extending from the first feeding point 311 toward the second side exterior surface 221 and a second virtual straight line 742 extending from the first ground point 312 toward the second side exterior surface 221.

When the third conductive portion 320 includes the second feeding point 321 and the second ground point 322, the second feeding point 321 and the second ground point 322 may be substantially aligned with the first feeding point 311 and the first ground point 312, respectively. For example, the second feeding point 321 may be substantially aligned with the first feeding point 311. For example, the second ground point 322 may be substantially aligned with the first ground point 312. For example, the first feeding point 311 and the second feeding point 321 may be arranged on the first straight line 741. For example, the first ground point 312 and the second ground point 322 may be arranged on the second straight line 742.

For example, the positions of a plurality of non-conductive portions located in the first side exterior surface 211, the second side exterior surface 221, and the third side surface 231 may be aligned with each other. For example, the first conductive portion 310 may be positioned between the first non-conductive portion 421 and the second non-conductive portion 422 in the first side exterior surface 211. For example, the third conductive portion 320 may be positioned between the third non-conductive portion 423 and the fourth non-conductive portion 424 in the third side surface 231. For example, the second side exterior surface 221 may include the fifth non-conductive portion 425 and the sixth non-conductive portion 426.

For example, a length of the first conductive portion 310 used as a radiator may correspond to a length of the third conductive portion 320. Since a length of the radiator affects the frequency characteristics (e.g., resonance frequency) of the antenna, the length of the first conductive portion 310 may correspond to the length of the third conductive portion 320 in order to implement communication diversity. For example, the first non-conductive portion 751 may be aligned with the third non-conductive portion 423. For example, the second non-conductive portion 422 may be aligned with the fourth non-conductive portion 424. For example, in the fully folded state of the electronic device 101, the first conductive portion 310 formed between the first non-conductive portion 751 and the second non-conductive portion 422 may overlap the third conductive portion 320 formed between the third non-conductive portion 423 and the fourth non-conductive portion 424. For example, the first ground point 312 may be adjacent to the first non-conductive portion 751. For example, the second ground point 322 may be adjacent to the third non-conductive portion 423.

For example, the portion 222 in the second side exterior surface 221 may correspond to the first region 710 between the first feeding point 311 and the first ground point 312 and a third region 730 between the second feeding point 321 and the second ground point 322, in the state in which the electronic device 101 is fully folded. For example, the second region 720 in which the portion 222 is located may overlap the first region 710 and the third region 730 in the fully folded state of the electronic device 101.

When the portion 222 deviates from the second region 720, the effect of improving the communication performance of the electronic device 101 by the filter circuit 360 may be reduced. For example, when the portion 222 is positioned in the second region 720, the flow of current in the second side exterior surface 221 corresponding to the flow of radiation current flowing along the first conductive portion 310 and/or the third conductive portion 320 may be established more smoothly. For example, when the portion 222 is positioned in the second region 720, the portion 222 may be positioned on the path through which the current forming the parasitic resonance flows, thereby more effectively reducing degradation in communication performance due to the parasitic resonance. When the portion 222 is located outside the second region 720, the effect of a reverse-current reduction and the effect of a reduced deterioration due to the parasitic resonance may decrease.

Referring to FIGS. 7B and 7C, when the portion (e.g., the portion 222 of FIG. 7A) deviates from the second region (e.g., the second region 720 of FIG. 7A), a degradation in the efficiency of the first antenna and the efficiency of the second antenna may be identified.

The first graph 700-1 of FIG. 7B represents the efficiency of the first antenna, when the portion 222 is positioned at a position corresponding to the first ground point (e.g., the first ground point 312 of FIG. 7A) and the second ground point (e.g., the second ground point 322 of FIG. 7A). The portion 222 of the position corresponding to the first ground point 312 and the second ground point 322 may be referred to as a case where the portion 222 is positioned on the second straight line (e.g., the second straight line 742 of FIG. 7A). The second graph 700-2 represents the efficiency of the first antenna, when the portion 222 is positioned at a position corresponding to the first feeding point (e.g., the first feeding point 311 of FIG. 7A) and the second feeding point (e.g., the second feeding point 321 of FIG. 7A). For example, the portion 222 of a position corresponding to the first ground point 312 and the second ground point 322 may be referred to as a case where the portion 222 is positioned on the first straight line (e.g., the first straight line 741 of FIG. 7A). The third graph 700-3 represents the efficiency of the first antenna, when the portion 222 is positioned between the first hinge part (e.g., the first hinge part 251 of FIG. 7A) and the fifth non-conductive portion (e.g., the fifth non-conductive portion 425 of FIG. 7A). The fourth graph 700-4 represents the efficiency of the first antenna, when the portion 222 is positioned between the second region 720 and the second hinge part (e.g., the second hinge part 252 of FIG. 7A).

Referring to FIG. 7B, when the portion 222 deviates from the second region 720, the efficiency of the first antenna may be reduced. For example, the efficiency indicated by the first graph 700-1 and the second graph 700-2 may be higher than the efficiency indicated by the third graph 700-3 and the fourth graph 700-4. In the case of the first graph 700-1, the first graph 700-1 indicates the highest efficiency, and thus, when the portion 222 is positioned at positions corresponding to the first ground point 312 and the second ground point 322, the efficiency of the first antenna may be the highest. Referring to the third graph 700-3, when the portion 222 deviates from the second region 720, the efficiency of the first antenna may be reduced. Referring to the fourth graph 700-4, when the portion 222 moves out of the second region 720 and approaches the second hinge part 252, the resonance frequency of the first antenna may be lowered, and the efficiency of the first antenna may be lowered. As illustrated in FIG. 7B, when the portion 222 to which the filter circuit 360 is electrically connected is located in the second region 720, the efficiency of the first antenna may be high.

The fifth graph 700-5 of FIG. 7C represents the efficiency of the second antenna when the portion 222 is located at the position corresponding to the first ground point 312 and the second ground point 322. For example, the portion 222 of the position corresponding to the first ground point 312 and the second ground point 322 may be referred to as a case where the portion 222 is positioned on the second straight line 742. The sixth graph 700-6 represents the efficiency of the second antenna when the portion 222 is positioned at the position corresponding to the first feeding point 311 and the second feeding point 321. For example, the portion 222 of the position corresponding to the first ground point 312 and the second ground point 322 may be referred to as a case where the portion 222 is positioned on the first straight line 741. The seventh graph 700-7 represents the efficiency of the second antenna when the portion 222 is located between the first hinge part 251 and the fifth non-conductive portion 425. An eighth graph 700-8 represents the efficiency of the second antenna when the portion 222 is located between the second region 720 and the second hinge part 252.

Referring to FIG. 7C, when the portion 222 deviates from the second region 720, the efficiency of the second antenna may be reduced. For example, the efficiency indicated by the fifth graph 700-5 and the sixth graph 700-6 may be higher than the efficiency indicated by the seventh graph 700-7 and the eighth graph 700-8. In the case of the fifth graph 700-5, it shows the highest efficiency, and therefore, the efficiency of the second antenna may be the highest when the portion 222 is positioned at the position corresponding to the first ground point 312 and the second ground point 322. Referring to the seventh graph 700-7, when the portion 222 deviates from the second region 720, the efficiency of the second antenna may be reduced. Referring to the eighth graph 700-8, when the portion 222 deviates from the second region 720 and approaches the second hinge part 252, the resonance frequency of the second antenna may be lowered, and the efficiency of the second antenna may be lowered. As illustrated in FIG. 7C, when the portion 222 to which the filter circuit 360 is electrically connected is located in the second region 720, the efficiency of the second antenna may be high.

For example, as the position of the portion 222 in the second region 720 is changed, the efficiency of the first antenna and/or the second antenna may be changed. For example, assuming the position of the second straight line 742 illustrated in FIG. 7A as the origin, and assuming the position of the first straight line 741 as a position spaced apart from the origin by 5, referring to FIGS. 7D and 7E, a change in efficiency of the first antenna and the second antenna according to the position between the second straight line 742 and the first straight line 741 may be seen.

Referring to FIG. 7D, a first graph 700-9 represents the efficiency of the first antenna when the portion 222 is located at the origin (e.g., on a second straight line 742). The second graph 700-10 represents the efficiency of the first antenna when the portion 222 is located at a position spaced apart from the origin by 1. The third graph 700-11 represents the efficiency of the first antenna when the portion 222 is located at a position spaced apart from the origin by 2. The fourth graph 700-12 represents the efficiency of the first antenna when the portion 222 is located at a position spaced apart from the origin by 3. The fifth graph 700-13 represents the efficiency of the first antenna when the portion 222 is located at a position spaced apart from the origin by 4. The sixth graph 700-14 represents the efficiency of the first antenna when the portion 222 is located at a position (e.g., on the first straight line 741) spaced apart from the origin by 5.

Referring to FIG. 7E, a seventh graph 700-15 represents the efficiency of the second antenna when the portion 222 is located at the origin (e.g., on the second straight line 742). One eighth graph 700-16 represents the efficiency of the second antenna when the portion 222 is located at a position spaced apart from the origin by 1. The ninth graph 700-17 represents the efficiency of the second antenna when the portion 222 is located at a position spaced apart from the origin by 2. A tenth graph 700-18 represents the efficiency of the second antenna when the portion 222 is located at a position spaced apart from the origin by 3. An eleventh graph 700-19 represents the efficiency of the second antenna when the portion 222 is located at a position spaced apart from the origin by 4. The twelfth graph 700-20 represents the efficiency of the second antenna when the portion 222 is located at a position (e.g., on the first straight line 741) spaced apart from the origin by 5.

Referring to FIGS. 7D and 7E, when the portion 222 is positioned at a position aligned with the first ground point 312 and/or the second ground point 322, the efficiency of the first antenna and/or the second antenna for a signal in a designated frequency (e.g., 0.93 GHz) may be the highest. As the position of the portion 222 moves away from the position aligned with the first ground point 312 and/or the second ground point 322 in the second region 720, the efficiency of the first antenna and/or the second antenna may be lowered. For example, since the filter circuit 360 adjusts the current flow formed on the second side exterior surface 221 by providing the ground with the current provided from the first conductive portion 310 and/or the third conductive portion 320 to the second side exterior surface 221, the effect of the filter circuit 360 may be enhanced when the portion 222 is positioned between the first ground point 312 and the second ground point 322 at which the current is concentrated. However, the position of the filter circuit 360 is not limited to between the first ground point 312 and the second ground point 322, and when the filter circuit 360 is located in the second region 720, the communication performance of the electronic device 101 may be improved.

Figure 8:
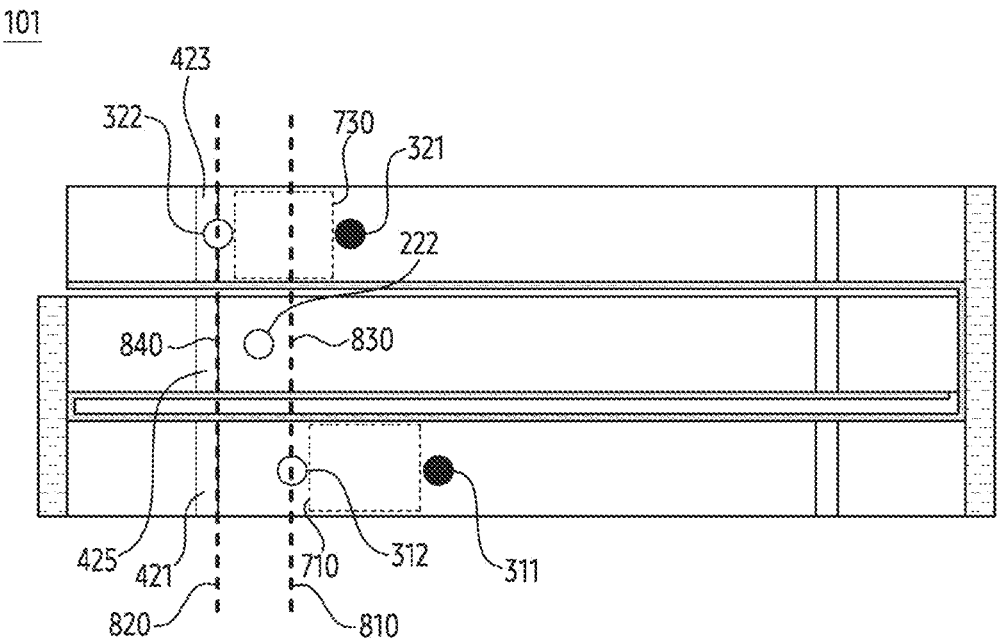
FIG. 8 illustrates a side surface of an electronic device according to an embodiment.

FIG. 8 illustrates a side surface of an electronic device according to an embodiment.

As described above, a second feeding point 321 may be substantially aligned with a first feeding point 311, and a second ground point 322 may be substantially aligned with a first ground point 312. The term "~substantially aligned with" may also include a case where the first region 710 and the third region 730 are partially overlapped with each other, in addition to the case where the first feeding point 311 and the second feeding point 321 (or the first ground point 312 and the second ground point 322) are positioned on one straight line.

Referring to FIG. 8, the first region 710 may partially overlap the third region 730 without fully overlapping the third region 730. For example, even when the first feeding point 311 and the second feeding point 321 are not positioned in one straight line and/or the first ground point 312 and the second ground point 322 are not positioned in one straight line, the first region 710 between the first feeding point 311 and the first ground point 312 may partially overlap the third region 730 between the second feeding point 321 and the second ground point 322.

When the side surface of the foldable housing 200 is viewed in the fully folded state of the electronic device 101, the portion 222 may be positioned between a first virtual straight line 810 extending from the first ground point 312 toward the second side exterior surface 221 and a second virtual straight line 820 extending from the second ground point 322 toward the second side exterior surface 221. For example, the portion 222 may be positioned between a first point 830 in the second side exterior surface 221 aligned with the first ground point 312 and a second point 840 in the second side exterior surface 221 aligned with the second ground point 322. When the portion 222 is too far away from the non-conductive portion (e.g., the fifth non-conductive portion 425), it may be difficult to control the flow of current by the filter circuit 360, and thus the position of the portion 222 may be limited to between the first point and the second point. As the portion 222 electrically connected to the filter circuit 360 is positioned between the first point and the second point, it may be possible to improve the communication performance of the electronic device 101 by the filter circuit 360.

Figure 9A:
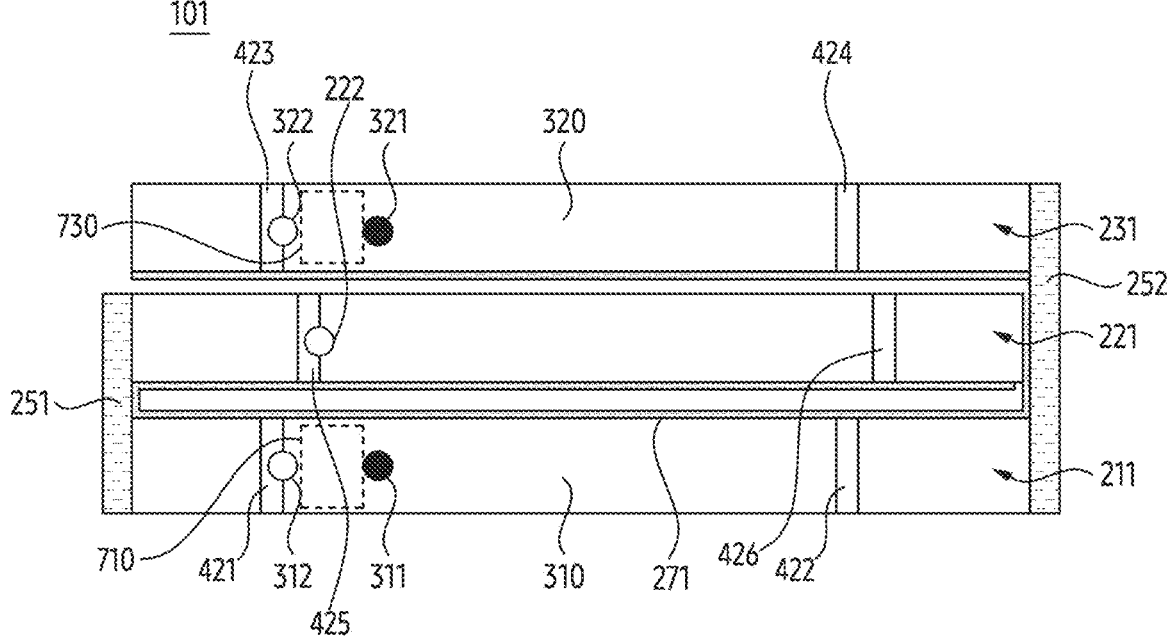
FIG. 9A illustrates a side surface of an electronic device according to an embodiment.
Figure 9B:
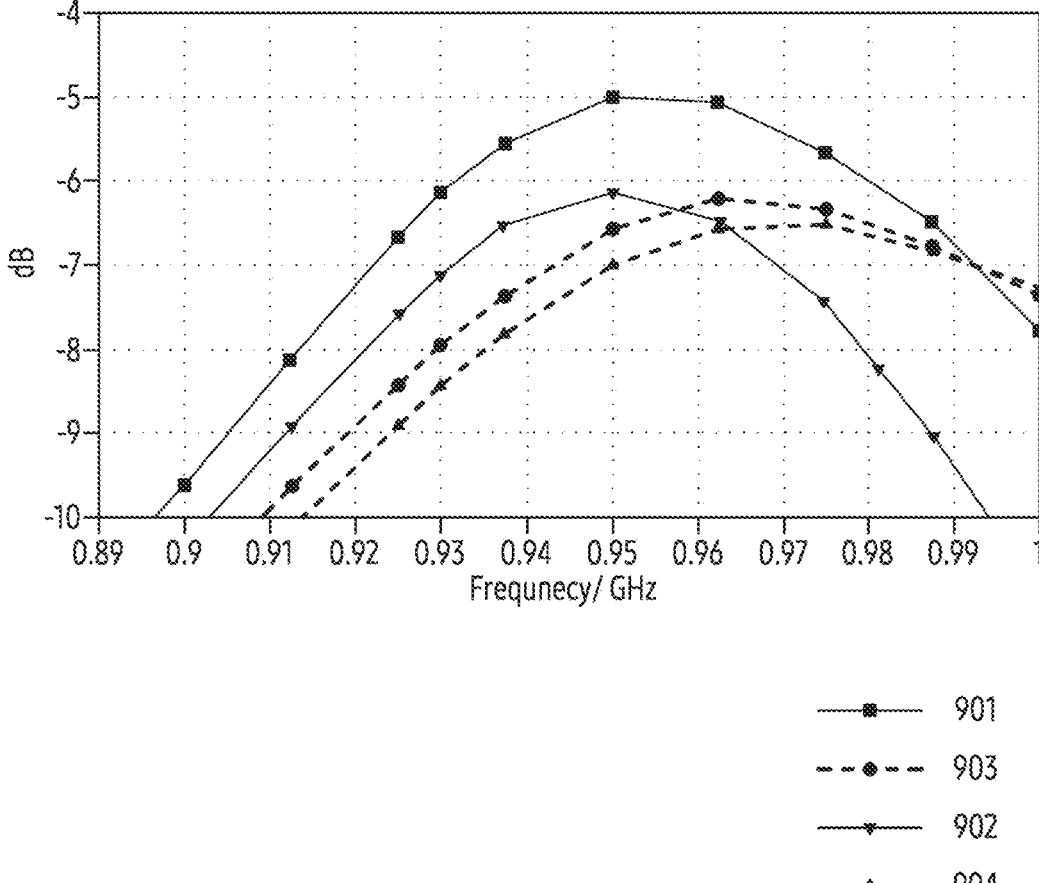
FIG. 9B illustrates efficiency of a first antenna according to whether an electronic device shown in FIG. 9A includes a filter circuit.
Figure 9C:
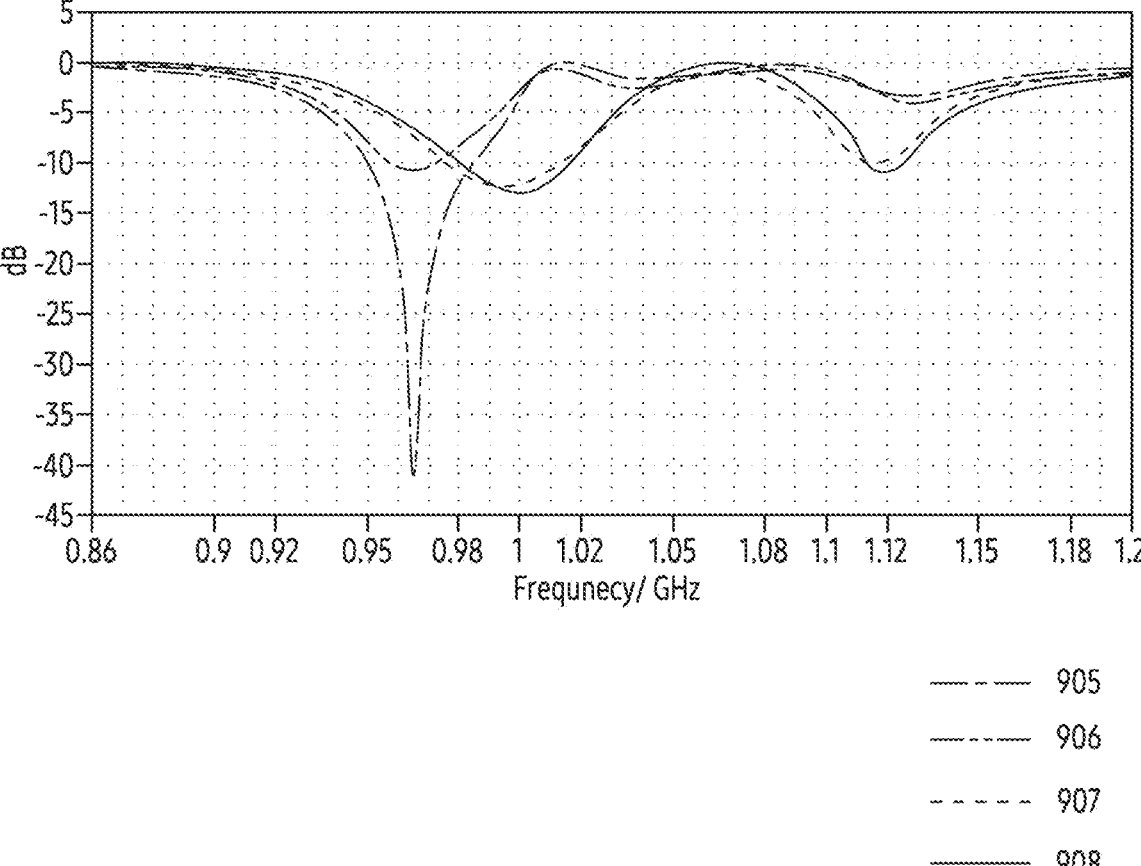
FIG. 9C illustrates efficiency of a second antenna according to whether the electronic device shown in FIG. 9A includes a filter circuit.

FIG. 9A illustrates a side surface of an electronic device according to an embodiment. FIG. 9B represents the efficiency of a first antenna according to whether the electronic device illustrated in FIG. 9A includes a filter circuit or not. FIG. 9C illustrates efficiency of a second antenna according to whether the electronic device illustrated in FIG. 9A includes a filter circuit or not.

The above-described electronic device 101 illustrates a structure in which a plurality of non-conductive portions located in the first side exterior surface 211, the second side exterior surface 221, and the third side surface 231 are aligned with each other, but its structure is not limited thereto. Referring to FIG. 9A, the plurality of non-conductive portions included in the side surface may be at least partially misaligned.

Referring to FIG. 9A, the first non-conductive portion 421 may be aligned with the third non-conductive portion 423. For example, the second non-conductive portion 422 may be aligned with the fourth non-conductive portion 424. For example, the fifth non-conductive portion 425 in the second side exterior surface 221 may be misaligned with the first non-conductive portion 421 and the third non-conductive portion 423. For example, the sixth non-conductive portion 426 in the second side exterior surface 221 may be misaligned with the second non-conductive portion 422 and the fourth non-conductive portion 424. The portion 222 in the second side exterior surface 221 electrically connected to the filter circuit (e.g., the filter circuit 360 of FIG. 3A) may correspond to the first region 710 between the first feeding point 311 and the first ground point 312 and the third region 730 between the second feeding point 321 and the second ground point 322.

Even in the case of the electronic device 101 illustrated in FIG. 9A, the communication performance by the filter circuit 360 may be improved. When the first conductive portion 310 and/or the third conductive portion 320 operates as a radiator, the direction of the current formed on the second side exterior surface 221 may correspond to the direction of the radiation current formed on the first conductive portion 310 and/or the third conductive portion 320 by the filter circuit 360. For example, the filter circuit 360 may be configured to pass a signal in the parasitic resonance frequency, thereby reducing degradation in efficiency of the first antenna and/or the second antenna.

Referring to FIGS. 9B and 9C, the communication performance may be compared according to whether or not the electronic device 101 including at least partially misaligned non-conductive portions includes the filter circuit 360.

Referring to FIG. 9B, a first graph 901 represents the efficiency of the first antenna when the electronic device 101 includes the filter circuit 360. The second graph 902 represents the efficiency of the second antenna when the electronic device 101 includes the filter circuit 360. The third graph 903 represents the efficiency of the first antenna when the electronic device 101 does not include the filter circuit 360. The fourth graph 904 represents the efficiency of the second antenna when the electronic device 101 does not include the filter circuit 360. The x-axis of the graph of FIG. 9B represents a frequency (unit: GHz), and the y-axis of the graph represents the efficiency (unit: dB).

For example, in a frequency range of about 0.9 GHz to about 0.99 GHz, the efficiency indicated by the first graph 901 may be greater than the efficiency indicated by the third graph 903. For example, in a frequency range of about 0.9 GHz to about 0.96 GHz, the efficiency indicated by the second graph 902 may be greater than the efficiency indicated by the fourth graph 904. For example, when the operating frequencies of the first antenna and the second antenna are set to about 0.93 GHz, the efficiency of the first antenna and the second antenna for the operating frequency may be increased by including the filter circuit 360. For example, in the electronic device 101 of FIG. 9A in which the non-conductive portions of the foldable housing 200 are not at least partially aligned, the filter circuit 360 may be electrically connected to the portion 222 of the second side exterior surface 221, thereby improving the communication performance of the electronic device 101.

Referring to FIG. 9C, a fifth graph 905 represents the reflection coefficient of the first antenna when the electronic device 101 includes the filter circuit 360. The sixth graph 906 represents the reflection coefficient of the second antenna when the electronic device 101 includes the filter circuit 360. The seventh graph 907 represents the reflection coefficient of the first antenna when the electronic device 101 does not include the filter circuit 360. An eighth graph 908 represents the reflection coefficient of the second antenna when the electronic device 101 does not include the filter circuit 360. The x-axis of the graph of FIG. 9B indicate a frequency (unit: GHz), and the y-axis of the graph indicates an S-parameter (unit: dB).

For example, the reflection coefficient indicated by the fifth graph 905 may be less than the reflection coefficient indicated by the seventh graph 907. For example, the reflection coefficient indicated by the sixth graph 906 may be substantially the same as or less than the reflection coefficient indicated by the eighth graph 908, but in the case of the eighth graph 908, the performance of the second antenna may be higher when including the filter circuit 360, since the difference between the operating frequency and the parasitic resonance frequency is relatively small. For example, in the case of the fifth graph 905 and the sixth graph 906, the first antenna and the second antenna may have high performance in the operating frequency range, since there is no sharp reduction of the reflection coefficient in the frequency range other than the operating frequency (e.g., from about 0.96 GHz to about 0.97 GHz).

As described above, the filter circuit 360 electrically connected to the portion 222 of the second side exterior surface 221 may improve the communication performance of the electronic device 101, independently of the structure of the plurality of non-conductive portions positioned on the side surface of the foldable housing 200.

Figure 10A:
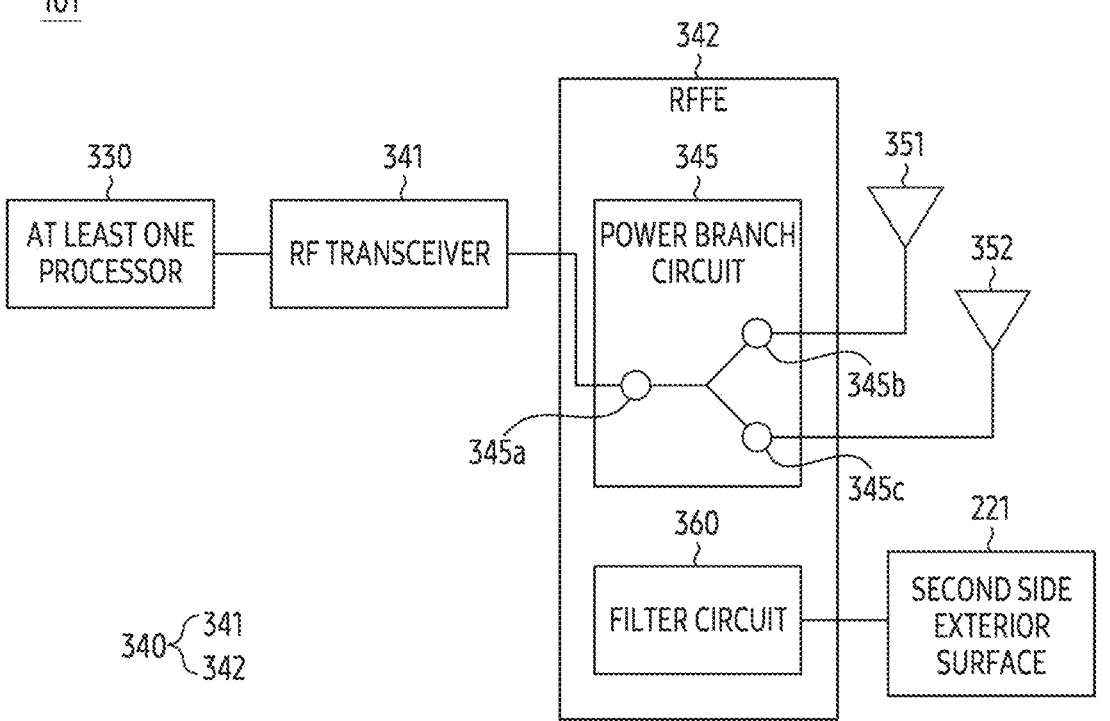
FIG. 10A is a block diagram of an electronic device according to an embodiment.
Figure 10B:
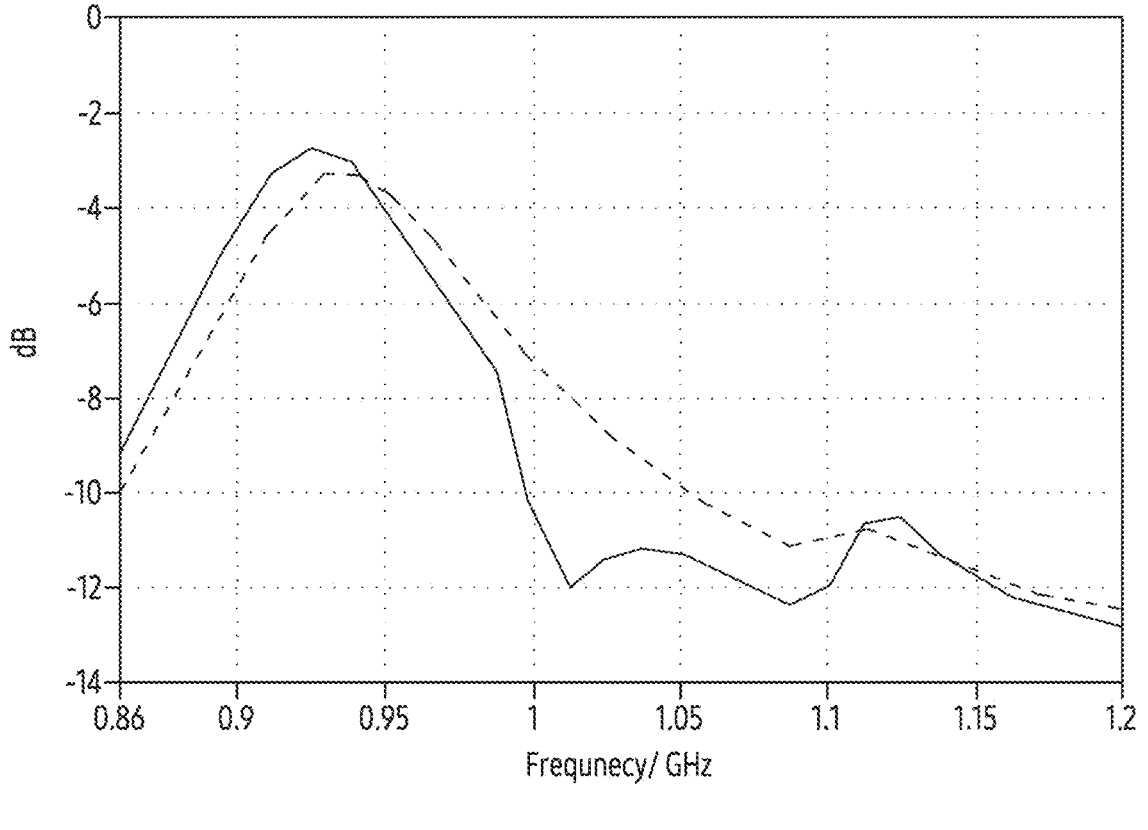
FIG. 10B illustrates communication characteristics of an electronic device by a filter circuit.

FIG. 10A is a block diagram of an electronic device according to an embodiment. FIG. 10B illustrates communication characteristics of an electronic device by a filter circuit.

As described with reference to FIG. 3A, a first antenna 351 and a second antenna 352 may provide a diversity function and/or a MIMO function. In order to provide the diversity function and/or the MIMO function, as illustrated in FIG. 3A, the first antenna 351 and the second antenna 352 may be electrically connected to an RF transceiver 341, respectively. For example, the first antenna 351 may be electrically connected to the RF transceiver 341 through a first RFFE (e.g., a first RFFE 343 of FIG. 3A). For example, the second antenna 352 may be electrically connected to the RF transceiver 341 through a second RFFE (e.g., a second RFFE 344 of FIG. 3A). For example, an electrical path between the RF transceiver 341 and the first antenna 351 and an electrical path between the RF transceiver 341 and the second antenna 352 may be independent of each other to implement the diversity function and/or the MIMO function. However, the disclosure is not limited to thereto. For example, as illustrated in FIG. 10A, the electronic device 101 may include the first antenna 351 and the second antenna 352 configured to provide the same feeding signal through a power branch circuit 345.

Referring to FIG. 10A, the electronic device 101 may include the power branch circuit 345. For example, the power branch circuit 345 may include a three-port passive element. For example, the power branch circuit 345 may include, but is not limited to, a first port 345a electrically connected to the RF transceiver 341, a second port 345b electrically connected to the first antenna 351, and a third port 345c electrically connected to the second antenna 352. For example, each of the three ports may be connected by an electrical path having a 50 ohm impedance. For example, a signal input from the RF transceiver 341 via the first port 345a may be distributed with an equal power to be output to the second port 345b and the third port 345c, respectively. For example, a signal input to the second port 345b and the third port 345c through the first antenna 351 and the second antenna 352 may be combined into one signal and output to the first port 345a. For example, the power branch circuit 345 may be also referred to as a divider, a splitter, and/or a coupler. For example, a transmission signal transmitted from the RF transceiver 341 may be distributed through the power branch circuit 345 to be fed to each of the first antenna 351 and the second antenna 352. For example, reception signals received through the first antenna 351 and the second antenna 352 may be combined through the power branch circuit 345 and then provided to the RF transceiver 341.

For example, in the case of the electronic device 101 including the power branch circuit 345, the same signal is provided to the first antenna 351 and the second antenna 352, and thus the phase of the current flowing along the first conductive portion 310 and the phase of the current flowing along the third conductive portion 320 may be the same as each other. When signals of the same phase are provided to the first conductive portion 310 and the third conductive portion 320, the reverse current formed on the second side exterior surface 221 may be reduced, and thus energy loss due to the reverse current may be reduced. The electronic device 101 including the power branch circuit 345 may also improve the communication performance by using the filter circuit 360 according to an embodiment. For example, the electronic device 101 may include the filter circuit 360 electrically connected to the portion 222 of the second side exterior surface 221. For example, the filter circuit 360 may electrically connect the second side exterior surface 221 to the ground. For example, the filter circuit 360 may be configured to pass a signal in a parasitic resonance frequency in order to reduce the parasitic resonance caused by the structure of the foldable housing 200.

Referring to FIG. 10B, the electronic device 101 providing signals of the same phase to the first antenna 351 and the second antenna 352 by the power branch circuit 345 may include a filter circuit 360, thereby having improved communication performance. The first graph 1001 of FIG. 10B represents the efficiency of the antenna when the electronic device 101 includes the filter circuit 360. The second graph 1002 of FIG. 10B represents efficiency of the antenna when the electronic device 101 does not include the filter circuit 360.

Comparing the first graph 1001 with the second graph 1002, in a frequency range of about 0.9 GHz to about 0.95 GHz, the efficiency of the first graph 1001 may be higher than the efficiency of the second graph 1002. For example, even when signals of the same phase are supplied to the first antenna 351 and the second antenna 352, the filter circuit 360 is configured to control the flow of current formed on the second side exterior surface 221 and to pass the signal in the parasitic resonance frequency, and thus the communication performance of the electronic device 101 including the filter circuit 360 may be higher than that of the electronic device 101 not including the filter circuit 360.

Figure 11A:
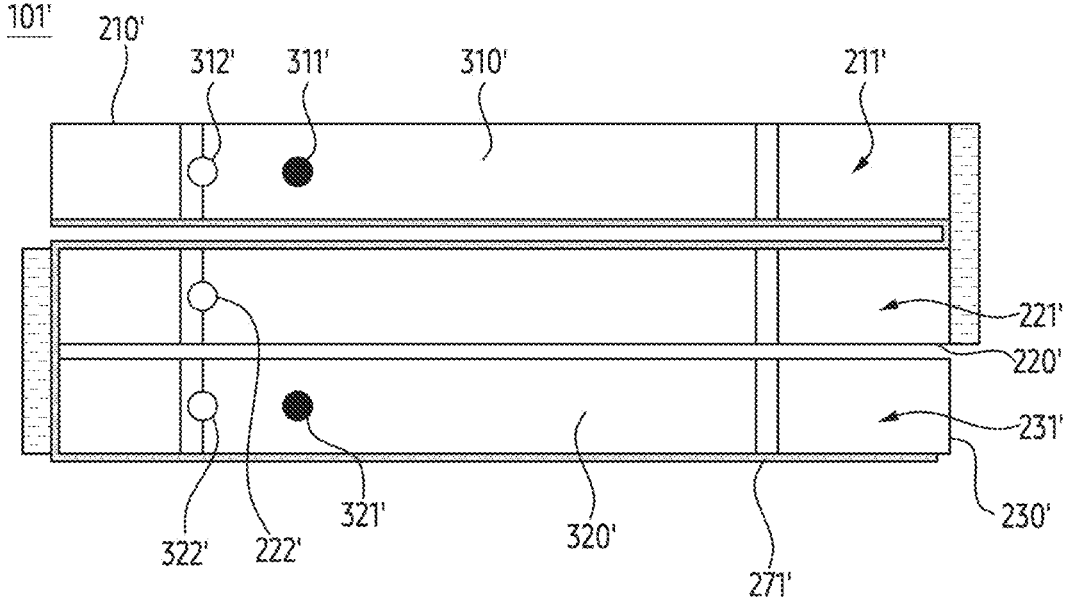
FIG. 11A illustrates a side surface of an electronic device according to an embodiment.
Figure 11B:
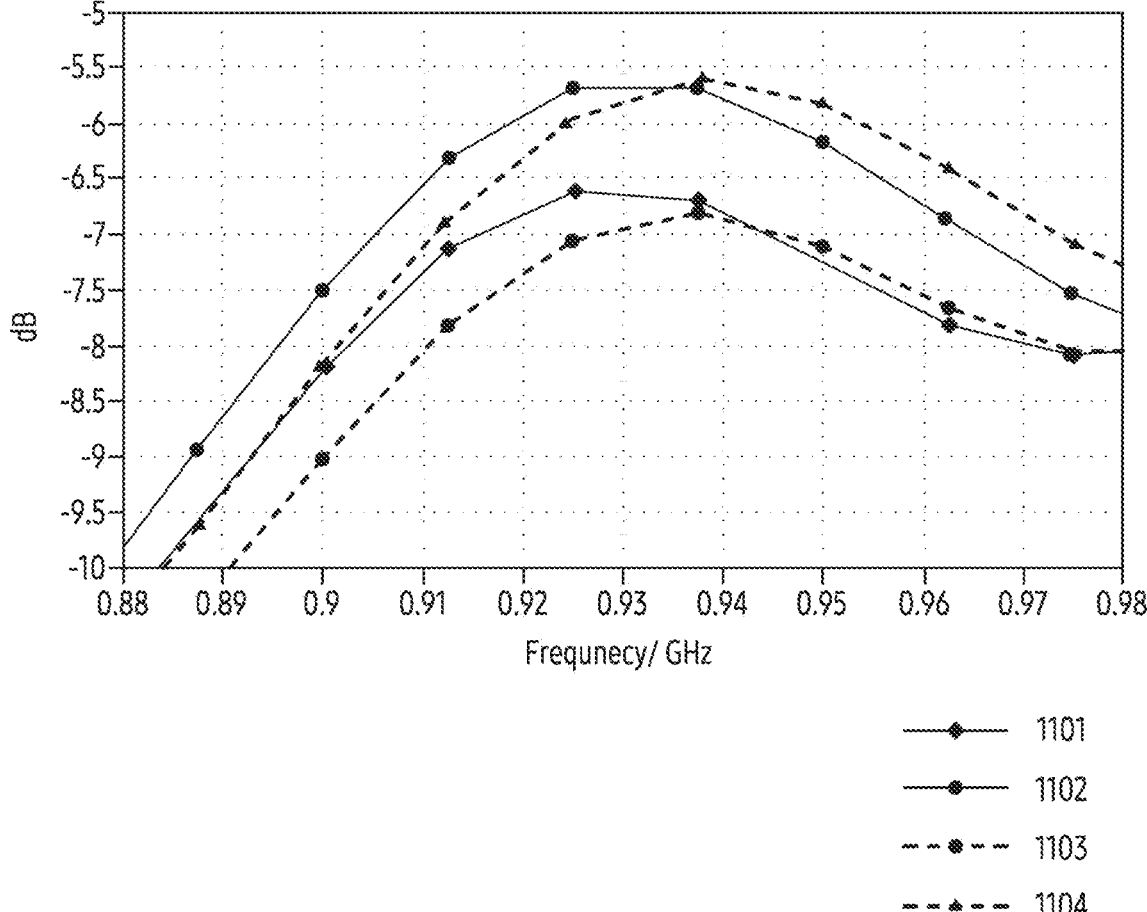
FIG. 11B illustrates efficiency of a first antenna and a second antenna of an electronic device shown in FIG. 11A.
Figure 11C:
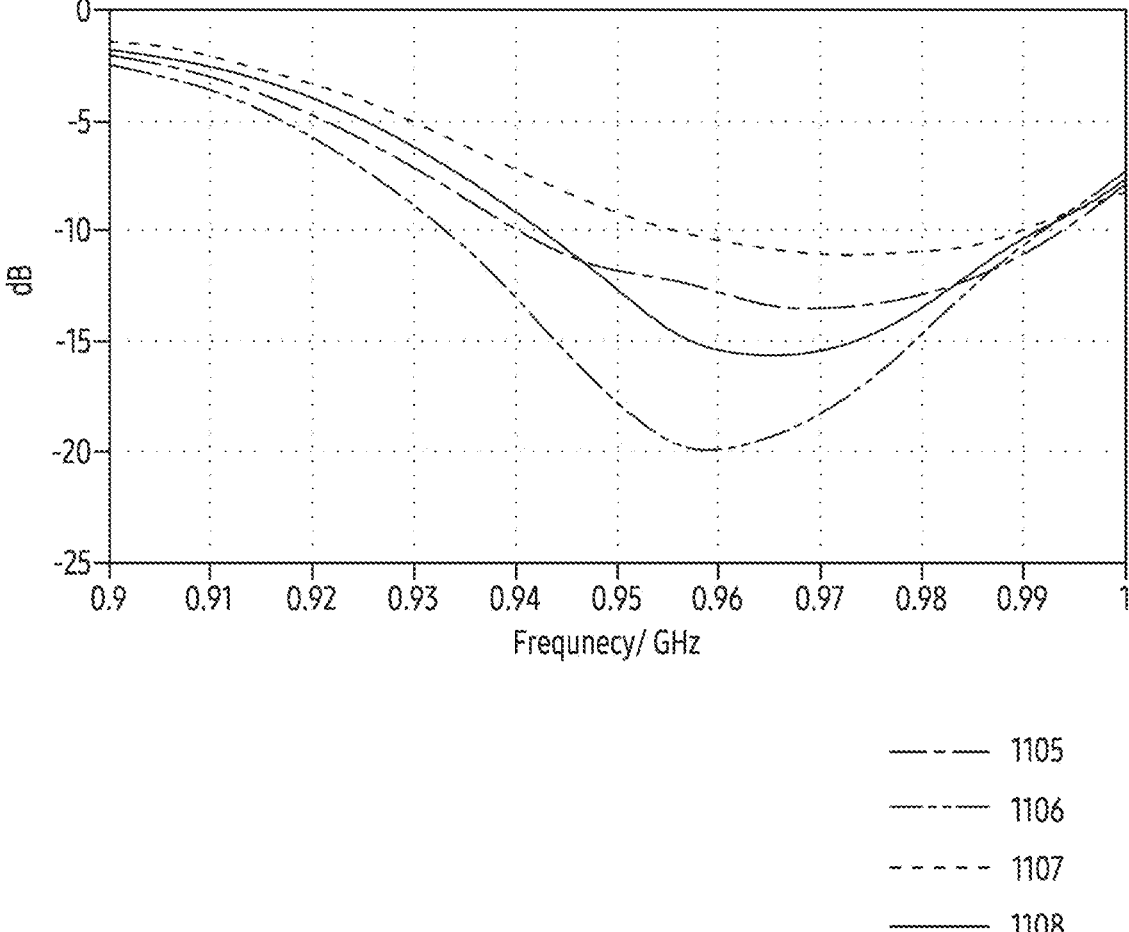
FIG. 11C illustrates reflection coefficients of a first antenna and a second antenna of an electronic device shown in FIG. 11A.

FIG. 11A illustrates a side surface of an electronic device according to an embodiment. FIG. 11B illustrates efficiency of a first antenna and a second antenna of the electronic device illustrated in FIG. 11A. FIG. 11C illustrates reflection coefficients of the first antenna and the second antenna of the electronic device illustrated in FIG. 11A.

The above-described descriptions have been made with reference to drawings of electronic devices (e.g., the electronic device 101 of FIG. 3B) having a structure in which the flexible display 271 is hidden in its fully folded state, but the disclosure is not limited thereto. For example, as illustrated in FIG. 11A, the electronic device (e.g., the electronic device 101' of FIG. 3C) may have the structure in which a portion of the flexible display 271' is exposed in the fully folded state.

Referring to FIG. 11A, in a state in which the first housing part 210', the second housing part 220', and the third housing part 230' are fully folded, a portion of the flexible display 271' may be positioned outside the foldable housing 200'. For example, a portion of the flexible display 271' positioned outside the foldable housing 200' may be a portion of the flexible display 271' disposed on the third housing part 230'. However, the disclosure is not limited thereto. The electronic device 101' illustrated in FIG. 11A may be referred to as the electronic device 101' illustrated in FIGS. 2B and 3C.

In the case of the electronic device 101' illustrated in FIG. 11A, the above descriptions may be applied substantially the same. For example, the electronic device 101' may include a filter circuit (e.g., the filter circuit 360 of FIG. 3A) electrically connected to a portion 222' of the second side exterior surface 221'. The filter circuit 360 may electrically connect the second side exterior surface 221' to the ground. For example, the filter circuit 360' may be configured to pass the signal in the parasitic resonance frequency, thereby reducing degradation in efficiency of the first antenna including at least a portion of the first conductive portion 310' and/or the second antenna including at least a portion of the third conductive portion 320'.

The graph shown in FIG. 11B represents the efficiency of the first antenna and the second antenna depending on whether the electronic device 101' with the structure shown in FIG. 11A includes the filter circuit 360. The x-axis of the graph represents the frequency (unit: GHz), and the y-axis of the graph represents the efficiency (unit: dB). The first graph 1101 represents the efficiency of the first antenna when the electronic device 101 shown in FIG. 11A includes the filter circuit 360. The second graph 1102 represents the efficiency of the second antenna when the electronic device 101 shown in FIG. 11A includes the filter circuit 360. The third graph 1103 represents the efficiency of the first antenna when the electronic device 101 shown in FIG. 11A does not include the filter circuit 360. The fourth graph 1104 represents the efficiency of the second antenna when the electronic device 101 shown in FIG. 11A does not include the filter circuit 360.

Comparing the first graph 1101 and the third graph 1103, the first graph 1101 may reveal higher efficiency than the third graph 1103 in a frequency range of about 0.94 GHz or less. Comparing the second graph 1102 and the fourth graph 1104, the second graph 1102 may reveal higher efficiency than the fourth graph 1104 in the frequency range of about 0.94 GHz or less. For example, when the electronic device 101 includes the filter circuit 360, the direction of the current formed on the second side exterior surface 221 by the filter circuit 360 may correspond to the direction of the radiation current formed on the first conductive portion 310 and/or the third conductive portion 320, so energy loss due to the reverse current may be reduced so that the efficiency of the first antenna and the second antenna may be improved. For example, as the filter circuit 360 is configured to pass a signal in the parasitic resonance frequency, the efficiency of the first antenna and the second antenna may be improved.

The graph shown in FIG. 11C represents the reflection coefficients of the first antenna and the second antenna depending on whether the electronic device 101 of the structure shown in FIG. 11A includes the filter circuit 360. The x-axis of the graph indicates the frequency (unit: GHz), and the y-axis of the graph indicates an S parameter (unit: dB). The fifth graph 1105 represents the reflection coefficient of the first antenna when the electronic device 101 illustrated in FIG. 11A includes the filter circuit 360. The sixth graph 1106 represents the reflection coefficient of the second antenna when the electronic device 101 illustrated in FIG. 11A includes the filter circuit 360. The seventh graph 1107 represents the reflection coefficient of the first antenna when the electronic device 101 illustrated in FIG. 11A does not include the filter circuit 360. An eighth graph 1108 represents the reflection coefficient of the second antenna when the electronic device 101 illustrated in FIG. 11A does not include the filter circuit 360.

Comparing the fifth graph 1105 and the seventh graph 1107, the fifth graph 1105 may reveal the lower reflection coefficient than the seventh graph 1107 in a frequency range of about 0.9 GHz to about 1 GHz. Comparing the sixth graph 1106 and the eighth graph 1108, the sixth graph 1106 may reveal the lower reflection coefficient than the eighth graph 1108 in the frequency range of about 0.9 GHz to about 1 GHz. For example, when the electronic device 101 includes the filter circuit 360, the performance of the first antenna and the performance of the second antenna may be improved as the reflected power is reduced without being radiated.

For example, the positions of a plurality of non-conductive portions on the side surface of the foldable housing 200 may vary. For example, the positions of the non-conductive portion (e.g., the first non-conductive portion 421 and/or the second non-conductive portion 422) in the first side exterior surface 211, the non-conductive portion (e.g., the fifth non-conductive portion 425 and/or the sixth non-conductive portion 426) in the second side exterior surface 221, and/or the non-conductive portion (e.g., the third non-conductive portion 423 and/or the fourth non-conductive portion 424) in the third side surface 231 may vary. For example, even if the structure of the side surface of the foldable housing 200 is changed, the communication performance by the filter circuit 360 may be improved. Hereinafter, various foldable structures will be described.

Figure 12A:
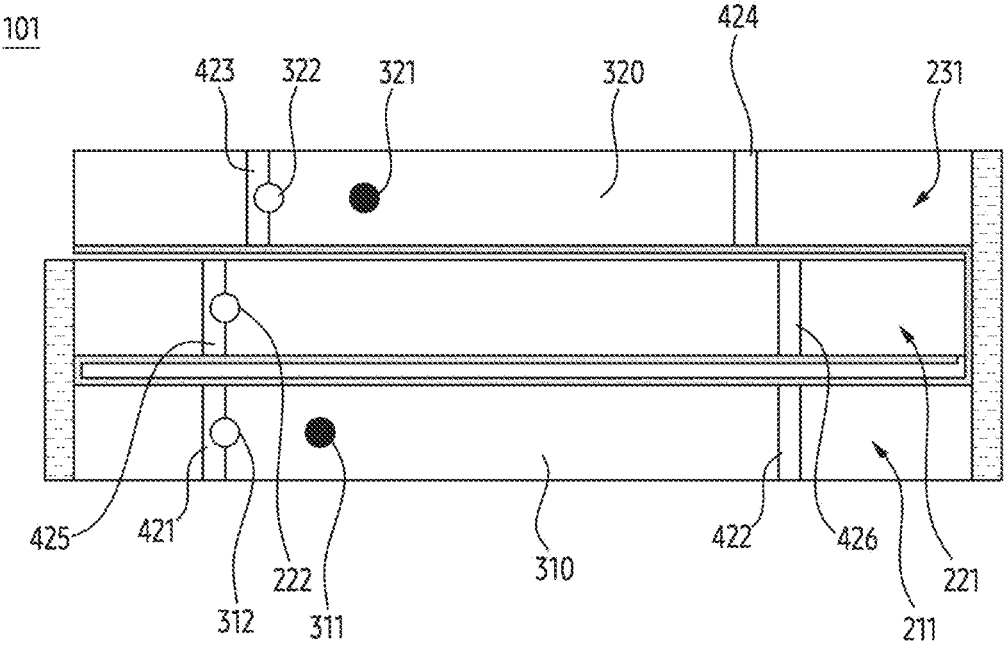
FIG. 12A illustrates a side surface of an electronic device according to an embodiment.
Figure 12B:
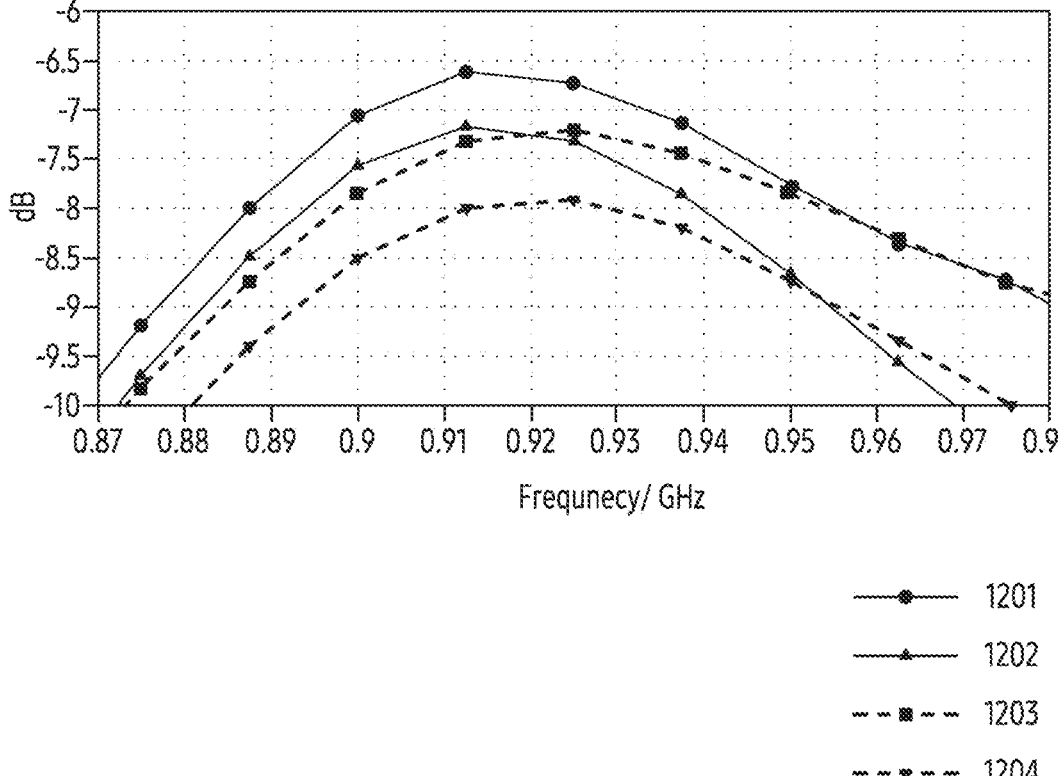
FIG. 12B illustrates efficiency of an antenna of an electronic device shown in FIG. 12A.

FIG. 12A illustrates a side surface of an electronic device according to an embodiment. FIG. 12B illustrates efficiency of an antenna of the electronic device illustrated in FIG. 12A.

Referring to FIG. 12A, the length of a first conductive portion 310 formed in a first side exterior surface 211 may be different from the length of a third conductive portion 320 formed in a third side surface 231. For example, the first non-conductive portion 421 in the first side exterior surface 211 may be misaligned with the third non-conductive portion 423 in the third side surface 231. For example, the second non-conductive portion 422 in the first side exterior surface 211 may be misaligned with the fourth non-conductive portion 424 in the third side surface 231. For example, the fifth non-conductive portion 425 in the second side exterior surface 221 may be aligned with the first non-conductive portion 421. For example, the sixth non-conductive portion 426 in the second side exterior surface 221 may be aligned with the second non-conductive portion 422. For example, the length of the first conductive portion 310 formed between the first non-conductive portion 421 and the second non-conductive portion 422 may be longer than the length of the third conductive portion 320 formed between the third non-conductive portion 423 and the fourth non-conductive portion 424. For example, the first feeding point 311 and the first ground point 312 of the first conductive portion 310 may be misaligned with the second feeding point 321 and the second ground point 322 of the third conductive portion 320, respectively. For example, the first feeding point 311 may be misaligned with the second feeding point 321. For example, the first ground point 312 may be misaligned with the second ground point 322.

The graph of FIG. 12B represents the efficiency of the first antenna and the efficiency of the second antenna depending on whether the electronic device 101 illustrated in FIG. 12A includes the filter circuit 360. Referring to FIG. 12B, when the electronic device 101 illustrated in FIG. 12A includes the filter circuit 360, the efficiency of the first antenna and the efficiency of the second antenna may be improved. The x-axis of the graph indicates the frequency (unit: GHz), and the y-axis of the graph indicates the efficiency (unit: dB).

Referring to FIG. 12B, a first graph 1201 represents the efficiency of the first antenna when the electronic device 101 illustrated in FIG. 12A includes a filter circuit 360. The second graph 1202 represents the efficiency of the second antenna when the electronic device 101 illustrated in FIG. 12A includes the filter circuit 360. The third graph 1203 represents the efficiency of the first antenna when the electronic device 101 illustrated in FIG. 12A does not include the filter circuit 360. The fourth graph 1204 represents the efficiency of the second antenna when the electronic device 101 illustrated in FIG. 12A does not include the filter circuit 360.

Comparing the first graph 1201 and the third graph 1203, the first graph 1201 may have the efficiency that is, at most, about 0.5 dB higher than that of the third graph 1203. Comparing the second graph 1202 and the fourth graph 1204, the second graph 1202 may have the efficiency that is, at most, about 0.7 dB higher than that of the fourth graph 1204. For example, independently of the structure of the foldable housing 200, the filter circuit 360 may enhance the communication performance of the electronic device 101 by improving the efficiency of the first antenna and the second antenna.

Figure 13A:
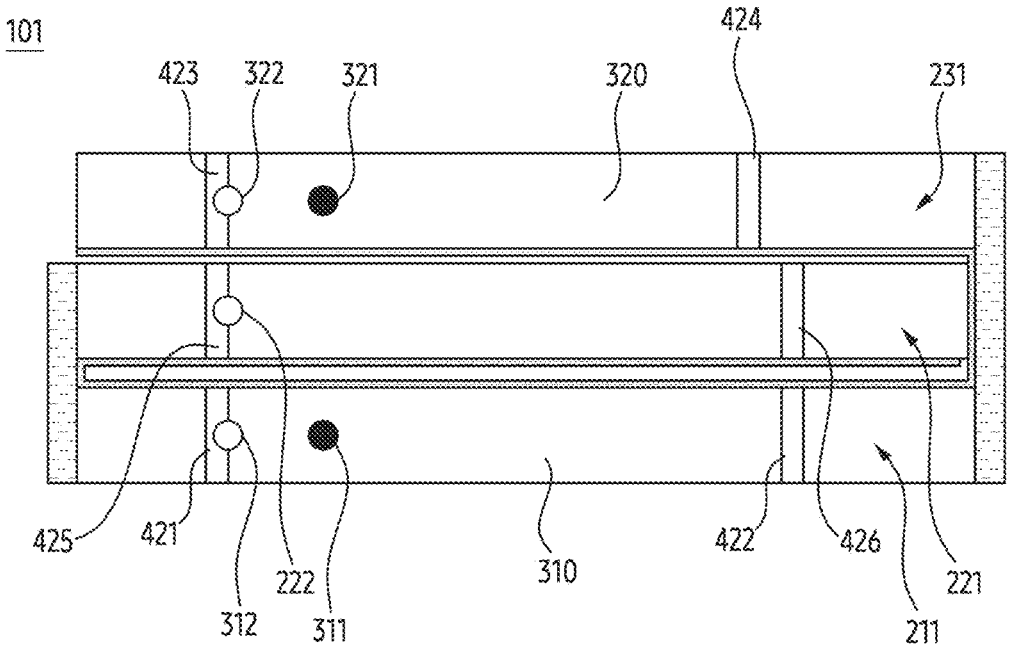
FIG. 13A illustrates a side surface of an electronic device according to an embodiment.
Figure 13B:
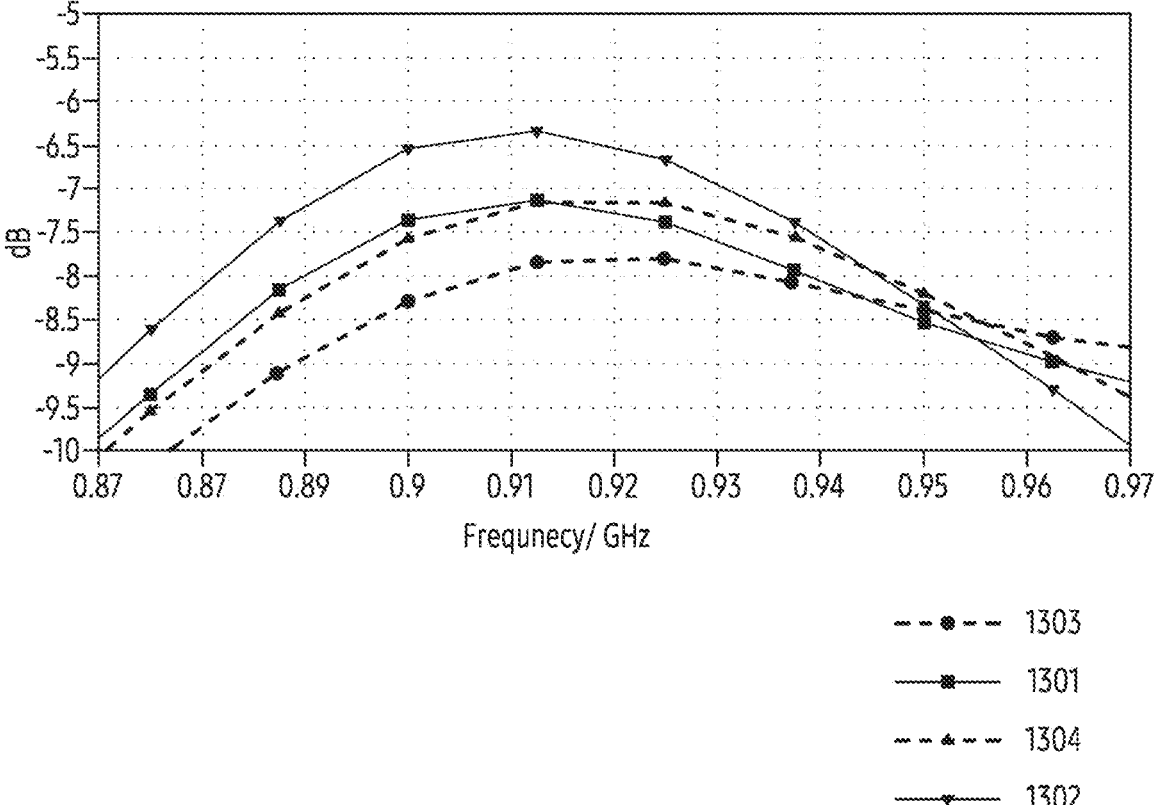
FIG. 13B illustrates efficiency of an antenna of an electronic device shown in FIG. 13A.

FIG. 13A illustrates a side surface of an electronic device according to an embodiment. FIG. 13B illustrates efficiency of an antenna of the electronic device illustrated in FIG. 13A.

Referring to FIG. 13A, the length of a first conductive portion 310 formed in a first side exterior surface 211 may be different from the length of a third conductive portion 320 formed in a third side surface 231. For example, the first non-conductive portion 421 in the first side exterior surface 211 may be aligned with the third non-conductive portion 423 in the third side surface 231. For example, the second non-conductive portion 422 in the first side exterior surface 211 may be misaligned with the fourth non-conductive portion 424 in the third side surface 231. For example, the fifth non-conductive portion 425 in the second side exterior surface 221 may be aligned with the first non-conductive portion 421. For example, the sixth non-conductive portion 426 in the second side exterior surface 221 may be aligned with the second non-conductive portion 422. For example, the length of the first conductive portion 310 formed between the first non-conductive portion 421 and the second non-conductive portion 422 may be longer than the length of the third conductive portion 320 formed between the third non-conductive portion 423 and the fourth non-conductive portion 424. However, the disclosure is not limited thereto. For example, the first feeding point 311 and the first ground point 312 of the first conductive portion 310 may be aligned with the second feeding point 321 and the second ground point 322 of the third conductive portion 320, respectively. For example, the first feeding point 311 may be aligned with the second feeding point 321. For example, the first ground point 312 may be aligned with the second ground point 322.

The graph of FIG. 13B represents the efficiency of the first antenna and the efficiency of the second antenna depending on whether the electronic device 101 illustrated in FIG. 13A includes the filter circuit 360. Referring to FIG. 13B, when the electronic device 101 illustrated in FIG. 13A includes the filter circuit 360, the efficiency of the first antenna and the efficiency of the second antenna may be improved. The x-axis of the graph indicates the frequency (unit: GHz), and the y-axis of the graph indicates the efficiency (unit: dB).

Referring to FIG. 13B, a first graph 1301 represents the efficiency of the first antenna when the electronic device 101 illustrated in FIG. 13A includes the filter circuit 360. The second graph 1302 represents the efficiency of the second antenna when the electronic device 101 illustrated in FIG. 13A includes the filter circuit 360. The third graph 1303 represents the efficiency of the first antenna when the electronic device 101 illustrated in FIG. 13A does not include the filter circuit 360. The fourth graph 1304 represents the efficiency of the second antenna when the electronic device 101 illustrated in FIG. 13A does not include the filter circuit 360.

Comparing the first graph 1301 and the third graph 1303, the first graph 1301 may have the efficiency that is, at most, about 0.7 dB higher than that of the third graph 1303. Comparing the second graph 1302 and the fourth graph 1304, the second graph 1302 may have the efficiency that is, at most, about 0.7 dB higher than that of the fourth graph 1304. For example, independently of the structure of the foldable housing 200, the filter circuit 360 may improve the efficiency of the first antenna and the second antenna, thereby enhancing the communication performance of the electronic device 101.

Figure 14A:
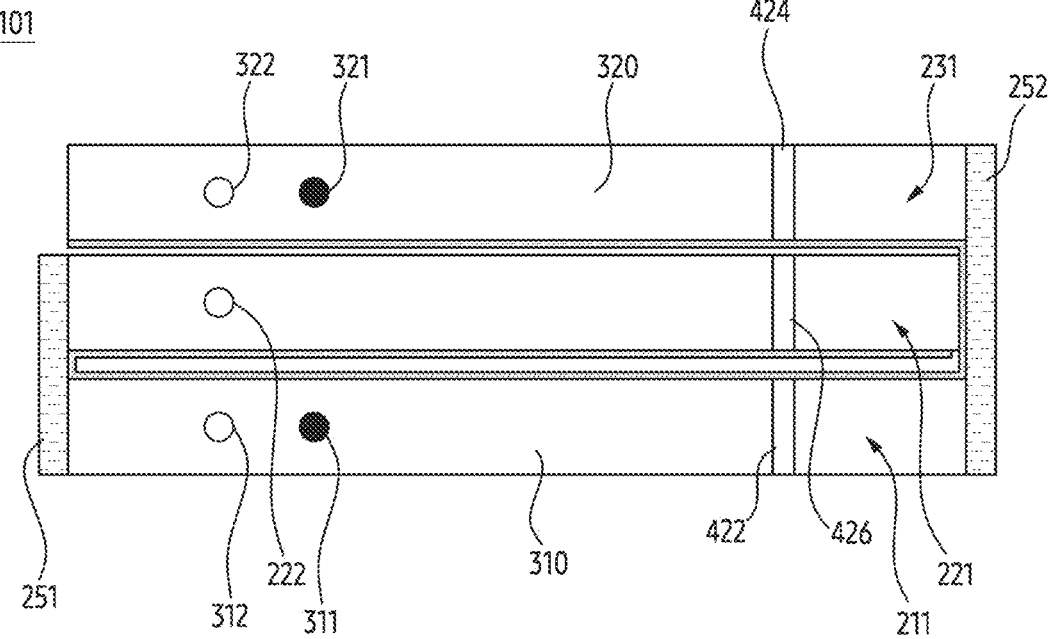
FIG. 14A illustrates a side surface of an electronic device according to an embodiment.
Figure 14B:
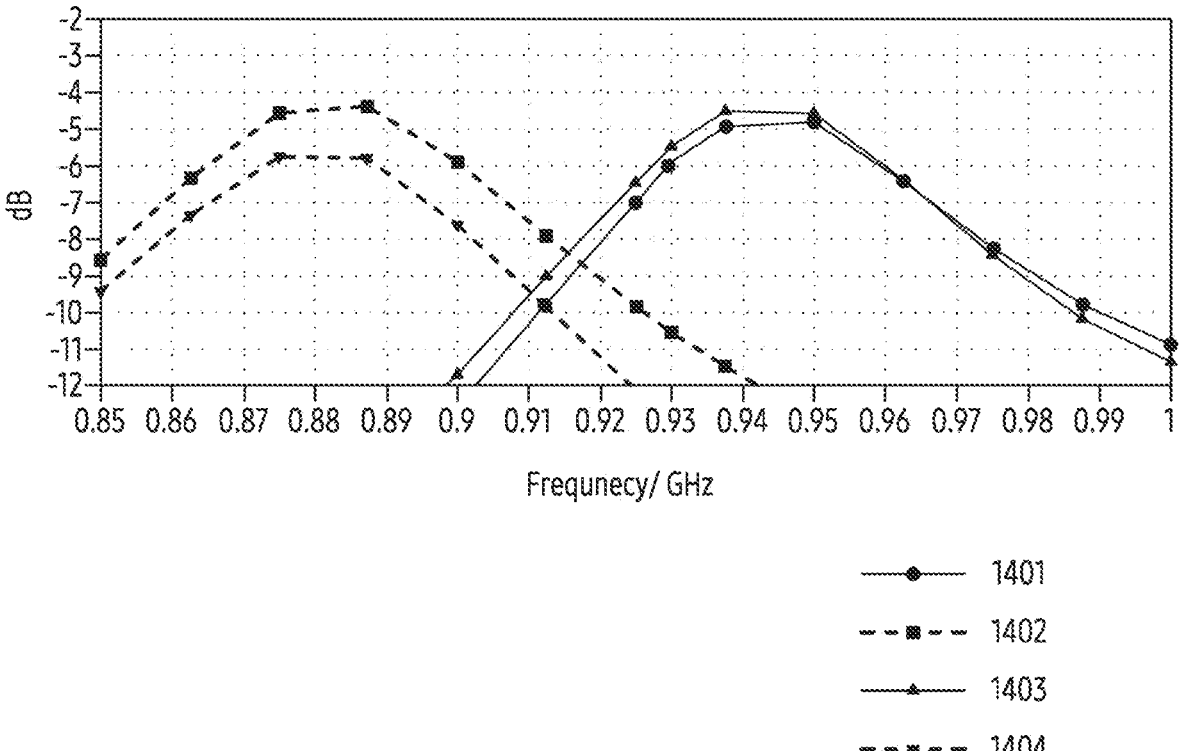
FIG. 14B illustrates efficiency of an antenna of an electronic device shown in FIG. 14A.

FIG. 14A illustrates a side surface of an electronic device according to an embodiment. FIG. 14B illustrates efficiency of an antenna of the electronic device shown in FIG. 14A.

Referring to FIG. 14A, only one non-conductive portion may be located in a first side exterior surface 211, a second side exterior surface 221, and a third side surface 231. For example, the second non-conductive portion 422 may be positioned in the first side exterior surface 211. For example, a fourth non-conductive portion 424 aligned with the second non-conductive portion 422 may be positioned in the third side surface 231. For example, a sixth non-conductive portion 426 aligned with the second non-conductive portion 422 may be positioned in the second side exterior surface 221. For example, the first feeding point 311 may be aligned with the second feeding point 321. For example, the first ground point 312 may be aligned with the second ground point 322. For example, the portion 222 in the second side exterior surface 221 may correspond to an area between the first feeding point 311 and the first ground point 312 and an area between the second feeding point 321 and the second ground point 322.

The graph of FIG. 14B represents the efficiency of the first antenna and the efficiency of the second antenna depending on whether the electronic device 101 illustrated in FIG. 14A includes the filter circuit 360. Referring to FIG. 14B, when the electronic device 101 illustrated in FIG. 14A includes the filter circuit 360, the efficiency of the first antenna and the efficiency of the second antenna may be improved. The x-axis of the graph indicates the frequency (unit: GHz), and the y-axis of the graph indicates the efficiency (unit: dB).

Referring to FIG. 14B, a first graph 1401 represents the efficiency of the first antenna when the electronic device 101 illustrated in FIG. 14A includes the filter circuit 360. The second graph 1402 represents the efficiency of the second antenna when the electronic device 101 illustrated in FIG. 14A includes the filter circuit 360. The third graph 1403 represents the efficiency of the first antenna when the electronic device 101 illustrated in FIG. 14A does not include the filter circuit 360. The fourth graph 1404 represents the efficiency of the second antenna when the electronic device 101 illustrated in FIG. 14A does not include the filter circuit 360.

Referring to FIG. 14B, when the electronic device 101 includes the filter circuit 360, the resonance frequency of the first antenna and the resonance frequency of the second antenna may be shifted. For example, the first graph 1401 and the third graph 1403 may have high efficiency at frequencies ranging from about 0.93 GHz to about 0.95 GHz. For example, the second graph 1402 and the fourth graph 1404 may have high efficiency at frequencies ranging from about 0.87 GHz to about 0.89 GHz. For example, when the frequency of the signal to be transmitted and/or received through the first antenna and/or the second antenna is about 0.93 GHz, the filter circuit 360 may shift the resonance of the first antenna and the second antenna to a target frequency. For example, the filter circuit 360 may change the frequency characteristics of the first antenna and the second antenna to correspond to a designated frequency, thereby improving the efficiency of the first antenna and the second antenna for a signal in the designated frequency.

Figure 15A:
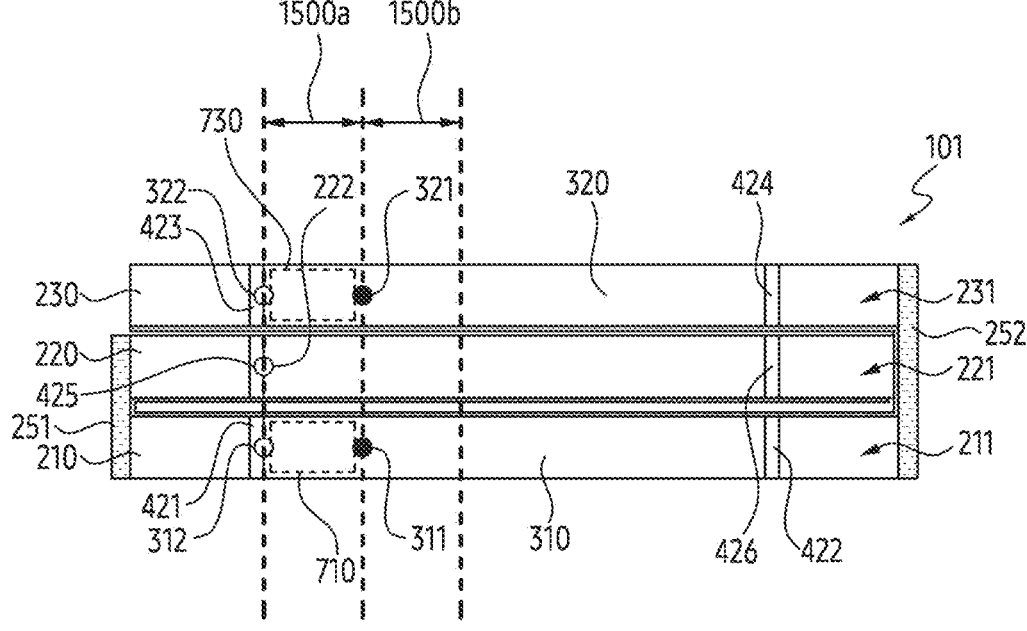
FIG. 15A illustrates a side surface of an electronic device according to an embodiment.
Figure 15B:
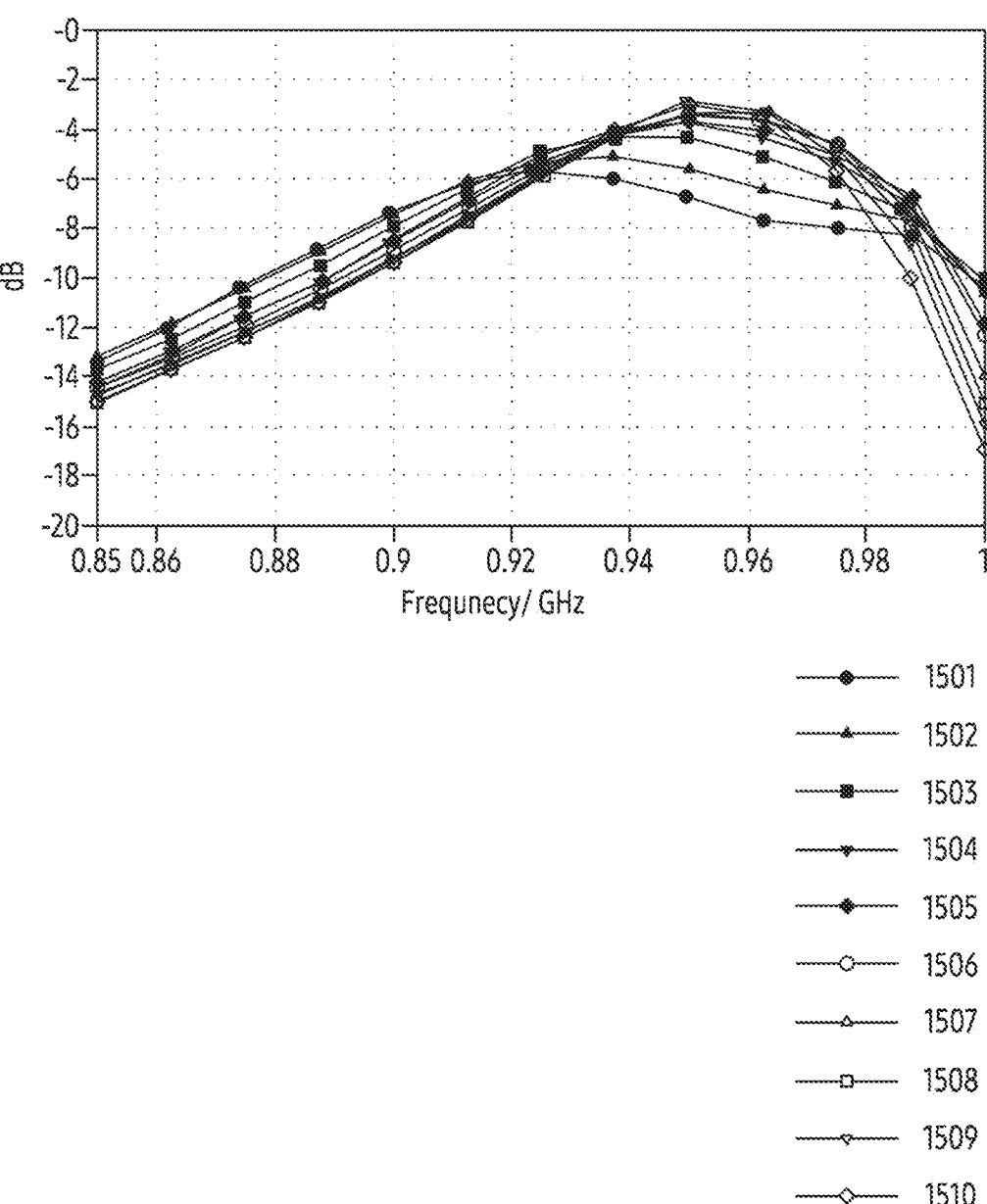
FIG. 15B illustrates efficiency of a first antenna according to positions of a feeding point and a ground point of an electronic device according to an embodiment.
Figure 15C:
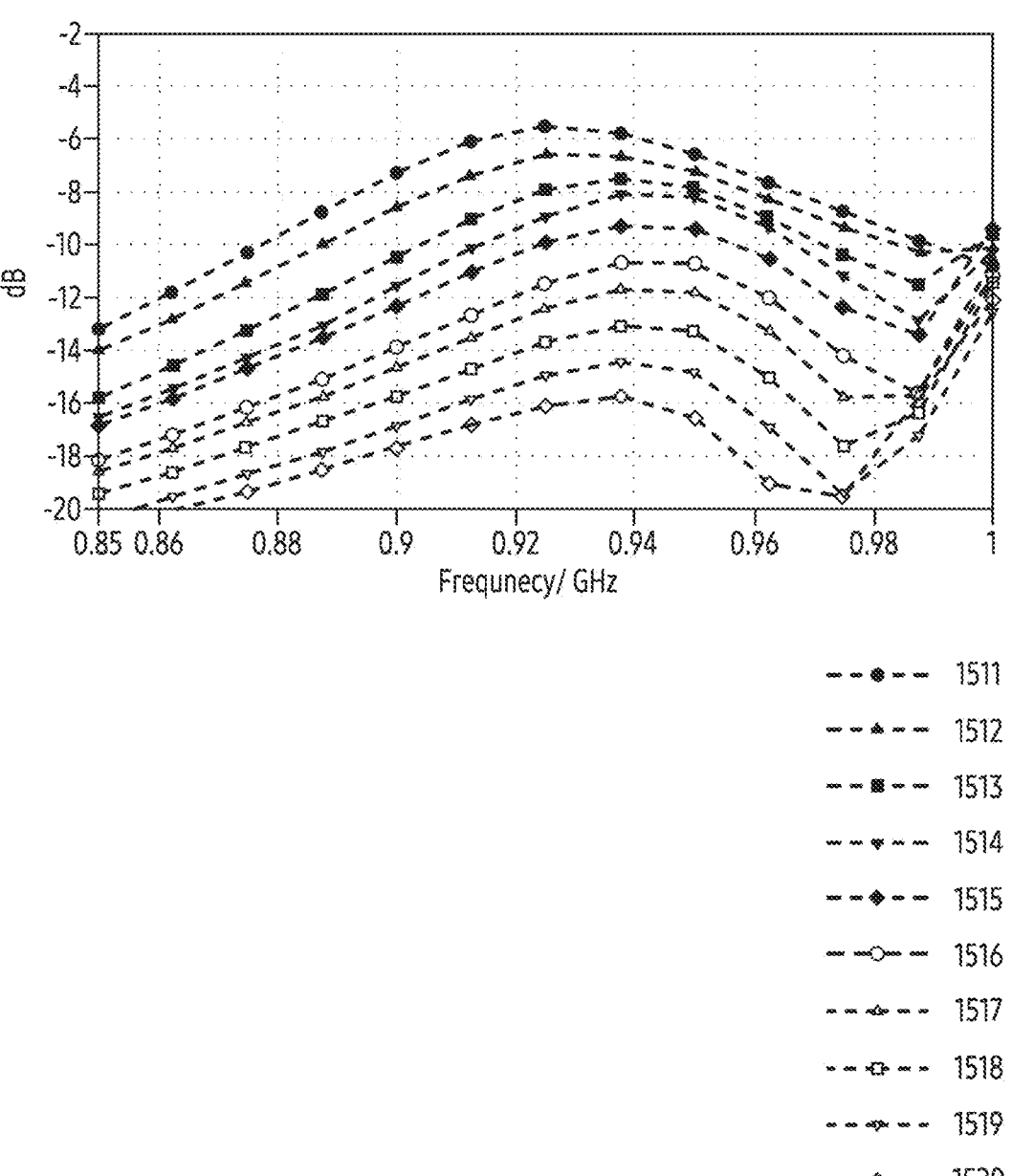
FIG. 15C illustrates efficiency of a second antenna according to positions of a feeding point and a ground point of an electronic device according to an embodiment.

FIG. 15A illustrates a side surface of an electronic device according to an embodiment. FIG. 15B illustrates efficiency of a first antenna according to positions of a feeding point and a ground point of an electronic device according to an embodiment. FIG. 15C illustrates efficiency of a second antenna according to positions of a feeding point and a ground point of an electronic device according to an embodiment.

As described above, the second feeding point 321 may be substantially aligned with the first feeding point 311, and the second ground point 322 may be substantially aligned with the first ground point 312. When the foldable housing 200 has the aligned structure, the efficiency of the first antenna including at least a portion of the first conductive portion 310 and the efficiency of the second antenna including at least a portion of the third conductive portion 320 may be high.

Referring to FIGS. 15A to 15C, as the positions of a first feeding point 311 and a first ground point 312 are fixed and the positions of a second feeding point 321 and a second ground point 322 are moved, the efficiency of the first antenna and the efficiency of the second antenna may vary. For example, in the case of the aligned structure, a third region 730 between the second feeding point 321 and the second ground point 322 may at least partially overlap a first region 710 between the first feeding point 311 and the first ground point 312. When at least a portion of the third region 730 overlaps the first region 710, each of the second feeding point 321 and the second ground point 322 may be substantially aligned with the first feeding point 311 and the first ground point 312. When the third region 730 is spaced apart from the first region 710, the second feeding point 321 and the second ground point 322 may be respectively misaligned with, and not substantially aligned with, the first feeding point 311 and the first ground point 312.

The efficiency of the first antenna and the second antenna according to moving the second ground point 322 by 9 from the origin will be described, assuming the position where the second ground point 322 is aligned with the first ground point 312 as the origin, when the distance between the second feeding point 321 and the second ground point 322 is constant. When the second ground point 322 is positioned within a first portion 1500a between the origin and the position aligned with the first feeding point 311, the second feeding point 321 and the second ground point 322 may be substantially aligned with the first feeding point 311 and the first ground point 312, respectively. When the second ground point 322 is positioned within a second portion 1500b between the position aligned with the first feeding point 311 and the position spaced apart by 9 from the origin, each of the second feeding point 321 and the second ground point 322 may not be substantially aligned with the first feeding point 311 and the first ground point 312 and may be misaligned.

The graph shown in FIG. 15B represents the efficiency of the first antenna according to moving the second ground point 322 shown in FIG. 15A by 9 from the origin. The x-axis of the graph indicates the frequency (unit: GHz), and the y-axis of the graph indicates the efficiency (unit: dB).

The first graph 1501 represents the efficiency of the first antenna when the second ground point 322 is positioned at the origin aligned with the first ground point 312. The second graph 1502 represents the efficiency of the first antenna when the second ground point 322 is spaced apart from the origin by 1. The third graph 1503 represents the efficiency of the first antenna when the second ground point 322 is spaced apart from the origin by 2. The fourth graph 1504 represents the efficiency of the first antenna when the second ground point 322 is spaced apart from the origin by 3.

The fifth graph 1505 represents the efficiency of the first antenna when the second ground point 322 is spaced apart from the origin by 4 (e.g., when the second ground point 322 is aligned with the first feeding point 311). The sixth graph 1506 represents the efficiency of the first antenna when the second ground point 322 is spaced apart from the origin by 5. The seventh graph 1507 represents the efficiency of the first antenna when the second ground point 322 is spaced apart from the origin by 6. The eighth graph 1508 represents the efficiency of the first antenna when the second ground point 322 is spaced apart from the origin by 7. The ninth graph 1509 represents the efficiency of the first antenna when the second ground point 322 is spaced apart from the origin by 8. The tenth graph 1510 represents the efficiency of the first antenna when the second ground point 322 is spaced apart from the origin by 9.

The first to fifth graphs (1501, 1502, 1503, 1504, 1505) may be referred to as the efficiency of the first antenna when the second ground point 322 is located in the first portion 1500a. The sixth to tenth graphs (1506, 1507, 1508, 1509, 1510) may be referred to as the efficiency of the first antenna when the second ground point 322 is located in the second portion 1500b.

The graph shown in FIG. 15C represents the efficiency of the second antenna according to moving the second ground point 322 shown in FIG. 15A by 9 from the origin. The x-axis of the graph indicates the frequency (unit: GHz), and the y-axis of the graph indicates the efficiency (unit: dB).

The eleventh graph 1511 represents the efficiency of the second antenna when the second ground point 322 is positioned at the origin aligned with the first ground point 312. The twelfth graph 1512 represents the efficiency of the second antenna when the second ground point 322 is spaced apart from the origin by 1. The thirteenth graph 1513 represents the efficiency of the second antenna when the second ground point 322 is spaced apart from the origin by 2. The fourteenth graph 1514 represents the efficiency of the second antenna when the second ground point 322 is spaced apart from the origin by 3.

The fifteenth graph 1515 represents the efficiency of the second antenna when the second ground point 322 is spaced apart from the origin by 4 (e.g., when the second ground point 322 is aligned with the first feeding point 311). The sixteenth graph 1516 represents the efficiency of the second antenna when the second ground point 322 is spaced apart from the origin by 5. The seventeenth graph 1517 represents the efficiency of the second antenna when the second ground point 322 is spaced apart from the origin by 6. The eighteenth graph 1518 represents the efficiency of the second antenna when the second ground point 322 is spaced apart from the origin by 7. The nineteenth graph 1519 represents the efficiency of the second antenna when the second ground point 322 is spaced apart from the origin by 8. The twentieth graph 1520 represents the efficiency of the second antenna when the second ground point 322 is spaced apart from the origin by 9.

The eleventh to fifteenth graphs (1511, 1512, 1513, 1514, 1515) may be referred to as the efficiency of the second antenna when the second ground point 322 is positioned in the first portion 1500a. The sixteenth to twentieth graphs (1516, 1517, 1518, 1519, 1520) may be referred to as the efficiency of the second antenna when the second ground point 322 is located in the second portion 1500b.

For a frequency of about 0.92 GHz, the efficiency of the first antenna and the efficiency of the second antenna shown in FIGS. 15B and 15C may be respectively referred to as Table 1 below.

TABLE 1

| Position of Second Ground Point | Efficiency of First Antenna | Efficiency of Second Antenna | Efficiency Balance |
|---|---|---|---|
| 0 (Origin) | −5.8 | −5.5 | 1.05 |
| 1 | −5.3 | −6.6 | 0.80 |
| 2 | −5.0 | −7.5 | 0.67 |
| 3 | −5.3 | −8.5 | 0.362 |
| 4 | −5.4 | −9.9 | 0.55 |
| 5 | −5.5 | −11.5 | 0.48 |
| 6 | −5.7 | −12.5 | 0.46 |
| 7 | −5.8 | −13.7 | 0.42 |
| 8 | −5.8 | −15.0 | 0.39 |
| 9 | −5.7 | −16.1 | 0.35 |

In the above Table 1, the efficiency balance may be referred to as a ratio of the efficiency of the second antenna to the efficiency of the first antenna (e.g., the efficiency of the second antenna/the efficiency of the first antenna).

The electronic device 101 according to an embodiment may provide the communication diversity and/or the MIMO using the first antenna and the second antenna. To provide the communication diversity and/or the MIMO, it may be required that the efficiency of the first antenna and the efficiency of the second antenna correspond to each other. For example, referring to the Table 1 above, the efficiency of the first antenna when the second ground point 322 is positioned in the second portion 1500b (e.g., when it is spaced apart from the origin by 6) may be higher than that when the second ground point 322 is positioned in the first portion 1500a (e.g., when it is located on the origin). In the above-described case, since the efficiency balance according to the change in the efficiency of the second antenna is relatively low, the communication diversity and/or the MIMO performance may be deteriorated.

Referring to the efficiency balance of Table 1, when each of the second feeding point 321 and the second ground point 322 is substantially aligned with the first feeding point 311 and the first ground point 312, its efficiency balance may be relatively high. For example, when the second ground point 322 is positioned on the origin such that the second feeding point 321 is aligned with the first feeding point 311 and the second ground point 322 is aligned with the first ground point 312, the efficiency balance may be highest. According to an embodiment, in order to increase the diversity and/or MIMO performance of the electronic device 101, each of the second feeding point 321 and the second ground point 322 may be substantially aligned with the first feeding point 311 and the first ground point 312.

An electronic device 101 is provided. The electronic device 101 may include a foldable housing 200, a wireless communication circuit 340, a first conductive portion 310, and a filter circuit 360. The foldable housing 200 may include a first housing part 210, a second housing part 220, and a third housing part 230. The foldable housing 200 may be configured to be foldable with respect to a first folding axis 241 and a second folding axis 242 such that the first housing part 210, the second housing part 220 and the third housing part 230 are stacked with respect to each other in a folded state. The wireless communication circuit 340 may be used for wireless communication. The first conductive portion 310 may be at least partially formed along the first side exterior surface 211 of the first housing part 210. The first conductive portion 310 may include a feeding point 311 electrically connected to the wireless communication circuit 340 and a ground point 312 electrically connected to a ground. The filter circuit 360 may be electrically connected to a portion 222 of the second conductive portion 370 in the second side exterior surface 221 of the second housing part 220. The filter circuit 360 may electrically connect the second conductive portion 370 in the second side exterior surface 221 to the ground. The second housing part 220 may be positioned between the first housing part 210 and the third housing part 230 in the folded state in which the first housing part 210, the second housing part 220, and the third housing part 230 are folded. The portion 222 in the second side exterior surface 221 may correspond to a region between the feeding point 311 of the first conductive portion 310 and the ground point 312 of the first conductive portion 310, in the folded state in which the first housing part 210 and the second housing part 220 are folded.

For example, the filter circuit 360 may be configured to enable signals corresponding to a predefined resonance frequency range to pass. The predefined resonance frequency range may include a parasitic resonance frequency associated with a frequency of a signal transmitted or received through the first conductive portion 310. The filter circuit 360 according to an embodiment may function as a notch filter for the signal transmitted and/or received through the first conductive portion 310, by selectively passing a parasitic resonance frequency band.

For example, the electronic device 101 may further include a third conductive portion 320. The third conductive portion 320 may be at least partially formed along the third side surface 231 of the third housing part 230 perpendicular to the second folding axis 242. The third conductive portion 320 may include a feeding point 321 electrically connected to the wireless communication circuit 340 and a ground point 322 electrically connected to the ground.

For example, the portion 222 of the second conductive part 370 in the second side exterior surface 221 may correspond to the region between the feeding point 311 of the first conductive part 310 and the ground point 312 of the first conductive part 310 and the region between the feeding point 321 of the third conductive part 320 and the ground point 322 of the third conductive part 320, in the folded state in which the first housing part 210, the second housing part 220, and the third housing part 230 are folded.

For example, the feeding point 311 of the first conductive portion 310 may be substantially aligned with the feeding point 321 of the third conductive portion 320 in a folded state in which the first housing part 210 and the third housing part 230 are folded. The ground point 312 of the first conductive part 310 may be substantially aligned with the ground point 322 of the third conductive part 320 in the folded state in which the first housing part 210 and the third housing part 230 are folded.

For example, the region between the ground point 312 of the first conductive part 310 and the ground point 322 of the third conductive part 320 may partially overlap a region between the ground point 312 of the first conductive part 310 and the ground point 322 of the third conductive part 320, in the folded state in which the first housing part 210 and the third housing part 230 are folded.

For example, the portion 222 in the second side exterior surface 221 may be positioned between a first point in the second side exterior surface 221 aligned with the ground point 312 of the first conductive portion 310 and a second point in the second side exterior surface 221 aligned with the ground point of the third conductive portion 320.

For example, an antenna including at least a portion of the first conductive portion 310 may be configured to operate as a primary antenna for transmitting or receiving a signal in a designated frequency band, by being fed from the wireless communication circuit 340. An antenna including at least a portion of the third conductive portion 320 may be configured to operate as a diversity antenna for transmitting or receiving the signal, by being fed from the wireless communication circuit 340.

For example, the first housing part 210 and the third housing part 230 may be positioned in an exterior of the electronic device 101 in the folded state in which the first housing part 210, the second housing part 220, and the third housing part 230 are folded.

For example, the filter circuit 360 may include a filter circuit configured to enable signals corresponding to a parasitic resonance frequency to pass. The parasitic resonance frequency may be different from a frequency of a signal transmitted or received through the first conductive portion 310.

For example, the second side exterior surface 221 may overlap the first side exterior surface 211 in the folded state in which the first housing part 210, the second housing part 220, and the third housing part 230 are folded.

For example, the portion 222 in the second side exterior surface 221 may be located on a path through which a current forming a parasitic resonance caused by the structure of the foldable housing 200 is provided to the second side exterior surface 221, in the folded state in which the first housing 210, the second housing 220, and the third housing 230 are folded.

For example, a direction of the current formed on the second side exterior surface 221 may correspond to a direction of a radiation current formed along the first conductive portion 310.

For example, the electronic device 101 may further include a first hinge part 251 disposed between the first housing part 210 and the second housing part 220, and a second hinge part 252 disposed between the first housing part 210 and the third housing part 230 or between the second housing part 220 and the third housing part 230.

For example, the electronic device 101 may further include another filter circuit electrically connected to another portion in the second side exterior surface 221.

An electronic device 101 is provided. The electronic device 101 may include a foldable housing 200, a first conductive portion 310, a filter circuit 360, and a second conductive portion (e.g., the third conductive portion 320 of FIG. 3B). The foldable housing 200 may include a first housing part 210, a second housing part 220, and a third housing part 230. One side of the second housing part 220 may be rotatably connected to one side of the first housing part 210 with respect to a first folding axis 241. The third housing part 230 may be rotatably connected to either one of the other side of the first housing part 210 or the other side of the second housing part 220 with respect to a second folding axis 242 parallel to the first folding axis 241. The first conductive portion 310 may be at least partially formed along a first side exterior surface 211 of the first housing part 210. The first conductive portion 310 may include a first feeding point 311 and a first ground point 312. The filter circuit 360 may be electrically connected to a portion 222 of the second conductive portion 370 formed at least partially along a second side exterior surface 221 of the second housing part 220. The filter circuit 360 may electrically connect the second side exterior surface 221 and a ground. The third conductive portion 320 may be at least partially formed along a third side surface 231 of the third housing part 230. The third conductive portion 320 may include a second feeding point 321 and a second ground point 322. The second housing part 220 may be positioned between the first housing part 210 and the third housing part 230, in a folded state in which the first housing part 210, the second housing part 220, and the third housing part 230 are folded. The portion 222 in the second side exterior surface 221 may correspond to a first region 710 between the first feeding point 311 and the first ground point 312, and a second region 730 between the second feeding point 321 and the second ground point 322.

For example, the first feeding point 311 may be substantially aligned with the second feeding point 321 in a folded state in which the first housing part 210 and the third housing part 230 are folded. The first ground point 312 may be substantially aligned with the second ground point 322 in the folded state in which the first housing part 210 and the third housing part 230 are folded.

For example, the first region 710 may partially overlap the second region 730.

For example, the portion 222 in the second side exterior surface 221 may be located between a first point in the second side exterior surface 221 corresponding to the first ground point 312 and a second point in the second side exterior surface 221 corresponding to the second ground point 322.

For example, the filter circuit 360 may be configured to enable signals corresponding to a predefined resonance frequency range to pass. The predefined resonance frequency range may include a parasitic resonance frequency associated with a frequency of a signal transmitted or received through the first conductive portion 310. The filter circuit 360 according to an embodiment may function as a notch filter for the signal transmitted and/or received through the first conductive portion 310, by selectively passing a parasitic resonance frequency band.

The electronic device according to various embodiments disclosed herein may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may be interchangeably used with other terms, for example, "logic", "logic block", "part", or "circuit". A module may be a single integral component, or a minimum unit or part thereof, adapted to perform one or more functions. For example, according to an example, the module may be implemented in a form of an application-specific integrated circuit (ASIC).

Various embodiments as set forth herein may be implemented as software (e.g., a program 140) including one or more instructions that are stored in a storage medium (e.g., an internal memory 136 or an external memory 138) that is readable by a machine (e.g., an electronic device 101). For example, a processor (e.g., a processor 120 of an electronic device 101) of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory 130 of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means."

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a foldable housing including a first housing part, a second housing part and a third housing part, the foldable housing configured to be folded with respect to a first folding axis and a second folding axis such that the first housing part, the second housing part and the third housing part are stacked with respect to each other in a folded state;
   a wireless communication circuit for wireless communication;
   a first conductive portion formed at least partially along a first side exterior surface of the first housing part, the first conductive portion including a feeding point electrically connected to the wireless communication circuit and a ground point electrically connected to a ground of the electronic device; and
   a filter circuit electrically connected to a portion of a second conductive portion formed at least partially along a second side exterior surface of the second housing part, and electrically connecting the second conductive portion of the second side exterior surface and the ground,
   wherein the second housing part is positioned between the first housing part and the third housing part in the folded state in which the first housing part, the second housing part, and the third housing part are folded, and
   wherein the portion of the second conductive portion in the second side exterior surface corresponds to a region between the feeding point of the first conductive portion and the ground point of the first conductive portion in the folded state in which the first housing part and the second housing part are folded.

2. The electronic device of claim 1, wherein the filter circuit is configured to enable signals corresponding to a predefined resonance frequency range to pass, and wherein the predefined resonance frequency range includes a parasitic resonance frequency associated with a frequency of a signal transmitted or received through the first conductive portion.

3. The electronic device of claim 1, further comprising:

a third conductive portion formed at least partially along a third side exterior surface of the third housing part perpendicular to the second folding axis, and including a feeding point electrically connected to the wireless communication circuit and a ground point electrically connected to the ground.

4. The electronic device of claim 3, wherein the portion of the second conductive portion in the second side exterior surface corresponds to the region between the feeding point of the first conductive portion and the ground point of the first conductive portion and a region between the feeding point of the third conductive portion and the ground point of the third conductive portion, in the folded state in which the first housing part, the second housing part, and the third housing part are folded.

5. The electronic device of claim 3, wherein the feeding point of the first conductive portion is substantially aligned with the feeding point of the third conductive portion, in a folded state in which the first housing part and the third housing part are folded, and wherein the ground point of the first conductive portion is substantially aligned with the ground point of the third conductive portion in the folded state in which the first housing part and the third housing part are folded.

6. The electronic device of claim 3, wherein the region between the feeding point of the first conductive portion and the ground point of the first conductive portion partially overlaps a region between the ground point of the first conductive portion and the ground point of the third conductive portion, in the folded state in which the first housing part and the third housing part are folded.

7. The electronic device of claim 6, wherein the portion of the second conductive portion in the second side exterior surface is positioned between a first point in the second side exterior surface aligned with the ground point of the first conductive portion and a second point in the second side exterior surface aligned with the ground of the third conductive portion.

8. The electronic device of claim 3, wherein an antenna including at least a portion of the first conductive portion is configured to operate as a primary antenna for transmitting or receiving a signal on a designated frequency band by feeding from the wireless communication circuit, and wherein an antenna including at least a portion of the third conductive portion is configured to operate as a diversity antenna for transmitting or receiving the signal on the designated frequency band by feeding from the wireless communication circuit.

9. The electronic device of claim 1, wherein the first housing part and the third housing part are positioned in an exterior of the electronic device in the folded state in which the first housing part, the second housing part, and the third housing part are folded.

10. The electronic device of claim 1, wherein the filter circuit comprises a filter circuit configured to enable signals corresponding to a parasitic resonance frequency to pass, wherein the parasitic resonance frequency is different from a frequency of a signal transmitted or received through the first conductive portion.

11. The electronic device of claim 1, wherein the second side exterior surface overlaps the first side exterior surface, in the folded state in which the first housing part, the second housing part, and the third housing part are folded.

12. The electronic device of claim 1, wherein the portion of the second conductive portion in the second side is located on a path through which current forming parasitic resonance caused by a structure of the foldable housing is provided to the second side exterior surface, in the folded state in which the second housing part and the third housing part are folded.

13. The electronic device of claim 12, wherein a direction of the current formed on the second side exterior surface corresponds to a direction of a radiation current formed along the first conductive portion.

14. The electronic device of claim 1, further comprising:

a first hinge part disposed between the first housing part and the second housing part, and a second hinge part disposed between the first housing part and the third housing part or between the second housing part and the third housing part.

15. The electronic device of claim 1, further comprising:

another filter circuit electrically connected to another portion in the second side exterior surface.

16. An electronic device comprising:

a foldable housing including a first housing part, a second housing part whose one side is rotatably connected to one side of the first housing part with respect to a first folding axis, and a third housing part rotatably connected to either the other side of the first housing part or the other side of the second housing part with respect to a second folding axis parallel to the first folding axis;

a first conductive portion formed at least partially along a first side exterior surface of the first housing part and including a first feeding point and a first ground point;

a filter circuit electrically connected to a portion of a second conductive portion formed at least partially along a second side exterior surface of the second housing part and electrically connecting the second side exterior surface and a ground; and a third conductive portion formed at least partially along a third side exterior surface of the third housing part and including a second feeding point and a second ground point, wherein the second housing part is positioned between the first housing part and the third housing part in a folded state in which the first housing part, the second housing part, and the third housing part are folded, and wherein the portion in the second side exterior surface corresponds to a first region between the first feeding point and the first ground point and a second region between the second feeding point and the second ground point.

17. The electronic device of claim 16, wherein the first feeding point is substantially aligned with the second feeding point in a folded state in which the first housing part and the third housing part are folded, and wherein the first ground point is substantially aligned with the second ground point in the folded state in which the first housing part and the third housing part are folded.

18. The electronic device of claim 16, wherein the first region partially overlaps the second region.

19. The electronic device of claim 18, wherein the portion in the second side exterior surface is located between a first point in the second side exterior surface corresponding to the first ground point and a second point in the second side exterior surface corresponding to the second ground point.

20. The electronic device of claim 16, wherein the filter circuit is configured to enable signals corresponding to a predefined resonance frequency range to pass, wherein the predefined resonance frequency range includes a parasitic resonance frequency associated with a frequency of a signal transmitted or received through the first conductive portion.

\* \* \* \* \*